(12) United States Patent
Salem et al.

(10) Patent No.: US 10,468,674 B2
(45) Date of Patent: Nov. 5, 2019

(54) LAYERED HIGH CAPACITY ELECTRODES

(71) Applicant: SOUTH DAKOTA BOARD OF REGENTS, Pierre, SD (US)

(72) Inventors: David R. Salem, Rapid City, SD (US); Chunhui Chen, Rapid CIty, SD (US); Abdulmenan Hussein, Rapid City, SD (US)

(73) Assignee: South Dakota Board of Regents, Pierre, SD (US)

( * ) Notice: Subject to any disclaimer, the term of this patent is extended or adjusted under 35 U.S.C. 154(b) by 0 days.

(21) Appl. No.: 16/249,330

(22) Filed: Jan. 16, 2019

(65) Prior Publication Data

US 2019/0214640 A1  Jul. 11, 2019

Related U.S. Application Data

(63) Continuation of application No. PCT/US2019/012852, filed on Jan. 9, 2019.

(60) Provisional application No. 62/615,240, filed on Jan. 9, 2018.

(51) Int. Cl.
*H01M 4/36* (2006.01)
*H01M 4/38* (2006.01)
*H01M 4/587* (2010.01)
*H01M 4/02* (2006.01)

(52) U.S. Cl.
CPC .......... *H01M 4/366* (2013.01); *H01M 4/386* (2013.01); *H01M 4/587* (2013.01); *H01M 2004/027* (2013.01)

(58) Field of Classification Search
CPC ...... H01M 4/366; H01M 4/386; H01M 4/587; H01M 2004/027
See application file for complete search history.

(56) References Cited

U.S. PATENT DOCUMENTS

| | | | |
|---|---|---|---|
| 6,482,547 B1 | 11/2002 | Yoon et al. |
| 8,394,532 B2 | 3/2013 | Kang et al. |
| 8,580,431 B2 | 11/2013 | Roev et al. |
| 8,808,919 B2 | 8/2014 | Kim |
| 9,401,506 B2 | 7/2016 | Lahlouh et al. |
| 9,437,344 B2 | 9/2016 | Zhamu et al. |

(Continued)

FOREIGN PATENT DOCUMENTS

| | | |
|---|---|---|
| CN | 105591109 A | 5/2016 |
| CN | 105655542 A | 6/2016 |

(Continued)

OTHER PUBLICATIONS

Lee et al "N-doped graphitic self-encapsulation for high performance silicon anodes in lithium-ion batteries". Energy Environ Sci, 7, 621-626 (2014).*

(Continued)

*Primary Examiner* — Stephen J Yanchuk
(74) *Attorney, Agent, or Firm* — McKee, Voorhees & Sease, PLC

(57) ABSTRACT

This application relates to anode compositions and methods of making and using the same. In particular, the anode compositions are preferably layered. Preferably, the methods of making the anode compositions comprise a surfactant mediated assembly of layers. The anode compositions have improved structural integrity and capacity while reducing capacity fade due to cycling.

24 Claims, 25 Drawing Sheets

(56) References Cited

U.S. PATENT DOCUMENTS

| | | | |
|---|---|---|---|
| 9,548,490 | B2 | 1/2017 | Ku et al. |
| 9,647,263 | B2 | 5/2017 | Green |
| 9,815,691 | B2 | 11/2017 | Oguni et al. |
| 2012/0264020 | A1 | 10/2012 | Burton et al. |
| 2013/0040204 | A1 | 2/2013 | Liu et al. |
| 2014/0356707 | A1 | 12/2014 | Kwon et al. |
| 2014/0370394 | A1 | 12/2014 | Ruediger-Bernd et al. |
| 2015/0349335 | A1 | 12/2015 | Won et al. |
| 2016/0344020 | A1 | 11/2016 | Tzeng et al. |
| 2016/0344021 | A1 | 11/2016 | Seo et al. |
| 2017/0033360 | A1 | 2/2017 | Michaud et al. |
| 2017/0092942 | A1 | 3/2017 | Fukasawa et al. |
| 2017/0104210 | A1 | 4/2017 | Shin et al. |
| 2017/0117535 | A1 | 4/2017 | Yoon et al. |
| 2017/0200950 | A1 | 7/2017 | Gulas et al. |
| 2017/0207457 | A1 | 7/2017 | Yue et al. |
| 2017/0222219 | A1 | 8/2017 | Sun |
| 2017/0352883 | A1 | 12/2017 | Cho et al. |

FOREIGN PATENT DOCUMENTS

| | | |
|---|---|---|
| CN | 105680026 A | 6/2016 |
| CN | 104124431 B | 11/2016 |
| EP | 3276710 A1 | 1/2018 |
| KR | 20160031782 A | 3/2016 |
| KR | 2160057255 A | 5/2016 |
| KR | 20160055758 A | 5/2016 |
| KR | 20160075465 A | 6/2016 |
| WO | 2016079501 A1 | 5/2016 |
| WO | 2016206548 A1 | 12/2016 |
| WO | 2017099456 A1 | 6/2017 |
| WO | 2017125592 A1 | 7/2017 |
| WO | 2017222113 A1 | 12/2017 |

OTHER PUBLICATIONS

Meng et al Self-assembly of porous-grpahite/silicon/carbon composites for lithium-ion batteries. Powder Technology. 254. 403-406 (2014).*

Bachman et al., "Inorganic Solid-State Electrolytes for Lithium Batteries: Mechanisms and Properties Governing Ion Conduction", Chem. Rev., vol. 116, pp. 140-162, 2016.

Bordes et al., "Core-shell amorphous silicon-cargon nanoparticles for high performance anodes in lithium ion batteries", Journal of Power Sources, vol. 328, pp. 527-535, Aug. 11, 2016.

Cheng et al., "Surfactant carbonization to synthesize pseudocubic cx-Fe2O3/C nanocomposite and its electrochemical performance in lithium-ion batteries", Electrochimica Acta 56, pp. 5593-5598, Apr. 12, 2011.

Feng et al., "Surfactant Carbonization to Synthesize a Fe3O4/C Composite and its electrochemical performance", Acta Phys.-Chim. Sin., vol. 27(6), pp. 1439-1445, 2011.

Fergus, Jeffrey., "Ceramic and polymeric solid electrolytes for lithium-ion batteries", Journal of Power Sources, vol. 195, pp. 4554-4569, Feb. 4, 2010.

Galinski et al., "Ionic liquids as electrolytes", Science Direct, pp. 5567-5580, Mar. 12, 2006.

Haregewoin et al., "Electrolyte additives for lithium ion battery electrodes: progress and perspectives", Energy Environ. Sci., 35 pages, May 4, 2016.

Hou et al., "Deposition of silver nanoparticles into silicon/carbon composite as a high-performance anode material for Li-ion batteries", J Solid State Electrochem, 11 pages, Jul. 26, 2015.

Hu et al., "Electrolytes for Lithium and Lithium-Ion Batteries", Rechargeable Batteries, pp. 231-261, 2015.

Janek et al., "A solid future for battery development", Nature Energy, vol. 1, pp. 1-4, Sep. 8, 2016.

Klankowski et al., "High-Performance Lithium-ion Battery Anode Based on Core-Shell Heterostructure of Silicon-Coated Vertically Aligned Carbon Nanofibers", Journal of Materials Chemistry, pp. 1-6, 2013.

Lewandowski et al., "Ionic liquids as electrolytes for Li-ion batteries—An overview of electrochemical studies", Journal of Power Sources. vol. 194, pp. 601-609, Jun. 26, 2009.

Li et al., "Progress in electrolytes for rechargeable Li-based batteries and beyond", Science Direct, vol. 1, pp. 18-42, Mar. 18, 2016.

Liang et al., "Silicon-based materials as high capacity anodes for next generation lithium ion batteries", Journal of Power Sources, vol. 267, pp. 469-490, May 21, 2014.

Manthiram et al., "Lithium battery chemistries enabled by solid-state electrolytes", Nature Reviews, vol. 2, pp. 1-16, 2017.

Osada et al., "Ionic-Liquid-Based Polymer Electrolytes for Battery Applications", Angewaqndte Chemie International Edition, vol. 55, pp. 500-513, 2016.

Thangadurai et al., "Garnet-type solid-state fast Li ion conductors for Li batteries: critical review", Chem. Soc. Rev., 15 pages, Jan. 13, 2014.

Zhang et al., "Electrolyte additives for lithium metal anodes and rechargeable lithium metal batteries: progresses and perspectives", Angewaqndte Chemie International Edition, 31 pages, 2017.

Zhao et al., "In-situ growth amorphous carbon nanotube on silicon particles as lithium-ion battery anode materials", Journal of Alloys and Compounds, 22 pages, Mar. 4, 2017.

Zhou et al., "Graphene/Carbon-Coated Si Nanoparticle Hybrids as High-Performance Anode Materials for Li-Ion Batteries", Applied Materials & Interfaces, 7 pages, Mar. 25, 2013.

Zhu et al., "Directing Silicon-Graphene Self-Assembly as a Core/Shell Anode for High-Performance Lithium-Ion Batteries", American Chemical Society, 6 pages, Dec. 26, 2012.

Wachtler, Mario, "Li-Ion Batteries" Anode Materials Lecture Materials, 4 pages, Nov. 21, 2016.

Yoshio et al., "Improvement of natural graphite as a lithium-ion battery anode material, from raw flake to carbon-coated sphere", J. Mater. Chem., vol. 14, pp. 1754-1758, 2004.

* cited by examiner

LAYERED HIGH CAPACITY ELECTRODES

CROSS-REFERENCE TO RELATED APPLICATIONS

This application is a Continuation of PCT/US19/12852 filed on Jan. 9, 2019, which claims priority under 35 U.S.C. § 119 of a provisional application Ser. No. 62/615,240, filed Jan. 9, 2018, each of which is hereby incorporated by reference in its entirety, including, the claims, examples, tables, figures, and description.

FIELD OF THE INVENTION

The present invention relates to layered anode compositions, methods of preparing the layered anode compositions, and batteries including the layered anode compositions. Preferably, the layered anode compositions are of high capacity and suitable for use in lithium ion batteries or sodium-ion batteries.

BACKGROUND OF THE TECHNOLOGY

Lithium-ion batteries are currently the most popular rechargeable batteries due to their high energy densities, relatively high cell voltages, and low weight-to-volume ratios. However, the voltage, charge capacity, battery life, and rechargeability of lithium-ion batteries have increased by relatively small increments over the past decade.

Graphite is the primary active material in commercial lithium-ion battery anodes, and the theoretical maximum gravimetric energy capacity of these materials (372 mAh/g) is approached in most lithium-ion battery anodes on the market today. Anode manufacturing methods have been designed to effectively process and incorporate graphite into batteries, particularly in lithium ion batteries. In addition, there are many valuable features of graphite, including, for example, high Coulombic efficiency and tolerance of high cycling rates that are useful to retain in an anode formulation. On the other hand, attempts to utilize higher capacity materials, often in the form of submicron particles or nanoparticles, in lithium ion battery anodes have met with numerous problems associated with severe agglomeration of the particles, unstable connectivity with electronically conducting particles, high volumetric expansion during lithiation, and poor Coulombic efficiency due to side reactions with the electrolyte and unfavorable solid electrolyte interface (SEI) formation. Various expensive processes have been designed to overcome these problems, including, chemical vapor deposition (CVD) of carbon on silicon nanoparticles, and design of carbon "pomegranate" structures, containing silicon particles. However, these processes are generally too costly and/or too difficult to scale-up for commercial use.

To improve the cell performance, other electrode materials with higher theoretical capacities are being considered as alternatives for future lithium-ion battery anodes. Silicon is one of the preferred choices due to its high theoretical capacity of about 3600 mAh/g ($Li_{15}Si_4$), almost ten times higher than graphite. However, silicon, while electrochemically active, has poor electron conductivity, and must be connected with electronically conducting particles in a robust, well-dispersed network. Other electrochemically active species might be considered as well, including those that are also conductive. One challenge is providing an anode that retains integrity of the network between the electrochemically active components and electronically conductive particles during the large volume change often found in electrochemically active particles during charge and discharge cycling. For example, both tin and silicon exhibit swelling greater than 300% during repeated charge/discharge cycling, as a result of lithium insertion and extraction taking place in the electrochemical process. Other electrochemically active materials covered in this disclosure are similarly subject to large volume change as a result of insertion and removal of the ions from the electrochemically active material. Examples beyond tin and silicon, include germanium and iron oxide.

One strategy that has started to emerge commercially involves physical mixing of silicon nanoparticles (or submicron particles) with anode-grade graphite microparticles (with typical diameter in the range 10-40 μm), but when the silicon content reaches or exceeds about 5 wt. %, anode performance rapidly degrades due to agglomeration of the silicon particles and disruption of the graphite-silicon connections during cycling. Moreover, the agglomeration can result in the silicon particles becoming separated from the graphite materials, thereby loosing electrical connectivity. In addition, the agglomerated particles cause severe volume changes in the anode and restrict gains in volumetric energy density expected from the addition of silicon, or even leads to reduced performance. These problems are not exclusive to silicon and are problematic for other electrochemically active species given their tendency to agglomerate at higher concentrations and the swelling that occurs during cycling. Thus, the practical limit for adding electrochemically active nanoparticles (such as silicon) to graphite microparticles using current technology is about 5%—above that loading level, the anode suffers severe degradation in performance. Due to the low silicon content that can be practically used with traditional approaches any additional battery capacity is severely limited.

Thus, it remains a serious technical challenge to create anode compositions with silicon content of at least about 5 wt. % such that the silicon particles are non-agglomerating.

BRIEF SUMMARY OF THE PREFERRED EMBODIMENTS

The layered anode compositions disclosed herein and their methods of manufacture have many advantages over existing anode materials. For example, an advantage of the layered anode compositions is that they have higher silicon loading than many existing anode materials. Still a further advantage of the anode compositions is that their architecture is structurally stable over multiple cycles. It is a further advantage that anode compositions have improved specific capacity.

A preferred embodiment is directed to an anode composition comprising a graphite core having a surface, wherein the graphite core comprises a graphite particle having a mean diameter in at least one direction of between about 400 nm and about 60 μm; a first layer comprising electrochemically active particles attached to the surface of the graphite core. Preferably, the anode composition can further comprise a second layer, wherein the second layer comprises graphene particles attached to and partially or fully covering the first layer, and wherein the second layer is attached to the first layer. In a preferred embodiment, the surface of the graphite core and the first layer have a zeta potential of opposite polarity. Preferably, the anode composition has a gravimetric specific capacity of at least about 500 mAh/g at a charge/discharge cycling rate of 0.1 C.

A preferred embodiment is directed to an anode composition comprising a silicon core having a surface, wherein the silicon core comprises a silicon particle having a mean diameter in at least one direction of between about 400 nm and about 60 μm; a first layer comprising graphene attached to the surface of the silicon core, wherein the first layer is attached to the surface of the silicon core. Preferably, the anode composition can further comprise a second layer comprising electrochemically active and/or electronically conductive particles attached to and partially covering the first layer, wherein the second layer is attached to the first layer. In a preferred embodiment, the surface of the silicon core and the first layer have a zeta potential of opposite polarity. Preferably, the anode composition has a gravimetric specific capacity of at least about 500 mAh/g at a charge/discharge cycling rate of 0.1 C.

A preferred embodiment is directed to a method of preparing an anode composition comprising combining (a) a suspension of graphite particles in a liquid medium comprising a cationic surfactant and (b) a suspension of the electrochemically active particles in a liquid medium comprising an anionic surfactant, and mixing to form a liquid suspension. Preferably, the graphite particles and electrochemically active particles have zeta potentials of opposite polarity. In a preferred embodiment, the liquid suspension is combined with a liquid suspension of graphene particles in a liquid medium comprising a cationic surfactant and mixed. Preferably, the graphene particles and electrochemically active particles have zeta potentials of opposite polarity. Preferably, the liquid suspension is rinsed, filtered, dried, and/or heat-treated.

A preferred embodiment is directed to a method of preparing an anode composition comprising combining (a) a suspension of silicon particles in a liquid medium comprising an anionic surfactant and (b) a suspension of the graphene particles in a liquid medium comprising a cationic surfactant, and mixing to form a liquid suspension. Preferably, the silicon particles and graphene particles have zeta potentials of opposite polarity. In a preferred embodiment, the liquid suspension is combined with a suspension of electrochemically active particles and/or electronically conductive particles in a liquid medium comprising a cationic surfactant and mixed. Preferably, the graphene particles have a zeta potential of opposite polarity to the electrochemically active particles and/or electronically conductive particles. Preferably, the liquid suspension is rinsed, filtered, dried, and/or heat-treated.

While multiple embodiments are disclosed, still other embodiments of the layered anode compositions may be apparent to those skilled in the art from the following detailed description, which shows and describes illustrative embodiments of the layered anode compositions, anodes and batteries comprising the same, and methods of preparing the layered anode compositions. Accordingly, the figures and detailed description are to be regarded as illustrative in nature and not restrictive.

Figure 1:
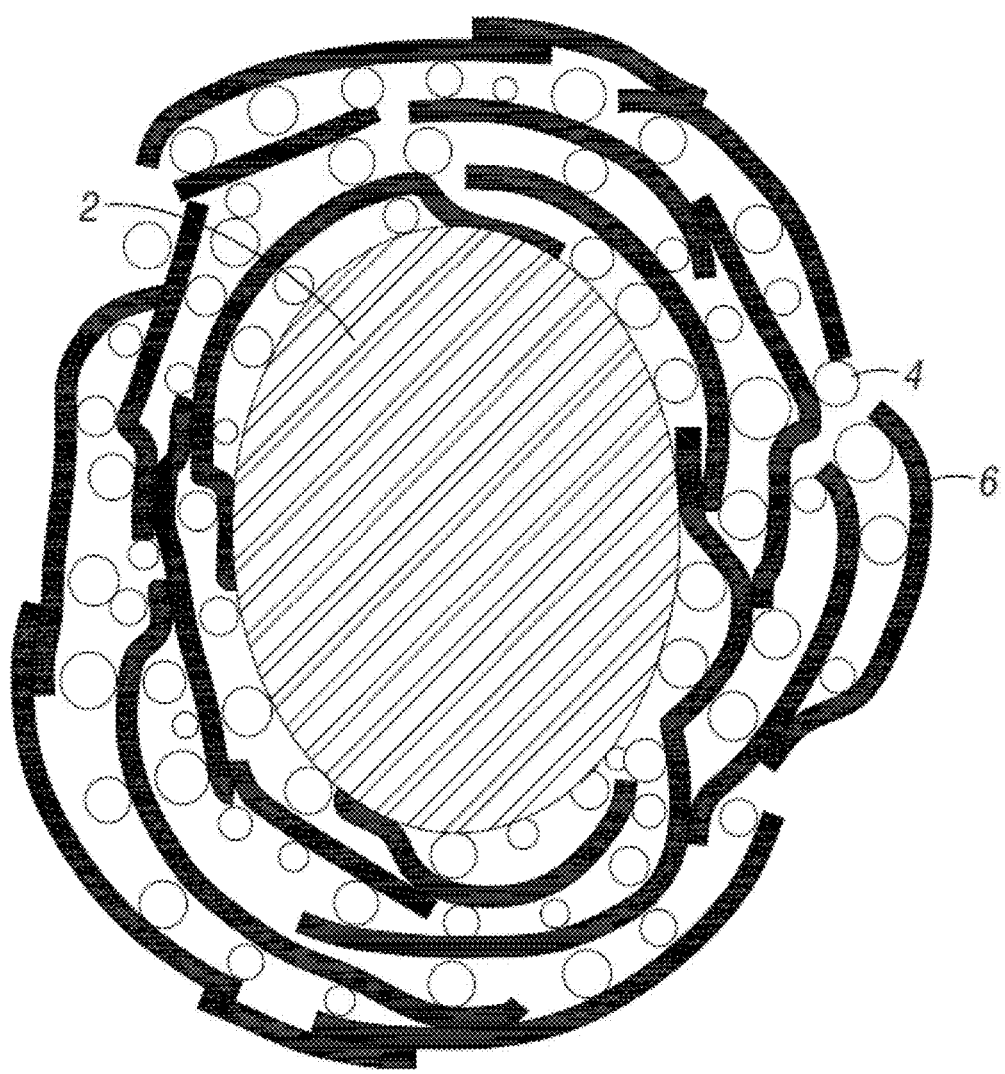
FIG. 1 is a drawing exemplary of a preferred embodiment of the layered anode compositions described herein having a graphite core with silicon as an exemplary electrochemically active component between the graphite-graphene layer and graphene-graphene layers.

Various embodiments of the present invention will be described in detail with reference to the figures, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF PREFERRED EMBODIMENTS

This patent application relates to layered anode compositions (referred to as anode compositions), methods of preparing the layered anode compositions, and batteries including the layered anode compositions. Preferably, the layered anode compositions are of high capacity and suitable for use in lithium ion batteries, sodium ion batteries, and lithium-sulfur batteries, among other batteries. The layering methods provide the ability to layer electronically conductive and electrochemically active constituents over each other to provide higher specific capacity, higher electrical conductivity and higher energy density, and increased stability of the layered composite, while maintaining structural integrity. This structure provides heightened structural integrity, improved capacity and reduced capacity fade over multiple cycles.

There is a need for novel methods to develop graphite anodes incorporating other electrochemically active particles having higher ion storage capacity than graphite, for high performance batteries, in such a way that the integrity and functionality of the anode is not affected by volume changes in the higher capacity electrochemically active particles. This would potentially significantly enhance the capacity, performance, and lifetime of energy storage systems. There is also a need for higher capacity anode compositions in the form of powders with micrometer-size particles, similar in size to commercial graphite particles currently used in anode materials. These micro-powders can then be fabricated into anodes using processes similar to those currently used for making commercial anodes from existing graphite powders. This provides a "drop-in" replacement for existing graphite powders in the anode manufacturing process, whereby the replacement powder, having a new material composition, provides higher charge capacity than the existing graphite powders while being amenable to standard, commercial processing technologies.

Accordingly, it is an objective to provide anode compositions and methods of making the same with electrochemically active species having a concentration of at least about 5 wt. %. It is still a further objective to provide anodes and methods of making the same that have higher capacity and reduced capacity fade over multiple cycles.

The anode compositions as described herein have a core upon which one or more layers are added. The core can be an electrochemically active graphite core particle or one or more other electrochemically active core particles, like silicon particles. Types of core structures and the layering on each is discussed herein and illustrated in the accompanying figures. The figures and descriptions are meant to be exemplary and are not exhaustive of the arrangements of layers possible, which may be varied without departing from the invention.

An advantage of the anode compositions and methods of making the same, which are described herein, is that the high-capacity electrochemically active particles can be well-dispersed and non-agglomerating, while maintaining robust attachment to the electronically conductive particles.

An additional advantage of the anode compositions and methods of making the same is that the anodes comprise a structure in which the integrity and functionality of the electrochemically active particles for high performance batteries can accommodate the effects of volume changes in the electrochemically active (ion-absorbing) component. Thus, the compact architecture, together with high electrochemically active particle loading, can provide a high volumetric and gravimetric capacity in the anode and in a full-cell battery; while the robust structure and the reduction of degradative side reactions can result in excellent capacity retention over hundreds of charge/discharge cycles.

Definitions

So that the present invention may be more readily understood, certain terms are first defined. Unless defined otherwise, all technical and scientific terms used herein have the same meaning as commonly understood by one of ordinary skill in the art to which embodiments of the invention pertain. While many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

All terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾. This applies regardless of the breadth of the range.

References to elements herein are intended to encompass any or all of their oxidative states and isotopes. For example, discussion of silicon can include $Si^{-4}$, $Si^{-3}$, $Si^{-2}$, $Si^{-1}$, $Si^{1}$, $Si^{2}$, $Si^{3}$, or $Si^{4}$ and any of its isotopes, e.g., $^{28}Si$, $^{29}Si$, and $^{30}Si$.

The term "about," as used herein, refers to variation in the numerical quantity that can occur, for example, through typical measuring techniques and equipment, with respect to any quantifiable variable, including, but not limited to, mass, volume, time, distance, voltage, and current. Further, given solid and liquid handling procedures used in the real world, there is certain inadvertent error and variation that is likely through differences in the manufacture, source, or purity of the ingredients used to make the compositions or carry out the methods and the like. The term "about" also encompasses these variations. Whether or not modified by the term "about," the claims include equivalents to the quantities.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

As used herein, the term "anode" refers to a negative electrode, which comprises the anode composition (described more extensively below), a binder, and a current collector foil. As used herein it can comprise additional components as well.

As used herein, the term "anode material" refers to the anode composition (described more extensively below), a binder, and any optional ingredients, but does not include a current collector foil, housing, separator or electrolyte.

As used herein, the term "energy density" refers to the volumetric (often expressed in Wh/L) or gravimetric (often expressed in Wh/kg) energy (Wh or mWh) delivered during charge/discharge of each cycle can be read from the battery tester. Preferably, the energy density is measured after a standard forming cycle protocol for a full-cell battery. The gravimetric energy density or volumetric energy density can be calculated by dividing the energy by the corresponding mass or volume. Sometimes, only the mass or volume of electrode material is considered in the energy density calculation, which more directly measures the material dependent characteristics of the energy density. Sometimes, the mass or volume of other components in a full-cell battery are also included in the energy density calculation. In a full-cell battery, the other components can include a current collector (copper foil for anode, aluminum foil for cathode), a separator, an electrolyte, electrode leads (often nickel for anode and aluminum for cathode), isolating tape, and an aluminum-laminated case or a coin cell case. While these other components are useful to make the cell work they are not contributing to the energy storage, which means they are considered inactive cell components. The energy density obtained if considering all the components in the cell is more near the true performance of the cell in the end application. Minimizing the mass or volume contribution of these components in the cell will enhance the final cell energy density. Thus, throughout this application recitation of the volumetric and/or gravimetric energy density will refer to a battery (which would include the inactive cell components).

Figure 2:
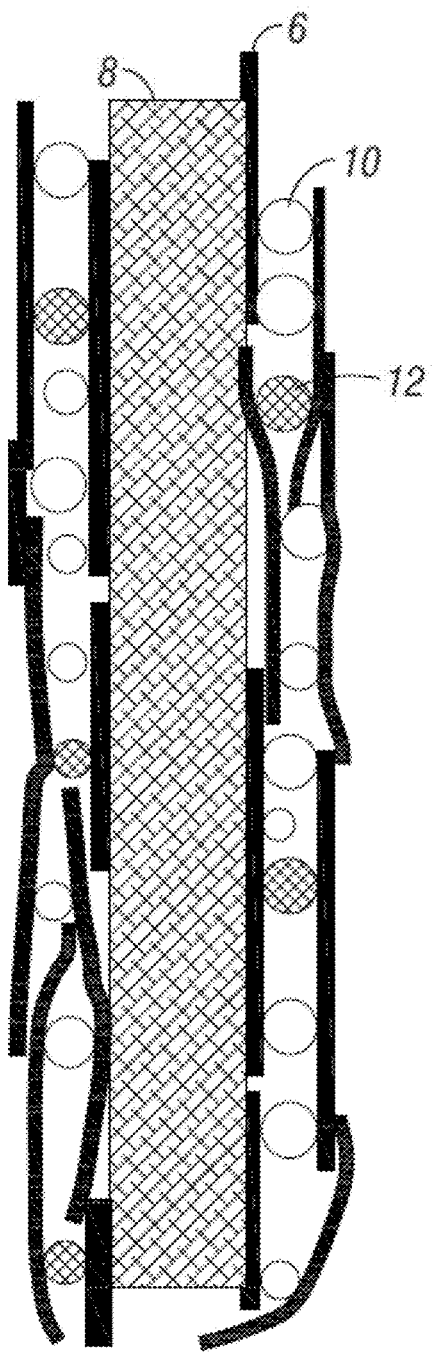
FIG. 2 is a drawing exemplary of a preferred embodiment of the layered anode compositions described herein having a silicon core with graphene-graphene layers incorporating between those layers a mixture of exemplary electrochemically active particles and exemplary electronically conductive particles.

As used herein, the term "layer" refers to a layer of electrochemically active particles, electronically conductive particles, or graphene particles. It is to be understood that a layer can include both electrochemically active particles and electronically conductive particles in embodiments were a mixture is employed; a preferred example of which is a mixture of tin and graphite particles as shown in FIG. 2. To further clarify the use of the term layer, FIGS. 3A-3C can be consulted which demonstrate layers. For example, in FIG. 3A there is a first layer comprising electrochemically active particles attached to the graphite core, a second layer comprising graphene particles, a third layer comprising electrochemically active particles, and a fourth layer comprising graphene particles. Similarly, FIG. 3C provides an example where there is a first layer comprising graphene particles covering a silicon core, a second layer comprising a mixture of electrochemically active particles and electronically conductive particles, and a third layer comprising graphene particles.

As used herein the term "gravimetric specific capacity" refers to the specific capacity of a material based on its mass. The gravimetric specific capacity is often expressed in mAh/g or Ah/g. During cycling with a battery galvanometric tester under designed test protocols, total charge stored/released during charging/discharging can be read from the tester in the unit of mAh. The gravimetric specific capacity can be calculated by dividing the total charge of discharge capacity during each cycle by the mass loading of electrode materials. For example, if a cell is loaded with 1 mg of anode material and shows a capacity of 1 mAh, the specific capacity of this electrode material will be 1 mAh/1mg=1000 mAh/g. In the full-cell test, the gravimetric specific capacity can be calculated based on the loading of anode, cathode, or the total.

As used herein the term "polymer" refers to a molecular complex comprised of more than ten monomeric units and generally includes, but is not limited to, homopolymers, copolymers, such as for example, block, graft, random and alternating copolymers, terpolymers, and higher "x"mers, further including their analogs, derivatives, combinations, and blends thereof. Furthermore, unless otherwise specifically limited, the term "polymer" shall include all possible isomeric configurations of the molecule, including, but are not limited to isotactic, syndiotactic and random symmetries, and combinations thereof. Furthermore, unless otherwise specifically limited, the term "polymer" shall include all possible geometrical configurations of the molecule.

The term "weight percent," "wt. %," "wt-%," "percent by weight," "% by weight," and variations thereof, as used herein, refer to the concentration of a substance as the weight of that substance divided by the total weight of the composition and multiplied by 100.

Anode Compositions

In an embodiment, the anode compositions comprise or consist of double or multilayered composite structures comprised of graphite particles, such as commercially available, anode-grade graphite particles, forming a core, wherein each of the core graphite particles is overlaid with dispersed and attached silicon particles forming a silicon particle layer (see FIG. 5A-C in Example 1); optionally followed by a layer of attached graphene covering the silicon particle layer (see FIGS. 6A and 6B in Example 1); optionally followed by a second layer of dispersed silicon particles attached to the graphene layer; optionally followed by a second graphene layer covering the second silicon layer; optionally followed by a third layer of dispersed silicon particles attached to the second graphene layer; and so on.

The graphite particles typically have mean diameters in at least one direction between about 100 nm and about 50 μm, about 11 m and about 47 μm, about 3 μm and about 45 μm, about 5 m and 43 μm, or between about 10 and about 40 μm, and therefore have limited surface area. Extra surface area provided by the graphene particles permits increased loading of silicon particles in a compact composite architecture. This provides one or more layered buffer zones for expansion and contraction of the silicon particles, which results in a robust electronically conductive network.

Each electrochemically active layer can accommodate up to about 20 wt. % of dispersed and well-separated electrochemically active nanoparticles, depending on the surface area of the core particles. Thus, due to the extra surface area provided by the graphene, high loadings of electrochemically active nanoparticles, such as silicon particles, can be attained in a compact composite architecture that also provides layered buffer zones for expansion and contraction of the electrochemically active particles, while helping to hold them firmly in place.

In an aspect of the compositions, the graphene layers enhance electronic conductivity and connectivity between the electrochemically active particles, e.g. silicon particles, and depress the side reactions from said electrochemically active particles, e.g. the silicon particles that contribute to capacity fade. This layered anode composition is constructed using a surfactant-modulated assembly strategy described in more detail below. Although this architecture might at first seem to imply that each graphene layer is electronically isolated from each other, in practice the graphene layers can be sufficiently flexible that they connect with each other or the graphite core in small regions where the surface is not covered, or is sparsely covered, with electrochemically active particles like silicon, effectively creating a 3-dimensional conductive network. In addition, electronically conducting nanoparticles can be included in the silicon layer to provide additional connections between the electronically conducting layers.

In an embodiment, the anode compositions comprise a double or multilayered composite structure comprised of electrochemically active particles, forming a core, wherein each of the core particles is overlaid with dispersed and attached graphene particles covering the electrochemically active particle core; optionally followed by a second layer of dispersed electrochemically active particles attached to the graphene layer; optionally followed by a second graphene layer covering the second electrochemically active particles layers; optionally followed by a third layer of dispersed electrochemically active particles attached to the second graphene layer; and so on.

A non-limiting example of a preferred embodiment is depicted in FIG. 1 having an electrochemically active graphite core 2 with silicon as exemplary electrochemically active particles (which can be microparticles, nanoparticles, or a combination) 4, wherein the electrochemically active particles are covered by a layer of graphene 6. Thus, the electrochemically active particles 4 are between graphite-graphene layers and graphene-graphene layers. In addition, electronically conducting particles, including but not limited to carbon nanoparticles, carbon nanotubes, tin nanoparticles, copper nanoparticles, silver nanoparticles, iron nanoparticles, aluminum, nanoparticles, zinc nanoparticles, tungsten nanoparticles, combinations and alloys comprised of the same may be dispersed with the silicon particles (or other electrochemically active particles) to provide electrical conductive junction points between the graphite-graphene and/or the graphene-graphene layers.

As demonstrated in FIG. 1, the compact architecture, together with high silicon loading, can provide a high volumetric and gravimetric capacity in the anode and in a full-cell battery; while the robust structure and the reduction of degradative side reactions can result in excellent capacity retention over hundreds of charge/discharge cycles.

Another, non-limiting example of a preferred embodiment of the anode composition according to the invention is depicted in FIG. 2 having a silicon core 8 with graphene layers 6 incorporating between those layers a mixture of electrochemically active particles and electronically conductive particles. In this exemplary figure, tin 12 and graphite 10 are shown, which are both electrochemically active and electronically conductive and which can be microparticles, nanoparticles, or a combination thereof. This is shown as a non-limiting example, other electrochemically active particles and/or electronically conductive particles can also be used in place of either the graphite and tin. In addition, to provide electrical conductive junction points between the graphene-graphene layers, other electronically conducting nanoparticles (some of which may also be electrochemically active) can be dispersed between the graphene layers, including, but not limited to, carbon nanoparticles, carbon nanotubes, tin nanoparticles, copper nanoparticles, silver nanoparticles, iron nanoparticles, aluminum, nanoparticles, zinc nanoparticles, tungsten nanoparticles, combinations and alloys comprised of the same. Electrochemically active nanoparticles which are electronically non-conducting, weakly conducting or semi-conducting (such as silicon), may also be dispersed between the graphene layers, on their own or in combination with electronically conductive nanoparticles, to augment the anode charge capacity in a compact format.

As demonstrated in FIG. 2, the compact architecture, with a silicon core, can provide a high volumetric and gravimetric capacity in the anode and in a full-cell battery; while the robust structure and the reduction of degradative side reactions can result in excellent capacity retention over hundreds of charge/discharge cycles.

Preferably, the anode compositions, and anodes prepared with the anode compositions, can have a gravimetric specific capacity of at least about 500 mAh/g, more preferably at least about 600 mAh/g, still more preferably at least about 700 mAh/g, even more preferably at least about 800 mAh/g, still more preferably at least about 900 mAh/g, and most preferably at least about 1000 mAh/g.

The anode compositions can be prepared in many diverse forms, with many different properties, and for many intended applications. For example, some of the present compositions can form electrodes with improved charge/discharge capacity, rate capability, conductivity, improved number of cycle lifetimes, rechargeability, and reversibility.

In a preferred embodiment, the anode compositions, and anodes prepared with the anode compositions, can have a gravimetric specific capacity at a charge/discharge cycling rate of 0.1 C in the range between 550 mAh/g and 2000 mAh/g, preferably at least about 600 mAh/g, more preferably at least about between 650 mAh/g, still more preferably at least 700 mAh/g, yet more preferably at least about 800 mAh/g, even more preferably at least about 900 mAh/g, and most preferably at least about 1000 mAh/g after performing a suitable forming cycle protocol (as described, for example, in Example 2), and retain more than 80%, or more than 85%, or more than 90%, or more than 95% of their specific capacity over 500 cycles.

The anode compositions and methods of preparing the same, as disclosed herein, have numerous advantages. For example, by thoroughly dispersing silicon particles and then attaching them uniformly on graphite particles, the methods are able to prevent an agglomeration problem. Moreover, by adding layers of silicon sandwiched between graphene-graphene particle layers, the silicon concentration in the anode composition can be greatly increased. For example, the amount of electrochemically active particles attached to the graphite surface can be up to 6 wt. %, up to 8 wt. %, up to 10 wt. %, up to 12 wt. %, or up to about 15 wt. % of the anode compositions or even higher, depending on the surface area of the graphite particle, the size of the electrochemically active particles and degree to which the particles expand during lithiation. Thus, the limit on the loading of electrochemically active particles, such as silicon, resulting from the relatively low surface area of the graphite particles (often between about 1-5 $m^2/g$) can be increased without compromising the well-separated distribution of nanoparticles by layering the electrochemically active particles between carbon particle layers.

The components in the present electrode compositions can be selected based upon their stability, solubility, thermophysical, electrical, mechanical, size, and zeta potential (for example, surface charge) properties.

Core

The anode compositions comprise a core as described above. The core is at least electrochemically active and may also be electronically conductive. Thus, it preferably comprises one or more electrochemically active particles. Those particles may also be both electrochemically active and electronically conductive, such as graphite or tin. Preferred core particles comprise graphite or silicon. Preferably the core has a mean diameter in at least one direction of between about 100 nm and about 50 μm, about 1 m and about 47 μm, about 3 m and about 45 μm, about 5 m and 43 μm, or between about 10 and about 40 μm. Preferably the core is between about 50 wt. % and about 95 wt. % of the anode composition, more preferably between about 60 wt. % and about 90 wt. % of the anode composition, most preferably between about 70 wt. % and about 90 wt. % of the anode composition.

Conductive Particles

The anode compositions comprise conductive particles, which are electronically conductive (conduct electrons). Preferred conductive particles include carbon particles. Other conductive particles can also be included with or without carbon particles. In some cases, the conductive particles also possess electrochemically active functionality.

In an embodiment of the invention, microscale carbon particles can form a core of the compositions, preferably graphite microparticles (which are also electrochemically active). In some embodiments, electronically conductive nanoparticles can be included between layers to promote electrical conductivity. Such nanoparticles can include, but are not limited to, carbon nanoparticles. Furthermore, in a preferred embodiment, conductive particles can be incorporated in the binder to increase the electrical conductivity of the binder material, which is typically electronically insulating.

When not forming a core, it is preferred that the conductive particles are nanoparticles or submicron particles. In an embodiment comprising silicon particles as an electrochemically active interlayer component, it is preferred that the conductive particles have a diameter similar to, or somewhat larger than the silicon particles. If included in the compositions, the conductive particles are preferably added with the silicon layers. Preferred conductive particles include, but are not limited to, materials with a metallic conductivity. In a preferred embodiment, the conductive particles can be nanoscale. Most preferably, they have a diameter that is similar to the diameter of the silicon, or other electrochemically active, particle.

Many forms of carbon nanoparticles are suitable as conductive particles for use in the present compositions, including, but not limited to, carbon black, activated carbon nanoparticles, carbon foam particles, porous carbon nanoparticles, carbon nanotubes, fullerenes, graphite, graphene particles, nanofibers, and combinations thereof. Preferred carbon particles, include, but are not limited to, carbon black, carbon nanotubes, graphene particles, graphite particles, and combinations thereof. These carbon particles can be dispersed with the silicon (or other electrochemically active) particles, together or sequentially, and attached to the graphite to increase the number of electronically conductive connections between graphite-graphene and/or graphene-graphene layers. In some embodiments, the carbon particles can be coated and/or functionalized.

In an aspect of the anode compositions and methods of preparing the same, the graphite particles can form a core of the anode composition. The graphite particles can be of any shape; for example, spherical, "potato", and/or irregular. Preferably the graphite particles are microparticles. Most preferably the graphite particles comprise microparticles with a diameter between about 1 μm and about 50 μm, more preferably between about 5 μm and about 40 μm. Preferably the graphite particles have a gravimetric specific capacity greater than 300 mAh/g and first cycle coulombic efficiency over 80%, 85%, 90% or 95%.

In an aspect of the anode compositions and methods of preparing the same, the graphene particles can form one or more layers in the anode composition. Preferably the graphene particles are exfoliated as single layer, bilayer and/or multilayer graphene. The graphene particles can be a single layer, bilayer or multilayer graphene, graphene oxide, reduced graphene oxide, and/or other functionalized graphenes. Multilayer graphene may sometimes be in the form of nano-graphite. The graphene particles can be of any essentially 2D, sheet-like or plate-like shape. Preferably the graphene particles have micrometer dimensions in the planar directions (x, y axes) and nanometer dimensions in the thickness direction (z-axis). Most preferably the graphene particles comprise nanoparticles with at least one dimension between about 1 and 10 nm and the other 2 directions between about 1 μm and 50 μm.

The carbon nanotube particles in the anode compositions can also encapsulate other elements and/or molecules within their enclosed tubular structures. Such elements include silver, copper, gold, aluminum, beryllium zinc, molybdenum, lithium, tungsten, nickel, iron palladium, platinum, tin. Such molecules include alloys of these elements such as alloys of cobalt with S, Br, Ph, Pt, Y, Cu, B, and Mg, and compounds such as carbides such as TiC and MoC. The presence of these elements, alloys and compounds within the core structure of the nanotubes can enhance the various properties, such as thermal and/or electrical conductivity.

Preferred metal particles include, but are not limited to, lanthanides (for example, lanthanum, cerium, praseodymium, neodymium, promethium, samarium, europium, gadolinium, terbium, dysprosium, holmium, erbium, thulium, ytterbium, and lutetium), silver, copper, aluminum, cobalt, magnesium, zinc, vanadium, manganese, niobium, iron, nickel, titanium, zirconium, tin, other rare earth metals such as scandium and yttrium, and combinations and alloys of the aforementioned metals with each other and/or metal oxides, which have electronically conductive properties greater than $>10^{-3}$ S/m. In some embodiments, preferred metal particles, include, but are not limited to, Nd, B, Fe, Nd, Sn, and combinations thereof.

When incorporated into the compositions, conductive particles are preferably between about 0.05 wt. % and 25 wt. % of the anode composition, more preferably between about 0.05 wt. % and 15 wt. % of the anode composition, still more preferably between about 0.1 wt. % and about 10 wt. %, and most preferably between about 0.5 wt. % and 5 wt. % of the anode composition.

Electrochemically Active Particles

The anode compositions comprise electrochemically active particles. As used herein, the term "electrochemically active particles" or any variations thereof refers to particles with a structure that can reversibly take-up and conduct ions, typically via intercalation or conversion mechanisms, during electrical charge and discharge. Electrochemically active particles can also be electronically conductive, i.e. they can conduct electrons as well as ions. For example, tin (Sn) can both take-up ions and conduct electrons. The electrochemically active particles can be microparticles and/or nanoparticles. When used as a layer it is preferred that the electrochemically active particles are nanoparticles (which can include submicron particles). Preferred electrochemically active particles, include, but are not limited to, electrochemically active metals, metalloids, metal oxides, transition metal sulfides, transition metal nitrides, transition metal phosphides, transition metal fluorides, oxyhydrides, graphite particles, silicon particles, tin particles, and mixtures thereof. Most preferred electrochemically active particles include graphite particles, silicon particles, tin particles or a mixture thereof. In a preferred embodiment where the core is graphite, the electrochemically active particles comprise silicon. In a preferred embodiment where the core is silicon, the electrochemically active particles comprise graphite.

The silicon metalloid particles can be in a number of forms, including amorphous structures, crystal structures and/or complexes with metals and/or other metalloids. Preferred metalloids include silicon, germanium, and combinations or alloys thereof. Preferred silicon particles include, but are not limited to, silicon, a silicate, a silicide, a silicon oxide, and silicon alloys. Preferred silicon alloys include, but are not limited to, silicon alloys with iron, zinc, magnesium, tin, aluminum, calcium, cobalt, nickel, manganese, copper, and boron. Non-limiting examples of such alloys include, but are not limited to, $Mg_2Si$, $Si_{66}Sn_{34}$, $Si_{75}Al_{25}$, $FeSi_2$, $CaSi_2$, $CoSi_2$, $NiSi_2$, $SiB_3$, $SiMn_x$. Silicon alloys are not limited to two-element alloys, but rather can contain multiple elements. Non-limiting examples of such alloys can include, Si—Ti—N—C, Si—Zn—C, Si—Al—Sn, Si—Al—Mn, Si—Sn—C, Ni—Sn—Si—Al—C, or alloys including even more elements. Preferred silicon complex is a lithium-silicon complex. In some embodiments, of the invention, the lithium silicon complexes are formed during the electrochemical cycling. Preferred lithiated silicons include, but are not limited to, $Li_xSi_y$ where x is any number between 7 and 22 and y is any number between 3 and 16. Preferred lithiated silicon include, but are not limited to, $Li_{12}Si_7$, $Li_{14}Si_{16}$, $Li_{14}Si_6$, $Li_{15}Si_4$, $Li_{22}Si_5$, $Li_{14}Si_4$, $Li_{13}Si_4$, $Li_7Si_3$, and combinations thereof. The lithiated silicon can be pre-lithiated silicon by chemical lithiation and/or electrochemical lithiation.

Suitable electrochemically active metals include, but are not limited to, magnesium, silver, zinc, aluminum, tin, lead, antimony, bismuth, and alloys and combinations thereof. More preferably, electrochemically active metals include, but are not limited to, magnesium, silver, tin, zinc, aluminum, alloys and combinations thereof.

Suitable electrochemically active metal oxides include, but are not limited to, iron oxides (including $Fe_2O_3$, $Fe_3O_4$, and FeO), manganese oxide (including $Mn_2O_3$, $Mn_3O_4$, $MnO_2$, and MnO), cobalt oxide (including CoO and $Co_3O_4$), copper oxide (including CuO and $Cu_2O$), nickel oxide (including NiO), molybdenum oxide (including $MoO_3$ and $MoO_2$), zinc oxide (including ZnO), ruthenium oxide (including $RuO_2$), chromium oxide (including $Cr_2O_3$), tungsten oxide (including $WO_3$), and mixed transition metal oxides. Preferred mixed transition metal oxides include, but are not limited to spinel structured oxide having the formula $A_xB_{3-x}O_4$. Preferred spinal structured oxides include, but are not limited to, ferrites ($AFe_2O_4$ where A is Mn, Co, Ni, Cu, Zn, Mg and/or Ca), manganites ($AMn_2O_4$ where A is Co, Ni, and/or Zn), and cobaltites ($ACo_2O_4$ where A is Fe, Mn, Cu, Ni, and/or Zn).

Suitable electrochemically active transition metal sulfides include, but are not limited to, CrS, MnS, $FeS_2$, FeS, $CoS_2$, $NiS_2$, NiS, $Ni_3S_2$, CuS, $Cu_2S$, $MoS_2$, $WS_2$, and mixtures thereof.

Suitable electrochemically active transition metal nitrides include, but are not limited to, CrN, $Fe_3N$, CoN, $Co_3N$, $Ni_3N$, $Cu_3N$, and mixtures thereof.

Suitable electrochemically active transition metal phosphides include, but are not limited to, $MnP_4$, $FeP_2$, FeP, $CoP_3$, $NiP_3$, $NiP_2$, $CuP_2$, $Cu_3P$, and mixtures thereof.

Suitable electrochemically active transition metal fluorides include, but are not limited to, $TiF_3$, $VF_3$, $CrF_3$, $FeF_3$, $CoF_2$, $NiF_2$, $CuF_2$, and mixtures thereof.

Suitable electrochemically active oxyhydrides include, but are not limited to, FeOOH, In some embodiments, the electrochemically active particles can be coated and/or functionalized.

Modification of the electrochemically active particles by coating and/or functionalization can aid with the layering process. For example, the surface charge (Zeta Potential) of silicon particles could be made more negative through proper surface modifications, further facilitating its attachment on carbon surfaces. In addition, modified electrochemically active particles may improve the battery performance through reduction of side-reaction with electrolyte and stabilized solid-electrolyte interphase (SEI). For example, it is known that fresh silicon surfaces may be terminated with Si—H function group, which can be used to react with organic compounds containing a terminal unsaturated carbon-carbon bond to form a Si—C linked monolayer (hydrosilylation process). However, most of the silicon particles may have a native SiOx layer with hydroxyl terminated surface, depending on their exposure time to air. One of the commonly used methods to modify the SiOx surface is through silanization with different chemicals including 3-aminopropyltriethoxysilane (APTES), (3-aminopropyl)-dimethylethoxysilane (APDMES), N-(2-aminoethyl)-3-aminopropyltrimethoxysilane (AEAPS), 3-aldehydepropyltrimethoxysilane (APMS), mercaptopropyltrimethoxysilane (MPTMS), mercaptopropyltriethoxysilane (MPTES), biotin 4-nitrophenyl ester (BNPE), 11-hydroxyundecyl-phosphonate (HUP), etc. The negatively charged nature of the SiOx surface on silicon can also be electrostatically modified with positively charged polymers (polycations).

In a preferred embodiment of the anode compositions, the electrochemically active particles can be between about 1 wt. % and 90 wt. % of the anode composition, preferably between about 5 wt. % and about 85 wt. % of the anode composition, more preferably between about 10 wt. % and 75 wt. % of the anode composition, still more preferably between about 10 wt. % and about 65 wt. % of the anode composition, and most preferably between about 12 wt. % and 50 wt. % of the anode composition.

Surfactant

The methods and compositions disclosed herein can comprise a surfactant. Preferred surfactants include amphoteric surfactants, anionic surfactants, cationic surfactants, non-ionic surfactants, zwitterionic surfactants, and mixtures thereof. Surfactants can be included in the compositions for their dispersive effect to assist in dispersing various components of the compositions. Further, in some embodiments of the invention, the surfactants can attach and orient various components by attracting a component with a charged head region and/or hydrophobic tail region.

In some embodiments, a combination of surfactants can include anionic, cationic, nonionic, zwitterionic, amphoteric, and ampholytic surfactants, so long as there is a net positive or negative charge in the head regions of the population of surfactant molecules. In many instances, a single negatively charged or positively charged surfactant is used in the preparation of the present electrode compositions.

In other embodiments, weakly charged or nonionic surfactants can be employed so long as they provide a dispersive effect.

In a preferred embodiment, the surfactant molecules attach to the surface of the graphite particles forming a graphite core. While not wishing to be bound by the theory, it is believed that this attachment occurs by hydrophobic interaction, providing a net positive or net negative charge to the graphite particles. Preferably, the surfactant provides a positively charged surface to the carbon particles when the particles to be attached to them have a net negative charge. Preferably, a solution containing a cationic surfactant is then prepared and mixed with the graphite particles.

A surfactant can also be used to assist in the dispersion of the electrochemically active particles and/or conductive particles. In such an embodiment, the surfactant can be added to the electrochemically active particles and/or conductive particles and mixed to form a suspension. Thus, the association of the surfactant to the electrochemically active particles and/or conductive particles creates a dispersive effect between the particles to achieve a well-dispersed suspension of silicon particles, metalloid particles, and/or conductive particles. And thereby reducing, or more preferably preventing, agglomeration of the particles. The surfactant may also be used to change the charge polarity and/or the magnitude of the charge on the particle to enable or facilitate electrostatic attraction to the surface of the core material or preceding layer (e.g. graphene).

A surfactant can also be used to assist in the dispersion of a graphene layer. In such an embodiment, the surfactant can be added to a surfactant solution and mixed. Thus, the association of the surfactant to graphene particles creates a dispersive effect between the particles to achieve a well-dispersed solution of graphene particles, and thereby reducing, or more preferably preventing, agglomeration of the particles. The surfactant may also be used to change the charge polarity and/or the magnitude of the charge on the graphene particle to enable or facilitate electrostatic attraction to the surface of the core material or to the surface of the single or multilayer composite material (e.g. a core particle with one or more electrochemically active and/or conductive nanoparticle layer). In an aspect of the invention, the association, dispersion, and attachment of various components by the surfactant can be affected, or controlled, by modification to the pH to adjust the zeta potential of the components.

Amphoteric Surfactants

A surfactant used in preparation of the anode compositions can be amphoteric. Examples of suitable amphoteric surfactants include ammonium or substituted ammonium salts of alkyl amphocarboxy glycinates and alkyl amphocarboxypropionates, alkyl amphodipropionates, alkyl amphodiacetates, alkyl amphoglycinates, and alkyl amphopropionates, as well as alkyl iminopropionates, alkyl iminodipropionates, and alkyl amphopropylsulfonates. Specific examples are cocoamphoacetate, cocoamphopropionate, cocoamphodiacetate, lauroamphoacetate, lauroamphodiacetate, lauroamphodipropionate, lauroamphodiacetate, cocoamphopropyl sulfonate, caproamphodiacetate, caproamphoacetate, caproamphodipropionate, and stearoamphoacetate.

Anionic Surfactants

Preferred anionic surfactants include, but not limited to, sulfonates such as alkyl sulfonates, alkylbenzene sulfonates, alpha olefin sulfonates, paraffin sulfonates, and alkyl ester sulfonates; sulfates such as alkyl sulfates, alkyl alkoxy sulfates, and alkyl alkoxylated sulfates; phosphates such as monoalkyl phosphates and dialkyl phosphates; phosphonates; carboxylates such as fatty acids, alkyl alkoxy carboxylates, sarcosinates, isethionates, and taurates. Specific examples of carboxylates are sodium oleate, sodium cocoyl isethionate, sodium methyl oleoyl taurate, sodium laureth carboxylate, sodium trideceth carboxylate, sodium lauryl sarcosinate, lauroyl sarcosine, and cocoyl sarcosinate. Specific examples of sulfates include sodium dodecyl sulfate (SDS), sodium lauryl sulfate, sodium laureth sulfate, sodium trideceth sulfate, sodium tridecyl sulfate, sodium cocyl sulfate, and lauric monoglyceride sodium sulfate.

Suitable sulfonate surfactants include, but are not limited to, alkyl sulfonates, aryl sulfonates, monoalkyl and dialkyl sulfosuccinates, isethionates, and monoalkyl and dialkyl sulfosuccinamates. Each alkyl group independently contains about two to twenty carbons and can also be ethoxylated with up to about 8 units, preferably up to about 6 units, on average, for example, 2, 3, or 4 units, of ethylene oxide, per each alkyl group. Illustrative examples of alky and aryl sulfonates are sodium tridecyl benzene sulfonate (STBS) and sodium dodecylbenzene sulfonate (SDBS).

Illustrative examples of sulfosuccinates include, but are not limited to, dimethicone copolyol sulfosuccinate, diamyl sulfosuccinate, dicapryl sulfosuccinate, dicyclohexyl sulfosuccinate, diheptyl sulfosuccinate, dihexyl sulfosuccinate, diisobutyl sulfosuccinate, dioctyl sulfosuccinate, C12-15 pareth sulfosuccinate, cetearyl sulfosuccinate, cocopolyglucose sulfosuccinate, cocoyl butyl gluceth-10 sulfosuccinate, deceth-5 sulfosuccinate, deceth-6 sulfosuccinate, dihydroxyethyl sulfosuccinylundecylenate, hydrogenated cottonseed glyceride sulfosuccinate, isodecyl sulfosuccinate, isostearyl sulfosuccinate, laneth-5 sulfosuccinate, laureth sulfosuccinate, laureth-12 sulfosuccinate, laureth-6 sulfosuccinate, laureth-9 sulfosuccinate, lauryl sulfosuccinate, nonoxynol-10 sulfosuccinate, oleth-3 sulfosuccinate, oleyl sulfosuccinate, PEG-10 laurylcitrate sulfosuccinate, sitosereth-14 sulfosuccinate, stearyl sulfosuccinate, tallow, tridecyl sulfosuccinate, ditridecyl sulfosuccinate, bisglycol ricinosulfosuccinate, di(1,3-di-methylbutyl)sulfosuccinate, and silicone copolyol sulfosuccinates.

Illustrative examples of sulfosuccinamates include, but are not limited to, lauramido-MEA sulfosuccinate, oleamido PEG-2 sulfosuccinate, cocamido MIPA-sulfosuccinate, cocamido PEG-3 sulfosuccinate, isostearamido MEA-sulfosuccinate, isostearamido MIPA-sulfosuccinate, lauramido MEA-sulfosuccinate, lauramido PEG-2 sulfosuccinate, lauramido PEG-5 sulfosuccinate, myristamido MEA-sulfosuccinate, oleamido MEA-sulfosuccinate, oleamido PIPA-sulfosuccinate, oleamido PEG-2 sulfosuccinate, palmitamido PEG-2 sulfosuccinate, palmitoleamido PEG-2 sulfosuccinate, PEG-4 cocamido MIPA-sulfosuccinate, ricinoleamido MEA-sulfosuccinate, stearamido MEA-sulfosuccinate, stearyl sulfosuccinamate, tallamido MEA-sulfosuccinate, tallow sulfosuccinamate, tallowamido MEA-sulfosuccinate, undecylenamido MEA-sulfosuccinate, undecylenamido PEG-2 sulfosuccinate, wheat germamido MEA-sulfosuccinate, and wheat germamido PEG-2 sulfosuccinate.

Some examples of commercial sulfonates are AEROSOL® OT-S, AEROSOL® OT-MSO, AEROSOL® TR70% (Cytec Inc., West Paterson, N.J.), NaSul CA-HT3 (King Industries, Norwalk, Conn.), and C500 (Crompton Co., West Hill, Ontario, Canada). AEROSOL® OT-S is sodium dioctyl sulfosuccinate in petroleum distillate. AEROSOL® OT-MSO also contains sodium dioctyl sulfosuccinate. AEROSOL® TR70% is sodium bistridecyl sulfosuccinate in mixture of ethanol and water. NaSul CA-HT3 is calcium dinonylnaphthalene sulfonate/carboxylate complex. C500 is an oil soluble calcium sulfonate.

Alkyl or alkyl groups refers to saturated hydrocarbons having one or more carbon atoms, including straight-chain alkyl groups (for example, methyl, ethyl, propyl, butyl, pentyl, hexyl, heptyl, octyl, nonyl, decyl, and so on), cyclic alkyl groups (or cycloalkyl or alicyclic or carbocyclic groups) (for example, cyclopropyl, cyclopentyl, cyclohexyl, cycloheptyl, cyclooctyl, and so on), branched-chain alkyl groups (for example, isopropyl, tert-butyl, sec-butyl, isobutyl, and so on), and alkyl-substituted alkyl groups (for example, alkyl-substituted cycloalkyl groups and cycloalkyl-substituted alkyl groups).

Alkyl can include both unsubstituted alkyls and substituted alkyls. Substituted alkyls refers to alkyl groups having substituents replacing one or more hydrogens on one or more carbons of the hydrocarbon backbone. Such substituents can include, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl or aromatic (including heteroaromatic) groups.

In some embodiments, substituted alkyls can include a heterocyclic group. Heterocyclic groups include closed ring structures analogous to carbocyclic groups in which one or more of the carbon atoms in the ring is an element other than carbon, for example, nitrogen, sulfur or oxygen. Heterocyclic groups can be saturated or unsaturated. Exemplary heterocyclic groups include, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran and furan.

For an anionic surfactant, the counter ion is typically sodium but can alternatively be potassium, lithium, calcium, magnesium, ammonium, amines (primary, secondary, tertiary or quandary) or other organic bases. Exemplary amines include isopropylamine, ethanolamine, diethanolamine, and triethanolamine. Mixtures of the above cations can also be used.

Cationic Surfactants

Preferred cationic surfactants include, but are not limited to, pyridinium-containing compounds, and primary, secondary tertiary or quaternary organic amines. For a cationic surfactant, the counter ion can be, for example, chloride, bromide, methosulfate, ethosulfate, lactate, saccharinate, acetate and phosphate. Examples of cationic amines include polyethoxylated oleyl/stearyl amine, ethoxylated tallow amine, cocoalkylamine, oleylamine and tallow alkyl amine, as well as mixtures thereof.

Examples of quaternary amines with a single long alkyl group are cetyltrimethyl ammonium bromide (CTAB), benzyldodecyldimethylammonium bromide (BddaBr), benzyldimethylhexadecylammonium chloride (BdhaC1), dodecyltrimethyl ammonium bromide, myristyl trimethyl ammonium bromide, stearyl dimethyl benzyl ammonium chloride, oleyl dimethyl benzyl ammonium chloride, lauryl trimethyl ammonium methosulfate (also known as cocotrimonium methosulfate), cetyl-dimethyl hydroxyethyl ammonium dihydrogen phosphate, bassuamidopropylkonium chloride, cocotrimonium chloride, distearyldimonium chloride, wheat germ-amidopropalkonium chloride, stearyl octyidimonium methosulfate, isostearaminopropal-konium chloride, dihydroxypropyl PEG-5 linoleammonium chloride, PEG-2 stearmonium chloride, behentrimonium chloride, dicetyl dimonium chloride, tallow trimonium chloride and behenamidopropyl ethyl dimonium ethosulfate.

Examples of quaternary amines with two long alkyl groups are didodecyldimethylammonium bromide (DDAB), distearyldimonium chloride, dicetyl dimonium chloride, stearyl octyldimonium methosulfate, dihydrogenated palmoylethyl hydroxyethylmonium methosulfate, dipalmitoylethyl hydroxyethylmonium methosulfate, dioleoylethyl hydroxyethylmonium methosulfate, and hydroxypropyl bis-stearyldimonium chloride.

Quaternary ammonium compounds of imidazoline derivatives include, for example, isostearyl benzylimidonium chloride, cocoyl benzyl hydroxyethyl imidazolinium chloride, cocoyl hydroxyethylimidazolinium PG-chloride phosphate, and stearyl hydroxyethylimidonium chloride. Other heterocyclic quaternary ammonium compounds, such as dodecylpyridinium chloride, amprolium hydrochloride (AH), and benzethonium hydrochloride (BH) can also be used.

Zwitterionic Surfactants

A surfactant used in preparation of the anode compositions can be zwitterionic, having both a formal positive and negative charge on the same molecule. The positive charge group can be quaternary ammonium, phosphonium, or sulfonium, whereas the negative charge group can be carboxylate, sulfonate, sulfate, phosphate or phosphonate. Similar to other classes of surfactants, the hydrophobic moiety can contain one or more long, straight, cyclic, or branched, aliphatic chains of about 8 to 18 carbon atoms. Specific examples of zwitterionic surfactants include alkyl betaines such as cocodimethyl carboxymethyl betaine, lauryl dimethyl carboxymethyl betaine, lauryl dimethyl alpha-carboxyethyl betaine, cetyl dimethyl carboxymethyl betaine, lauryl bis-(2-hydroxyethyl)carboxy methyl betaine, stearyl bis-(2-hydroxypropyl)carboxymethyl betaine, oleyl dimethyl gamma-carboxypropyl betaine, and lauryl bis-(2-hydroxypropyl)alphacarboxy-ethyl betaine, amidopropyl betaines; and alkyl sultaines such as cocodimethyl sulfopropyl betaine, stearyidimethyl sulfopropyl betaine, lauryl dimethyl sulfoethyl betaine, lauryl bis-(2-hydroxyethyl)sulfopropyl betaine, and alkylamidopropylhydroxy sultaines.

In the methods and compositions, the surfactant is added to the compositions as a weight percentage of the solids in the suspension. In one embodiment, the surfactant is present in an amount between about 0.01 wt. % and 10 wt. % of the weight of particles to be dispersed and attached by the surfactant. In another embodiment, the surfactant is present in an amount between about 0.1 wt. % and 5 wt. % of the weight of particles. In yet another embodiment, the surfactant is added in an amount between about 0.5 wt. % and 3 wt. % of the weight of particles. In an aspect of the methods, the excess surfactant, if any, is mostly washed and/or rinsed away such that only the minimal amount needed to attach the particles is in the anode compositions, preferably leaving only those surfactant molecules that are robustly attached to the surface of one or more particles remain. Thus, in the anode composition, after rinsing the excess surfactant and optionally drying the anode composition, the anode compositions contain less than about 1 wt. %, preferably less than about 0.5 wt. %, more preferably less than about 0.1 wt. %, and most preferably less than about 0.05 wt. % of the surfactant.

In addition to, or as an alternative to, rinsing and filtration, the surfactants, once they have assembled the particle layer or layers, may be decomposed or carbonized by applying a heat treatment under inert atmosphere at elevated temperature. The temperature range will be determined by the decomposition temperature of the surfactant in the composite, most of which will be in the range of about 200° C. to about 500° C. Higher temperature can also be applied to improve the degree of graphitization of the carbon. In an embodiment, where the anode composition is heat-treated, it is preferably heat-treated for at least about 1 minute, 10 minutes, 15 minutes, 20 minutes, 30 minutes 45 minutes, 60 minutes, 90 minutes, 2 hours, 3 hours, 6 hours, 12 hours or about 24 hours. In a preferred embodiment, the anode composition is heat treated for between about 1 minute and about 2 hours, more preferably between about 10 minutes and about 90 minutes, still more preferably between about 15 minutes and about 60 minutes. Beneficially, the resulting carbon layer over the electrode material can improve electrode conductivity, increase the binding strength of the attached materials, and can also enhance the quality of the SEI layer on the silicon, graphite and/or other electrochemically active particles. The carbon layer thickness on the particle can be controlled by the surfactant amount. Other types of carbon precursor can also be added to further increase the carbon content, including but not limited to citric acid, pitch, glucose and other sugars.

pH

The charge characteristics of particle surfaces, as measured for example by zeta potential, can be highly dependent on pH values. Thus, adjustment of pH can affect the zeta potential and thereby facilitate or enable the dispersion and attachment of the electrochemically active and/or electronically conductive particles, and surfactant properties. In one embodiment, if the surfactant(s) have a net negative charge, the pH of any of the particle suspension fluids (e.g., graphene suspension, graphite suspension, silicon suspension) is greater than about 2.0, 2.1, 2.2, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, or 6.5. In another embodiment, if the surfactant(s) have a net positive charge, the pH of the particle suspension fluid is less than about 10, 9.9, 9.8, 9.7, 9.6, 9.5, 9.4, 9.3, 9.2, 9.1, 9.0, 8.9, 8.8, 8.7, 8.6, 8.5, 8.4, 8.3, 8.2, 8.1, 8.0. 7.9, 7.8, 7.7, 7.6, 7.5, 7.4, 7.3, 7.2, 7.1 7.0 6.9, 6.8, 6.7, 6.6, 6.5, 6.4, 6.3, 6.2, 6.1, 6.0, 5.9, or 5.8. In a preferred embodiment comprising graphite, the pH is less than 6. In a preferred embodiment comprising silicon, the pH is greater than about 4 and less than about 7.

In some embodiments, the suspensions comprising a surfactant and electrochemically active and/or electronically conductive particles, and the methods of preparing the same, electrochemically active particles and the conductive particles have an isoelectric point ($i_{ep}$), which refers to the pH value of a fluid containing the electrochemically active particles and/or the conductive particles at which the electrochemically active particles and/or the conductive particles exhibit a neutral surface charge. Thus, depending on the components used, the pH can be manipulated, using alkaline or acidic buffers, to the point of zero charge or to increase strength of a charge, or to change the polarity of the charge. According to a preferred method, this manipulation and/or selection of components based on pH is done so as to increase the positive or negative charge of the electrochemically active particles and/or the conductive particles in the suspension, with or without the presence of surfactant. Thus, the pH can be used to manipulate charge characteristics of the suspension ingredients used in each layer. Similarly, components (e.g., the surfactant, electrochemically active particle species, and/or electronically conductive particle species) can be selected based on a particular pH to provide desired charge characteristics of the ingredients in each layer.

The pH range and the $i_{ep}$ can vary for various embodiments of the invention without departing from the scope of the invention based on the components added or the pH desired. For example, silicon particles and nanoparticles can have an $i_{ep}$ in at least the pH range of 1 to 5, affected by the details of the particle surface chemistry and the suspension medium. In an embodiment employing silicon where the $i_{ep}$ is, for example, about 3.5, the pH should be significantly greater than 3.5, if a negative zeta potential is required, and should preferably be in the range 4 to 7, at least for the steps including layering of silicon on a positively charged surface.

Figure 21:
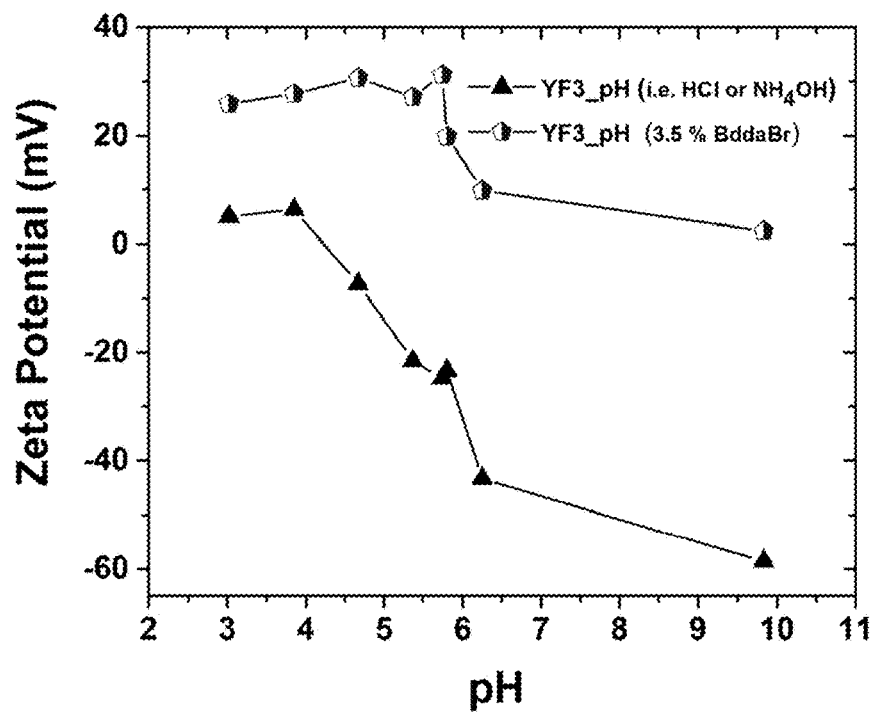
FIG. 21 is a graph from Example 10 showing the effect of pH and the presence of a cationic surfactant benzyldimethyldodecylammonium bromide (BddaBr) on the zeta potential (mV) on graphite particles.
Figure 22:
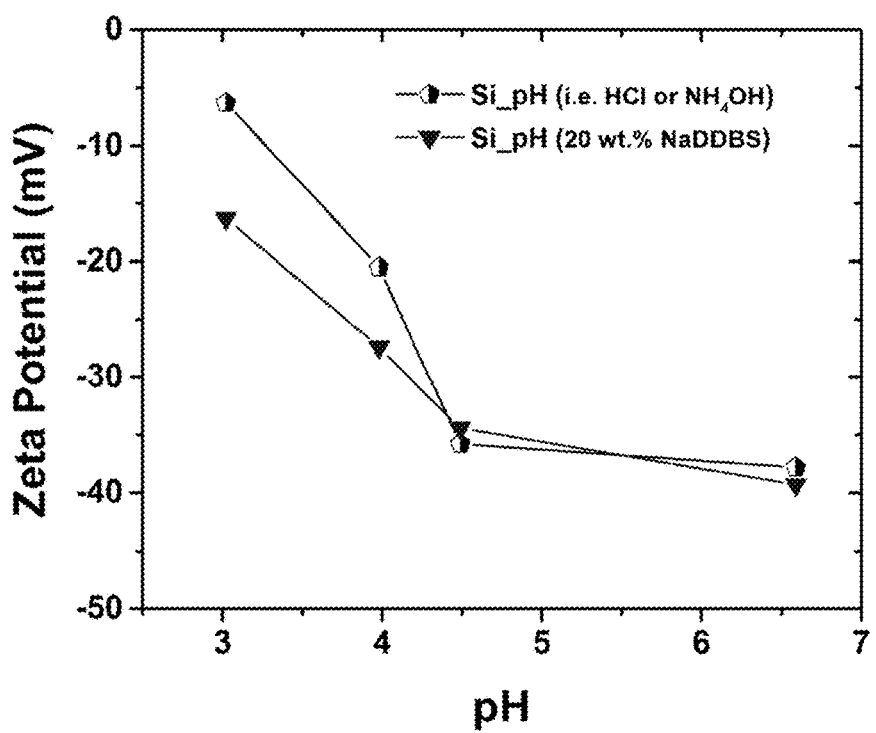
FIG. 22 is a graph from Example 10 showing the effect of pH and the presence of an anionic surfactant sodium dodecylbenzene sulfonate (NaDDBS) on the zeta potential (mV) on silicon particles suspended in deionized water.
Figure 23:
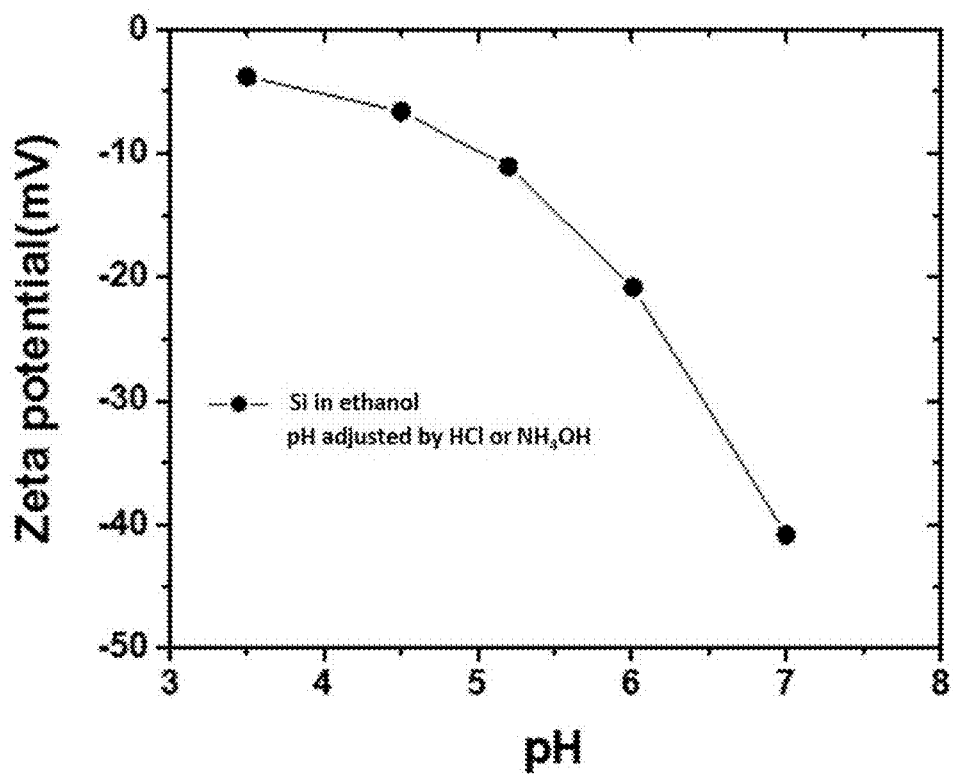
FIG. 23 is a graph from Example 10 showing the effect of the suspension medium on the zeta potential (mV) on silicon particles suspended in ethanol over changing pH.

In a preferred embodiment comprising graphite in which a high positive surface charge is desired, the pH may be less than 6 since, as seen in FIG. 21 (Example 10), the positive charge of the graphite core particle (YF3) with 3.5 wt. % cationic surfactant, benzyldodecyldimethylammonium bromide (BddaBr), per graphite content in deionized water decreases at higher pH values. It can also be observed that without the BddaBr surfactant, the zeta potential of this graphite suspension is slightly positive at a pH of 3 and quickly becomes strongly negative at higher pH values. In a preferred embodiment comprising silicon in which a high negative charge is desirable, the pH is greater than about 4 and less than about 7. As seen in FIG. 22 (Example 10), the magnitude of the negative charge of the Si suspension in deionized water decreases rapidly in the pH range 3 to 4.5, and the suspension containing 20 wt. % of an anionic surfactant, sodium dodecylbenzene sulfonate (NaDDBS), per silicon content tends to have a still higher negative charge in this pH region. Changing the suspension medium can influence the change in zeta potential as a function of pH, as seen in FIG. 23 (Example 10) where the suspension medium is 100% ethanol. In the latter case, it is clear that a pH>6 is preferred in order to maximize the negative zeta potential.

During a particular mixing step, the mixed suspensions forming the anode compositions with combined particles can have a pH between about 2 and about 11, preferably between about 2 and about 9, more preferably, between about 3 and about 8, most preferably between about 4 and about 7.

Optional Ingredients

The anode compositions, methods of preparing the anode compositions, and batteries including the anode compositions can also contain one or more other optional ingredients to provide other desired chemical and physical properties and characteristics. In addition to the optional components discussed separately below, many other known types of optional ingredients such as dyes and air release agents, can also be included in the present compositions. In general, optional ingredients are employed in the compositions in minor amounts sufficient to enhance the performance characteristics and properties of the composition. The amounts will thus vary in accordance with the intended use and properties of the composition. In some embodiments the ingredient may be included in the formulation but is essentially washed out in the fabrication process with little or none remaining in the final composition.

Suitable optional ingredients include, but are not limited to, adhesion promoters, antioxidants, buffering agents, corrosion inhibitors, dyes, pigments, electrolytes, electrolytes, conductive aids, host materials, scale inhibitors, seal-swelling agents, solvents, stabilizers, and thickening agents.

Adhesion and Hardening Promoters

The anode compositions, methods of preparing the anode compositions, and batteries including the anode compositions can include one or more adhesion and hardening promoters. Adhesion and hardening promoters increase hardness and adhesion to substrates, such as glasses, metals, silicon wafers, amorphous silicons, and plastics. Examples of adhesion promoters include metal complexes of Pd, Mg, W, Ni, Cr, Bi, B, Sn, In, and Pt.

Antioxidants

The anode compositions, methods of preparing the anode compositions, and batteries including the anode compositions can include one or more antioxidants. Examples of antioxidants include phenolic antioxidants, aromatic amine antioxidants, sulfurized phenolic antioxidants, and organic phosphates. Examples include 2,6-di-tert-butylphenol, liquid mixtures of tertiary butylated phenols, 2,6-di-tertbutyl-4-methylphenol, 4, 4'-methylenebis(2,6-di-tert-butyl phenol), 2,2'-methylenebis(4-methyl-6-tert-butylphenol), mixed methylene-bridged polyalkyl phenols, 4,4'-thiobis(2-methyl-6-tert-butylphenol), N,N'-di-sec-butyl-p-phenylenediamine, 4-isopropylaminodiphenylamine, phenyl-alpha-naphthylamine, and phenyl-betanaphthylamine.

Binders

The anode compositions, methods of preparing the anode compositions, and batteries including the anode compositions can optionally include one or more binders suitable for incorporation in an electrode to allow or facilitate forming them into films and/or membranes which may be either free-standing or deposited on a current collector such as copper foil; in the latter case the binders preferably provide some significant adhesion to the current collector. A membrane provides selective barrier properties or selective transport properties, whereas a film is simply a thin, continuous substrate that may or may not be porous and/or flexible. The present electrode compositions can be prepared as films or membranes as they are designed to facilitate uptake of electrolyte. Preferably, the binder is electrochemically stable and facilitates the transport of ions.

The binders can be electronically conductive or electronically non-conductive. Examples include, but are not limited to, polyvinylidene fluoride (PVDF), polyacrylic acid (PAA), fully or partially neutralized PAA, cross-linked PAA with other polymers (such as PVA, CMC, diallyl ether, Catechol, Gum Arabic), lithiated PAA, carboxy methyl cellulose (CMC), polyalginate, polyvinyl alcohol (PVA), polyfluorenes, perfluorosulfonic acid polymers, polyethylenimines, poly(acrylonitrile-co-acrylamide), polystyrenebutadiene rubber (SBR) and poly-1,3-butadiene, and combinations thereof.

As noted above, in some embodiments, electronically conductive nanoparticles, including, for example, carbon nanoparticles, can be incorporated in the binder to increase the electrical conductivity of the binder material, which is typically electronically insulating.

In some embodiments, the polymer binder could be partially/fully carbonized in inert atmosphere (such as $N_2$ or Ar gas atmosphere) to form certain types of carbon in the electrode, which will improve the electronic conductivity of the electrode and protect the active material from direct contacting with electrode.

In some embodiments of the anode compositions, the binder makes up between about 0.5 wt. % and 35 wt. % of the anode material (which does not include a current collector foil, housing, separator or electrolyte). In some embodiments of the anode compositions, the binder makes up between about 0.5 wt. % and 30 wt. % of the anode. In yet another embodiment, the binder makes up between about 1 wt. % and 25 wt. % of the anode, still more preferably between about 1.5 wt. % and about 20 wt. %, even more preferably between about 1.75 wt. % and about 15 wt. %, and most preferably about 2 wt. % and about 10 wt. %.

Buffering Agents

The anode compositions, methods of preparing the anode compositions, and batteries including the anode compositions can include one or more buffering agents. The buffering agents can be selected from known or commonly used buffering agents. Selected buffering agents can exhibit both anti-corrosion and buffering properties. Certain formulations such as benzoates, borates, and phosphates can provide both buffering and anticorrosion advantages. In addition, a base can be used to adjust the pH value of the composition. Illustrative examples of bases include commonly known and used bases, for example, inorganic bases such as KOH, NaOH, $NaHCO_3$, $K_2CO_3$, and $Na_2CO_3$. In addition, an acid can be used to adjust the pH value of the composition. Illustrative examples of acids that can be used include commonly known and used acids, for example, organic acids including, but not limited to, α-hydroxy acids, such as malic acid, citric acid, lactic acid, glycolic acid, and mixtures thereof, and inorganic acids, including but not limited to mineral acids such as boric acid, hydrobromic acid, hydrochloric acid, hydrofluoric acid, nitric acid, perchloric acid, phosphoric acid, and sulfuric acid.

Conductive Aids

The anode compositions, methods of preparing the anode compositions, and batteries including the anode compositions can also include a conductive aid. Additional agents to further enhance electrical conductivity may be included in the formulation and may be introduced, for example, with the binder. These conductive aids may include, but are not limited to, acetylene carbon black particles, multiwall and/or single wall carbon nanotubes, porous carbon, graphite particles, and/or single layer or multilayer graphene particles/platelets/sheets.

Corrosion Inhibitors

The anode compositions, methods of preparing the anode compositions, and batteries including the anode compositions can include one or more corrosion inhibitors that can be either organic or inorganic additives. Examples of organic corrosion inhibitors include short aliphatic dicarboxylic acids such as maleic acid; succinic acid, and adipic acid; triazoles such as benzotriazole and tolytriazole; thiazoles such as mercaptobenzothiazole; thiadiazoles such as 2-mercapto-5-hydrocarbylthio-1,3,4-thiadiazoles, 2-mercapto-5-hydrocarbyldithio-1,3,4-thiadiazoles, 2,5-bis(hydrocarbylthio)-1,3,4-thiadiazoles, and 2,5-(bis)hydrocarbyldithio)-1,3,4-thiadiazoles; sulfonates; and imidazolines. Further examples of organic corrosion inhibitors include dimer and trimer acids, such as those produced from tall oil fatty acids, oleic acid, or linoleic acid; alkenyl succinic acid and alkenyl succinic anhydride corrosion inhibitors, such as tetrapropenylsuccinic acid, tetrapropenylsuccinic anhydride, tetradecenylsuccinic acid, tetradecenylsuccinic anhydride, hexadecenylsuccinic acid, hexadecenylsuccinic anhydride; and the half esters of alkenyl succinic acids having 8 to 24 carbon atoms in the alkenyl group with alcohols such as the polyglycols. Other corrosion inhibitors include ether amines; acid phosphates; amines; polyethoxylated compounds such as ethoxylated amines, ethoxylated phenols, and ethoxylated alcohols; imidazolines; aminosuccinic acids or derivatives thereof. Inorganic additives include borates, phosphates, silicates, nitrates, nitrites, and molybdates.

Copper Corrosion Inhibitors

The anode compositions, methods of preparing the anode compositions, and batteries including the anode compositions can optionally include a copper corrosion inhibitor. Examples of copper corrosion inhibitors that can be included in the present compositions include thiazoles such as 2-mercapto benzothiazole; triazoles such as benzotriazole, tolyltriazole, octyltriazole, decyltriazole, and dodecyltriazole; and thiadiazoles such as 2-mercapto-5-hydrocarbylthio-1,3,4-thiadiazoles, 2-mercapto-5-hydrocarbyldithio-1,3,4-thiadiazoles, 2,5-bis(hydrocarbylthio)-1,3,4-thiadiazoles, and 2,5-(bis(hydrocarbyldithio)-1,3,4-thiadiazoles.

Electrolytes

The anodes, anode compositions, methods of preparing the anode compositions, and batteries including the anode compositions can include electrolytes. An electrolyte is one of the four primary components (cathode, anode, separator and electrolyte) generally required for a functioning battery. Commercial or currently used liquid electrolytes are suitable for use with the electrodes. Preferred electrolytes include, but are not limited to, lithium ion electrolytes, sodium ion electrolytes, and potassium ion electrolytes. Different classes of electrolytes may be used including non-aqueous electrolytes, aqueous solutions, ionic liquids, polymer electrolytes (solid state and gel state), and hybrid electrolytes. In an embodiment, the electrolyte can further comprise conductive aids.

Battery performance and safety issues can be impacted by the properties of the electrolytes used. Preferred electrolytes can be a liquid electrolyte, a solid electrolyte, an ionic liquid-based electrode, or a mixture thereof. In a preferred embodiment, the electrolytes can further comprise an electrolyte additive. Electrolyte additives can improve the performance of electrolytes in some embodiments.

Preferred electrolytes comprise conducting lithium salts. Preferred lithium salts include, but not are not limited to, lithium hexafluorophosphate ($LiPF_6$), lithium perchlorate ($LiClO_4$), lithium bis(trifluoromethanesulfonyl)imide (LiTFSI), Lithium Bis(fluorosulfonyl)imide (LiFSI), lithium bis(perfluoroethanesulfonyl)imide (LiBETI), lithium tetrafluoroborate ($LiBF_4$), lithium hexafluoroarsenate ($LiAsF_6$), lithium trifluoromethanesulfonate ($LiSO_3CF_3$), lithium difluoro(sulfato)borate ($LiBF_2SO_4$), lithium dicyanamide (LDCA), lithium tetracyanoborate ($LiB(CN)_4$).

In a preferred embodiment, the electrolyte comprises a solvent. Preferred solvents include, but are not limited to, ethylene carbonate (EC), diethyl carbonate (DEC), and ethyl methyl carbonate (EMC), dimethyl carbonate (DMC), propylene carbonate (PC), ethyl methyl sulfone (EMS), tetramethylene sulfone (TMS), butyl sulfone (BS), ethyl vinyl sulfone (EVS), 1-fluoro-2-(methyl sulfonyl)benzene (FS), tetrahydrofuran (THF), 2-methyltetrahydrofuran (Me-THF), γ-butyrolactone (GBL).

In an embodiment of a battery comprising a liquid electrolyte, the liquid electrolyte preferably contains one or more lithium salts, dissolved in a single non-aqueous solvent or mixtures of non-aqueous solvents. Such salts can include, but are not limited to those lithium salts described above. Further, suitable liquids for liquid electrolytes can include, but are not limited to, the solvents described above.

Preferred electrolytes include, but are not limited to, adiponitrile, allyl methyl sulfone, tert-amylbenzene, cadium (II) acetate anhydrous, 1,4-di-tert-butyl-2,5-bis (2-methoxyethoxy)benzene, diethyl carbonate, diethyl sulfite, dimethyl carbonate, ethylene carbonate, ethylene sulfite, ethyl methyl carbonate, fluoroethylene carbonate, 1-butyl-1-methylpyrrolidinium bis(trifluoromethylsulfonyl)imide, lithium aluminum titanium phosphate, lithium bis(oxalato)borate, lithium hexafluoroarsenate(V), lithium hexafluorophosphate (battery grade), lithium hexafluorophosphate solution in ethyl methyl carbonate (battery grade), lithium hexafluorophosphate solution in dimethyl carbonate (battery grade), lithium hexafluorophosphate solution in propylene carbonate (battery grade), lithium perchlorate (battery grade), lithium phosphate monobasic (in solution), lithium tetrachloroaluminate anhydrous (in solution), lithium tetrachlorogallate anhydrous (in solution), lithium tetrafluoroborate (in solution), lithium trifluoromethanesulfonate, 3-methylsulfonyl)-1-propyne, phenylcyclohexane, phosphoric acid, polyphosphoric acid, 1,3-propanesultone, propylene carbonate, 1,2-propyleneglycol sulfite, propylene sulfate, 1,3-propylene sulfite, 2-propynyl methanesulfonate, vinylene carbonate, or combinations or mixtures thereof.

Electrolyte Additives

In a preferred embodiment, the electrolyte comprises one or more electrolyte additives. Preferred electrolyte additives include, but are not limited to, vinylene carbonate (VC), fluoroethylene carbonate (FEC), ethylene sulfite (ES), methylene ethylene carbonate (MEC), vinyl ethylene carbonate (VEC), maleimide (MI), 2,2-Dimethoxy-propane (DMP), vinyl acetate (VA), divinyl adipate (DVA), propylene sulfite (PyS), 1,3-propane sultone (PS), butyl sultone (BS), vinyl ethylene sulfite (VES), prop-1-ene-1,3-sultone (PES), methylene methanedisulfonate (MMDS), glutaric anhydride (GA), N-(triphenylphosphoranylidene)-aniline (TPPA), 1,3,2-dioxathiolane-2,2-dioxide (DTD), phenyl boronic acid ethylene glycol ester (PBE), 2,4,6-trivinyl cyclotriboroxane (tVCBO), Ethyl 3,3,3-trifluoropropanoate (TFPE), p-Toluenesulfonyl isocyanate (PSTI), triethylborate (TEB), tris (trimethyl silyl)borate (TMSB), tris(trimethylsilyl)phosphite (TMSPi), tris(2,2,2-trifluoroethyl)phosphite (TTFPi), tris(trimethlysilyl)phosphite (TTSPi), triethyl phosphite (TEPi), triphenyl phosphite (TPPi), phenyl vinyl sulfone (PVS), dimethylacetamide (DMAc), 1,1'-Sulfonyldiimidazole (SDM), p-Toluenesulfonyl isocyanate (PTSI), 1,3-Propane sultone (PSu), 1,3-propanediolcyclic sulfate (PCS), ethyl 3,3,3-trifluoropropanoate (TFPE), terthiophene (3THP), ammonium perfluorocaprylate (APC), lithium bis (oxalate)borate (LiBOB), lithium difluoro(oxalato)-borate (LiDFOB), lithium tetrafluoro(oxalato) phosphate (LTFOP), lithium tris(oxalato) phosphate (LTOP), metal nitrates (e.g., $LiNO_3$, $KNO_3$, $CsNO_3$, $LaNO_3$), dimethyl methylphosphonate (DMMP), diethyl ethylphosphonate (DEEP), triphenyl phosphate (TPP), tri-(4-methoxythphenyl) phosphate (TMPP), cresyl diphenyl phosphate (CDP), diphenyloctyl phosphate (DPOF).

Scale Inhibitors

Certain embodiments of the anode compositions, methods of preparing the anode compositions, and batteries including the anode compositions can include scale inhibitors. Suitable scale inhibitors include components such as phosphate esters, phosphino carboxylate, polyacrylates, polymethacylate, styrene-maleic anhydride, sulfonates, maleic anhydride co-polymer, and acrylate-sulfonate co-polymer. The basic composition can be tailored for selective applications. For example, nitrates and silicates provide aluminum protection. Borates and nitrites can be added for ferrous metal protection, and benzotriazole and tolytriazole can be added for copper and brass protection.

Thickening Agent

Certain embodiments of the anode compositions, methods of preparing the anode compositions, and batteries including the anode compositions can include thickening agents. Examples of thickening agents can include, but are not limited to silica gel and fatty acid soaps of lithium, calcium, strontium, sodium, aluminum, and barium.

Methods of Preparing the Anode Compositions

The anode compositions can be prepared by forming a core with electrochemically active properties, and adding layers of electrochemically active and/or conductive particles between one or more layers of graphene nanoparticles in the form of sheets and/or platelets. In a preferred embodiment, the core is formed by microscale graphite particles. In another preferred embodiment, the core is silicon.

Preferably the core particles have a mean diameter in at least one direction of between about 400 nm and about 60 μm. Preferably the core particles have a mean diameter of at least about 500 nm, 700 nm, 800 nm, 900 nm, 1 μm, 5 μm 10 μm, or 15 μm. Preferably the core has a diameter of equal to or less than about 50 μm, 45 μm, 40 μm, 35 μm or 30 μm. The core can be of any particular shape, such as an irregular shape, a two-dimensional structure, or any regular shape, including, but not limited to, a sphere, a rod, a cylinder, an oval, or an egg. In some embodiments, the core can be an agglomeration of smaller particles to form the core. However, it is preferred that the core is a single microscale particle.

The core particles are prepared in a suspension in a fluid medium. The electrochemically active particles are prepared in a suspension in a separate fluid medium to form an electrochemically active particle suspension. The electronically conductive particles are also prepared in a suspension in a separate fluid medium to form an electronically conductive particle suspension.

To disperse and attach the electrochemically active particles or electronically conductive particles to the core particles, the electrochemically active particles or electronically conductive particles in the suspension should have a net charge that has opposite polarity to that of the net charge of the microparticle(s) in the core-particle suspension to provide electrostatic attraction, and/or have the potential for hydrophobic attachment, and/or include other non-covalent interactions that can drive the particles to assemble in the desired combination and/or provide attachment between the combined particles. While not wishing to be bound by the theory, it is believed that such interactions may include, but are not limited to, van der Waals interactions, dipole-dipole interactions, hydrogen-bonding, halogen bonding, it-interactions, and combinations thereof. In the case of providing or enhancing electrostatic attractions, surfactants are selected and mixed in the electrochemically active core particle suspension and/or in the electronically conductive particle suspension and/or in the electrochemically active particle suspension to be layered to ensure that the suspensions to be combined have opposite charge polarity, and/or to increase the magnitude of the charge difference between the core particles and the electrochemically active or electronically conductive particles that are to be combined, and to aid in dispersing the particles.

Preferably, the surfactant and electrochemically active particles and/or conductive particles are mixed. The mixing can be performed in any suitable manner. Preferred methods of mixing include, but are not limited to, manual, with automatic stirrers, paddle mixers, sonication, a stir bar, or combination thereof. The mixing can be performed in batch or in a continuous process. The mixing can be performed for any suitable amount of time to disperse the particles. Preferably, the mixing occurs for less than about 2 hours, more preferably less than about 1.5 hours, even more preferably less than about 1 hour, and most preferably less than about 30 minutes.

The suspension comprising the electrochemically active particles and/or conductive particles carrying a positive or negative charge can be mixed with the suspension comprising the core particles, carrying an opposite charge. As indicated earlier, one or both of these suspensions may include surfactant having a net negative or net positive charge to enable or improve the layering step. Any surfactants (or surfactant mixture or blend) can be used to disperse the particles in the fluid and on the surface. Preferably, the surfactant (or surfactant mixture or blend) has a net negative or net positive charge, which can improve the dispersion and the attraction of the particles to the surface of the core. In a preferred embodiment, the surfactant comprises an ionic species. While ionic species are preferred for the layering methods, other surfactants, including nonionic species, can be useful for exfoliating the graphene.

The mixing can be performed in any suitable manner. Preferred methods of mixing include, but are not limited to, manual, with automatic stirrers, paddle mixers, sonication, a stir bar, or combination thereof. The mixing can be performed in batch or in a continuous process. The mixing can be performed for any suitable amount of time to disperse the particles. Successful attachment of electrochemically active or electronically conductive particles to the core particles may be accompanied by a distinct change in color which persists after mixing ceases and, given time, the combined particles may settle to the bottom of the container. If attachment has failed to occur, cessation of mixing may result in a distinct segregation of colors over time.

The attachment of the first layer of nanoparticles to the surface of the core particles creates a "composite particle" with a net charge, wherein the net charge is preferably of the same polarity as the first nanoparticle layer. A second composition of nanoparticles can be attached to the composite particle, creating a second layer om the core particle. The second nanoparticle composition can be prepared in a liquid suspension in which the net charge of the second nanoparticle layer is of opposite charge polarity to that of the net charge of the composite particles. The second nanoparticle suspension is mixed with the composite-particle suspension in a similar manner to that in which the second nanoparticle suspension was mixed with the core-particle suspension. Similarly, a third nanoparticle layer can be added to the composite particle now comprising two nanoparticle layers, and so on.

One preferred suspension is a mixture of surfactant and electronically conductive graphene nanoparticles in the form of sheets and/or platelets. For the graphene layers, it is preferred that the suspension primarily comprises surfactant and graphene particles. In a most preferred embodiment, the suspension consists essentially of or consists of a surfactant and graphene nanoparticles. While not wishing to be bound by the theory it is believed that the surfactant molecules attach to the graphene particles by hydrophobic interaction. This attachment can provide a charge to the graphene particle surface (e.g., cationic or anionic charge depending on the surfactant employed). If the electrochemically active particle to be attached to the graphene surface is negatively charged, as in the case of silicon, the surfactant should render the graphene particle surface positively charged.

Another preferred suspension comprises electrochemically active particles (including, for example, but not limited to, silicon) and a surfactant. In some embodiments, this suspension can also include other conductive nanoparticles such as carbon nanoparticles. Preferred carbon nanoparticles include, but are not limited, to graphite nanoparticles or carbon black nanoparticles.

The charge of the surface of the core and/or a particle layer can be quantified by measuring the zeta potential. The core and the first layer of particles have zeta potential measurements of opposite polarity, i.e., one is positive and the other negative. The zeta potential can be measured with dynamic light scattering and electrophoresis. A preferred instrument for measuring zeta potential is a Zetasizer Nano commercially available from Malvern. It is preferable to engineer a significant difference between the oppositely-charged zeta potential of the core and the first layer. Preferably the magnitude of the zeta potential difference is at least 6, more preferably >12, still more preferably >25 and most preferably >40.

After the final nanoparticle layer is added, the compositions can be filtered and dried. The filtering is done to remove the liquid together with excess surfactant, if any. While filtering is not always necessary, it is preferred.

Optionally, the compositions can be filtered and and/or dried after any of the layering steps, before being re-suspended and mixed with the nanoparticle suspension that will form the next layer.

The conditions and initial layer of the anode compositions can vary depending on which core is selected. For example, if a graphite core is selected, it is preferred that the next layer be of electrochemically active particles having a significantly higher charge capacity than the graphite core, thereby increasing the capacity of the anode while utilizing the electronically conductive properties of the graphite. However, if the core is formed by a high charge capacity, electrochemically active particle which lacks adequate electronic conductivity (for example, a silicon core), then the first layer preferably comprises an electronically conductive material, such as graphene. Preferably, a graphene layer covers a core or particle layer of electrochemically active particles; as discussed above, the layer of electrochemically active high-capacity particles can also comprise conductive nanoparticles. Upon a graphene layer can be another layer of electrochemically active particles, followed by another layer of graphene, and so on. These two approaches, defined by whether the core is electronically conductive and electrochemically active, or is electrochemically active with low electronic conductivity, are exemplified in non-limiting examples in FIGS. 3A through 3C, which are illustrative and not exhaustive.

Figure 3A:
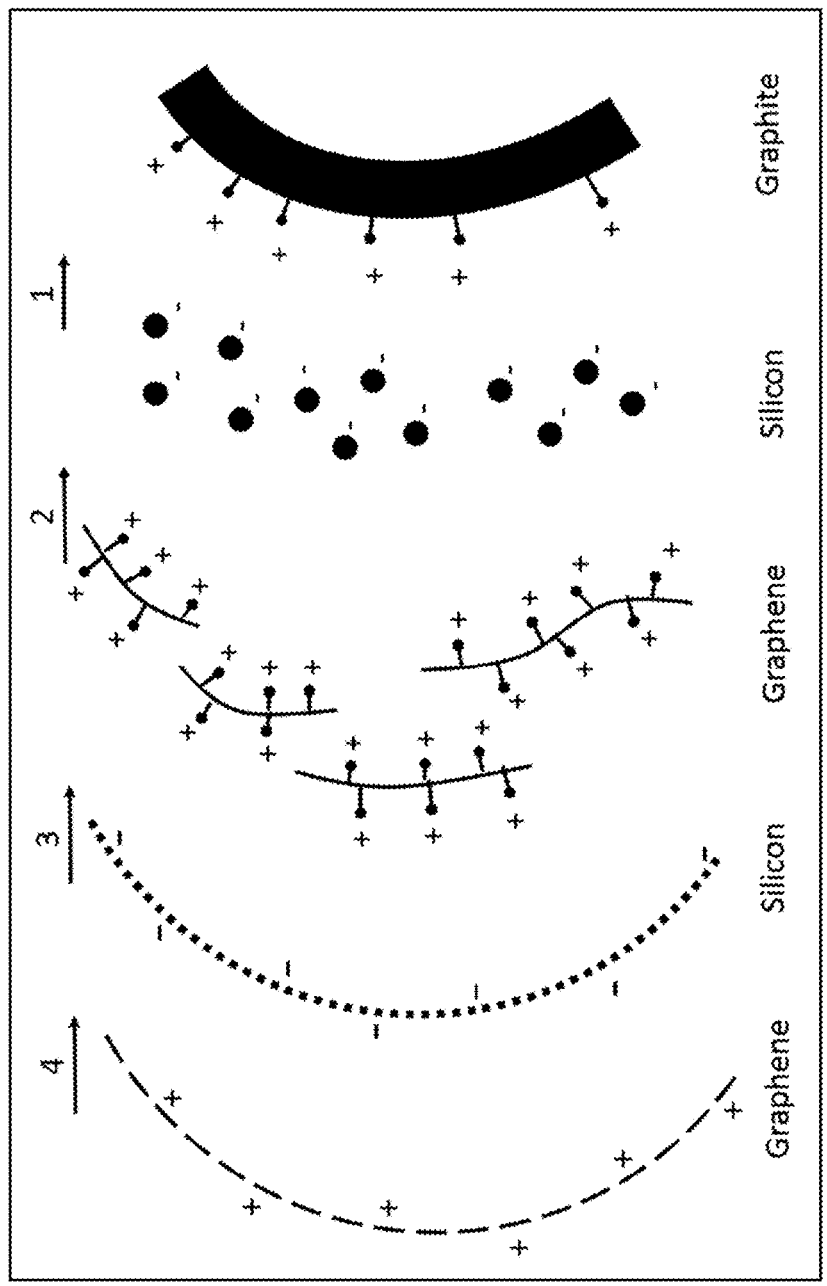
FIG. 3A is a drawing exemplary of a preferred embodiment of the layering of the anode compositions comprising a graphite core, followed by a silicon layer, a graphene layer, a second silicon layer, and a second graphene layer. The silicon is only exemplary of an electrochemically active particle species for purposes of illustration.

FIG. 3A provides an exemplary schematic of the layering of the anode compositions comprising a graphite core, followed by a silicon layer, a graphene layer, a second silicon layer, and a second graphene layer. Further, the silicon is only exemplary of an electrochemically active particle species for purposes of illustration. Furthermore, electronically conductive nanoparticles can also be added to the electrochemically active particles represented as silicon here by way of a non-limiting example. Notably, the shape of the particles in such an anode composition can vary. FIG. 3A is only illustrative.

Figure 8:
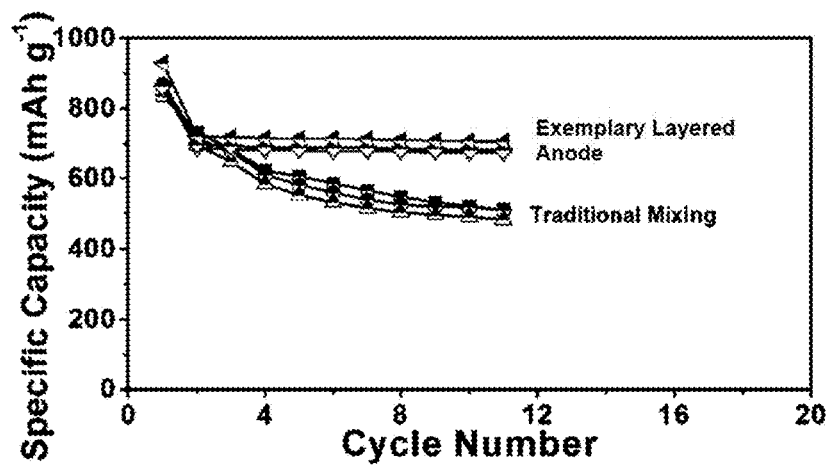
FIG. 8 is a graph from Example 2 comparing the specific capacity (mAh/g) of an exemplary layered anode prepared according to the layering methods described herein versus a control anode prepared by traditional mixing of the same ingredients at the weight percentages in a half-cell.
Figure 9A:
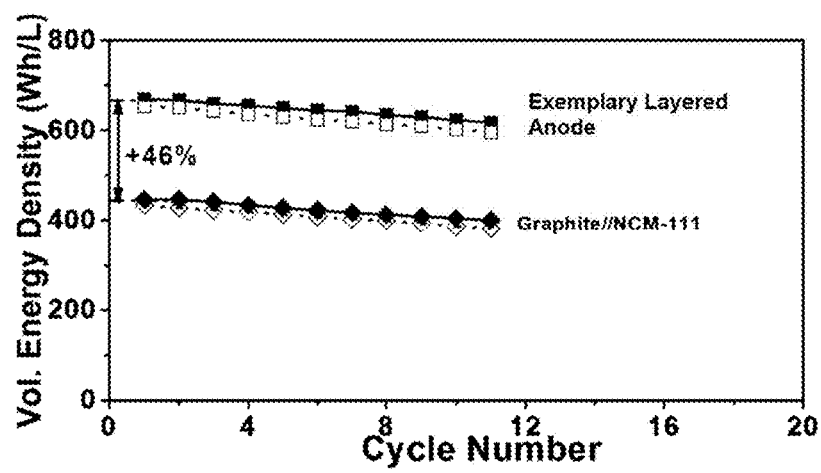
FIG. 9A is a graph from Example 2 comparing the volumetric energy density (Wh/L) of full-cell batteries having the same cathodes, electrolytes, and separators. An exemplary layered anode composition prepared according to the layering methods described herein was compared to a commercially available graphite anode (ZiChen YF-3).
Figure 9B:
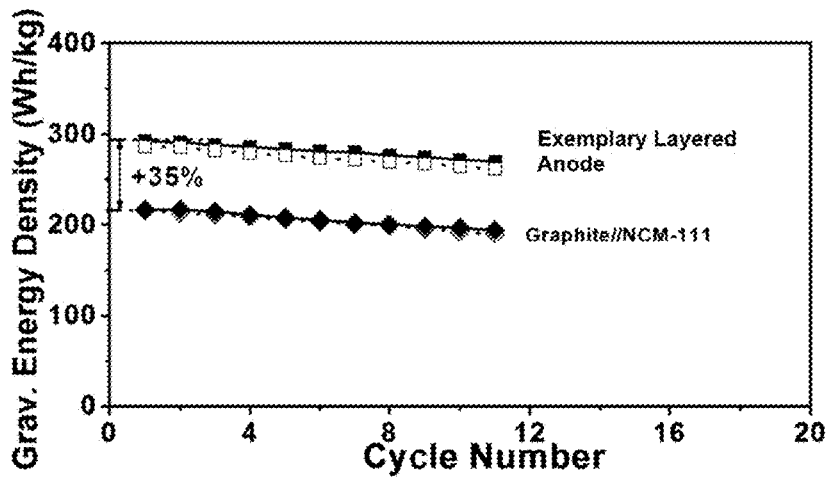
FIG. 9B is a graph from Example 2 comparing the gravimetric energy density (Wh/kg) of full-cell batteries having the same cathodes, electrolytes, and separators. An exemplary layered anode composition prepared according to the layering methods described herein was compared to a commercially available graphite anode (ZiChen YF-3).
Figure 15A:
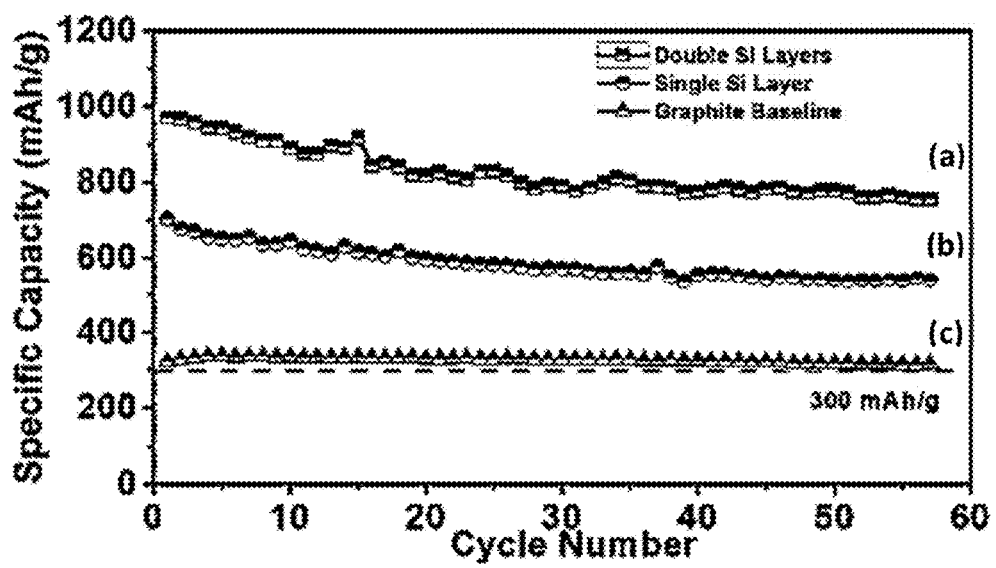
FIG. 15A is a graph from Example 8 showing the change in specific capacity (mAh/g) of various anode materials over repeated cycling under the same cycling conditions. Curve (a) is an exemplary layered anode composition prepared according to the methods described herein having a graphite core and two layers of silicon and one layer of graphene. Curve (b) is an exemplary layered anode composition prepared according to the methods described herein having a graphite core and a single layer of silicon. Curve (c) is a control anode material prepared with graphite, conductive carbon particles, and the same binder as used in the two exemplary layered anode materials.
Figure 16A:
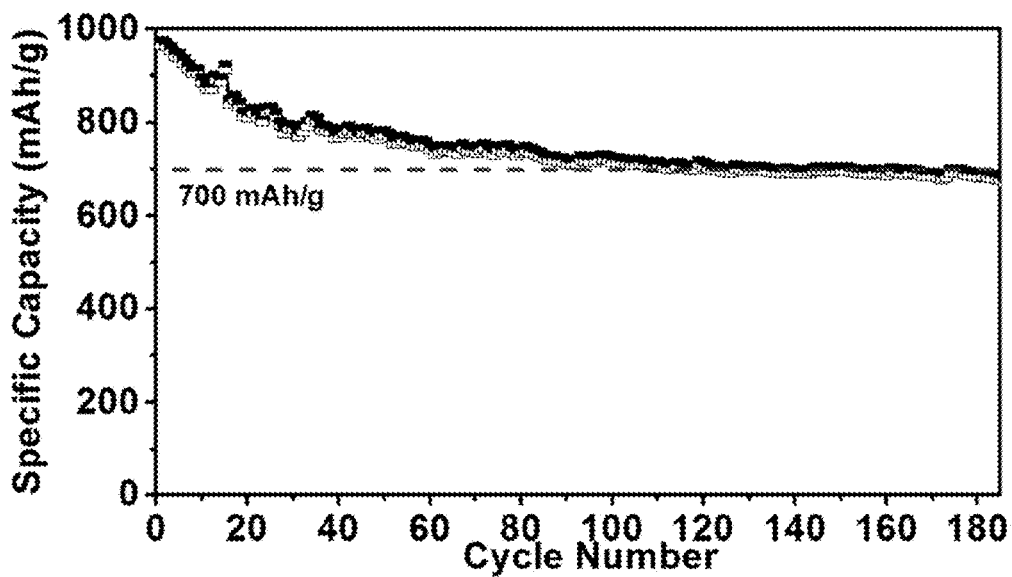
FIG. 16A is a graph from Example 9 showing the change in specific capacity (mAh/g) over more than 190 cycles of an exemplary layered anode composition prepared according to the methods described herein having a graphite core, two layers of silicon and one layer of graphene.

Examples of high specific capacity, together with cycling stability, from the layering of silicon on graphite by the disclosed method are shown in FIGS. 8, 9A and 9B of Example 2, FIGS. 10A-10D of Example 3, and FIGS. 15A and 16A of Examples 8 and 9. Comparative examples of commercially available silicon/graphite anode materials are provided in FIGS. 11-12 of Example 4 and 5, and the comparative performance of the graphite-only baseline anode is shown in curve (c) of FIG. 15A of Example 8. Comparative examples of silicon/graphite anode materials by traditional mixing method are provided in FIGS. 8, 9A, 9B and 13 of Example 2 and 6. Further increases in specific capacity (together with maintenance of stable cycling) from attaching additional layers of graphene and silicon are illustrated in curve (a) of FIG. 15A in Example 8, and in FIGS. 16A and 16B of Example 9.

Figure 3B:
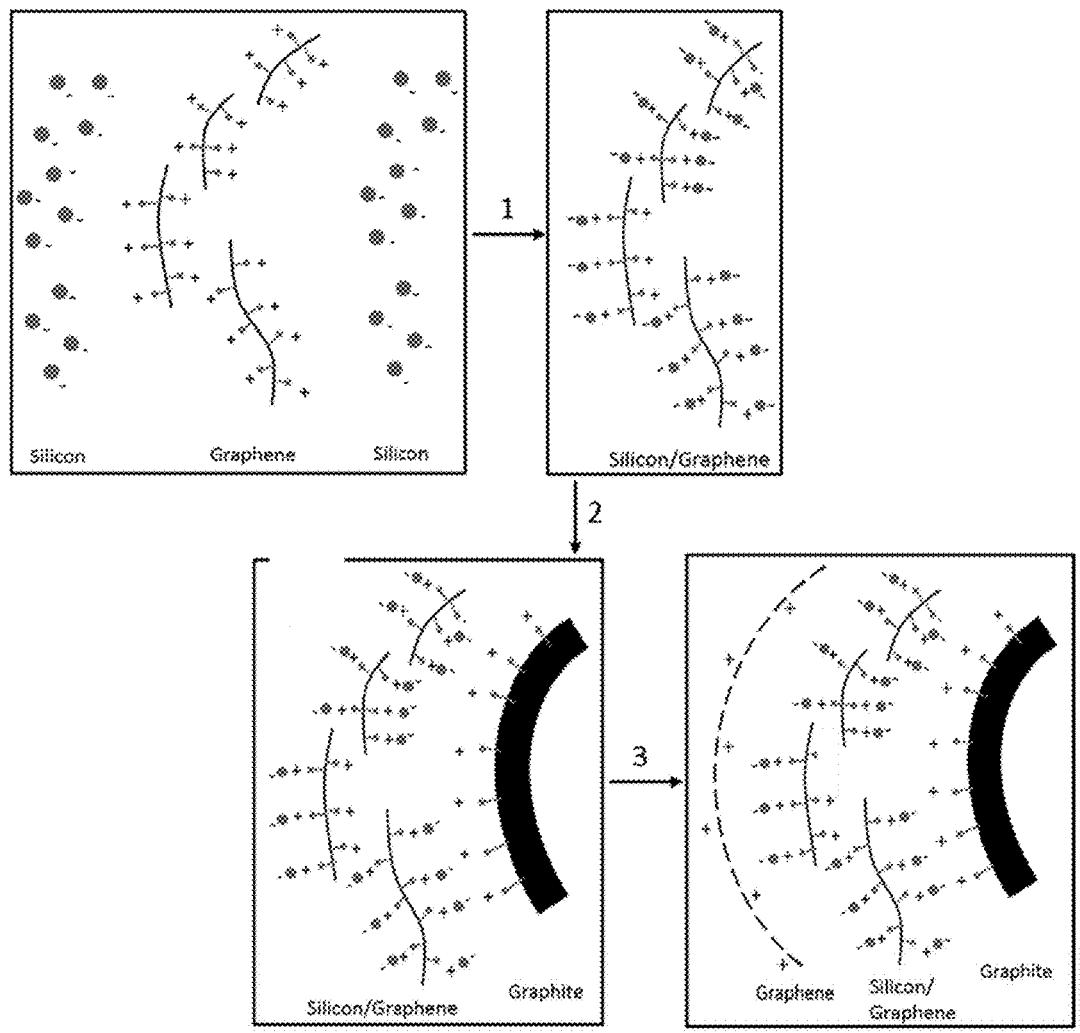
FIG. 3B is a drawing exemplary of a preferred embodiment of the layering of the anode compositions comprising pre-assembling layers of electrochemically active particles with graphene particles followed by attaching those assembled layers to the graphite core.
Figure 3C:
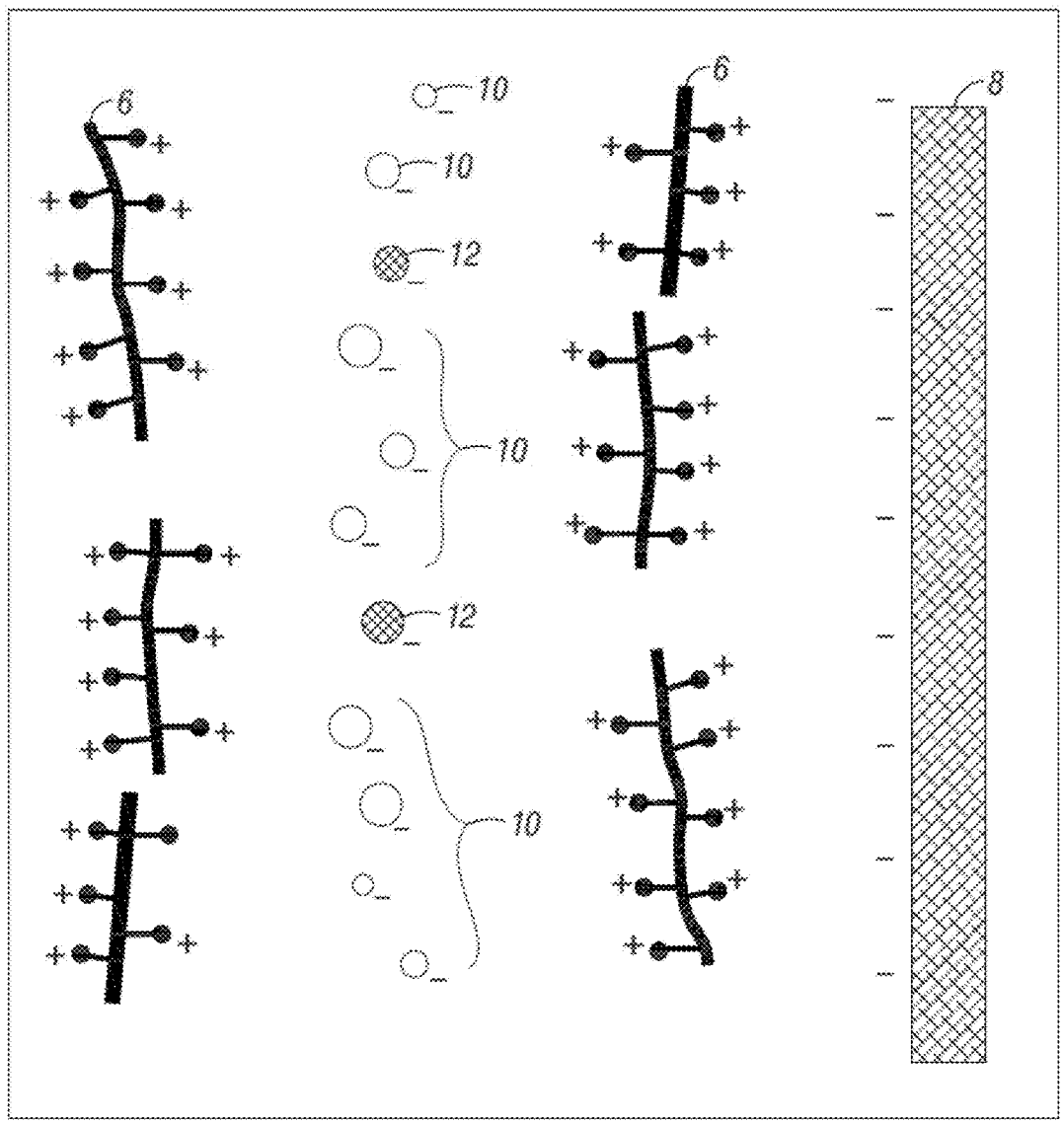
FIG. 3C is a drawing exemplary of a preferred embodiment of the layering of the anode compositions comprising a silicon core, followed by a graphene layer, an electrochemically active particle layer comprising electrochemically active particles or a mixture of electrochemically active particles and electronically conductive particles, followed by an electronically conductive graphene layer.

The assembly sequence for achieving a layered architecture as exemplified in FIG. 1, with graphite as core, is not limited to the sequence illustrated in FIG. 3A. Another exemplary layering sequence can involve pre-assembling the silicon-graphene layers before attaching those assembled layers to the graphite core. A schematic example of this layering method is shown in FIG. 3B. As demonstrated in FIG. 3B, the graphene (carrying a positive charge through surfactant attachment) can be combined with negatively charged silicon, such that the assembled silicon-graphene layers have a net negative charge. The silicon-graphene structures can then be mixed with the positively charged graphite, creating a multilayered silicon-graphene structure with a graphite core. An additional layer of graphene can then be attached, as indicated in step 3 of FIG. 3B; and further layers may be built by sequential addition of silicon and graphene and/or by attachment of pre-assembled silicon-graphene layers. Notably, the shape of such an anode composition can vary. FIG. 3B is only illustrative.

FIG. 3C provides an exemplary schematic of the layering of the anode compositions comprising a silicon core, followed by an electronically conductive graphene layer, an electrochemically active particle layer comprising electrochemically active particles or a mixture of electrochemically active particles and electronically conductive particles, wherein the electrochemically active particles maybe the same or different from the electrochemically active core, e.g., it may be a mixture of graphite and tin nanoparticles as shown in this non-limiting example; and a second electronically conductive graphene layer may then be added, as also shown in FIG. 3B. Notably, the shape of the particles in such an anode composition can vary and FIG. 3B is only illustrative.

In an embodiment with a silicon core, the assembly sequence for achieving the layered architecture of FIG. 2 is not limited to the sequence illustrated in FIG. 3C. For example, the layering sequence can involve pre-assembling the outer layers (which are graphene, graphite and tin in the exemplary schematic or FIG. 3C) before attaching those assembled layers to the silicon core similar to the pre-assembly process shown in FIG. 3B.

According to a preferred embodiment of a method of forming the anode compositions of the type shown in FIG. 3A, a layer of silicon nanoparticles is to be attached to the surface of micro-size graphite particles. The graphite particles without surfactant can have a negative zeta potential, which can be shifted to positive with the inclusion of a cationic surfactant. This is demonstrated later in the Examples. See FIG. 17 in Example 10. Measurement of the zeta potential of the silicon nanoparticles shows that these particles also have a strong negative charge. To permit attraction and attachment of the silicon particles to the graphite surface, the graphite surface is first rendered positive by mixing a cationic surfactant with the graphite particles in a liquid medium, such as water, in sufficient amount to produce a net positive charge on the graphite, as determined by zeta potential measurements. Preferably the measured zeta potential is at least +15 mV. In a separate container, a suspension of silicon nanoparticles is prepared. The silicon particles without surfactant can have a negative zeta potential of about −15 mV. To further enhance silicon particle dispersion and minimize or eliminate any fraction of unattached particles, it can be beneficial to add an anionic surfactant to the silicon suspension, which will generally increase the negative value of the zeta potential. The zeta potential of silicon can be made more negative by changing the pH of the suspension and/or change the dispersion media. This is demonstrated later in the Examples. See, e.g., FIGS. 18 and 22 in Example 10.

The positively charged graphite suspension is mixed with the negatively charged silicon suspension by combining the two mixtures and stirring. Since there is strong electrostatic interaction between the highly dispersed graphite and silicon particles in the suspension, the silicon nanoparticles will attach to the surfaces of the graphite particles, partially covering the surfaces of most or all of the graphite particles.

The suspension of silicon-graphite composite particles can be filtered and dried to form a dry powder, and optionally heat-treated, suitable for use as a high capacity electrode material in a battery when mixed with a suitable binder and deposited on a current collector. Alternatively, the silicon-graphite composite particles may be kept in suspension, or else dried and then re-suspended in a liquid, to enable another layering step in which a graphene layer is added to cover, or partially cover, the surfaces of the silicon-graphite composite particles. In still another embodiment, the anode composition can be filtered followed by heat-treatment, not requiring a rinsing step.

As a result of the silicon attachment to the graphite at an adequate silicon loading (preferably in the range of between about 6 wt. % and about 15 wt. %), the graphite-silicon composite particles have a net negative charge in the liquid suspension, the net negative charge preferably being greater than about −5 mV, and more preferably greater than about −15 mV.

To form the graphene layer, a graphene nanoparticle suspension is prepared in a liquid medium, which can often have a strong negative zeta potential charge, which can be shifted to positive with the inclusion of a cationic surfactant. This is demonstrated later in the Examples. See, e.g., FIGS. 19 and 20 in Example 10. To permit attraction and attachment of the graphene particles to the negatively charged silicon-graphite composite surface, the graphene surface is first rendered positive by mixing a cationic surfactant with the graphene particles in a liquid medium, such as water, in sufficient amount to produce a net positive charge on the graphene, as determined by zeta potential measurements.

The positively charged graphene suspension is mixed with the negatively charged silicon-graphite suspension by combining the two mixtures and stirring. Since there is strong electrostatic interaction between the highly dispersed silicon-graphite particles in the suspension, the graphene nanoparticles will attach to the surfaces of the silicon-graphite particles, partially covering the surfaces of most or all of the silicon-graphite particles to form a graphite-silicon-graphene composite.

Another layer of electrochemically active particles—silicon in this non-limiting example for ease in description—can then be added to the graphene layer. In some embodiments, this layer of electrochemically active particles, may also include electronically conductive particles. The silicon particles and optional electronically conductive particles are suspended in a fluid medium comprising a surfactant selected to increase the zeta potential differences between the silicon suspension and the graphite-silicon-graphene composite suspension with which it is mixed. During mixing the silicon particles disperse and attach to the graphite-silicon-graphene composite.

In a similar manner, a second graphene layer may be added to the graphite-silicon-graphene-silicon composite, and so on.

According to the methods of preparing this illustrative anode composition, the pH may be controlled to give the electrochemically active particles and/or conductive particles a high net negative charge under the pH conditions employed. The selected pH range will depend on the particle surface chemistry and the suspension medium, but for silicon particles in deionized water the pH is preferably in the range of between about 3 and about 9, more preferably between about 3 and about 8, still more preferably between about 4 and about 6.5.

Dispersion can also be assisted by proper mixing of the dispersion with the surfactant. Preferably, the electrochemically active particles and/or conductive particles are well-dispersed such that when they are introduced to a carbon particle core or graphene layer, they are attracted to the surface of the carbon particle core or graphene layer and become attached on the surface of the core or graphene particles forming the graphene layer such that the electrochemically active particles and/or conductive cover much of the surface in a well-distributed, non-agglomerated, manner. Preferably, there is sufficient space between the particles forming the layer that during the volume change that occurs as part of charge and discharge cycling, the impingement of neighboring particles is minimized. Thus, a layer of electrochemically active particles and/or conductive particles can be layered over a graphite core or over a layer of graphene particles.

In an embodiment where the electrochemically active particle layer comprises silicon, it is preferred to further increase the silicon particle dispersion and strength of attraction to a carbon particle core surface or graphene layer surface by adding an anionic surfactant to the silicon particle suspension prior to contacting the carbon particle core.

A graphene layer can be applied by preparing a suspension of graphene particles in a fluid medium comprising a surfactant. The graphene suspension can also comprise additional ingredients, although graphene is preferred. Again, the surfactant can provide a charge to the surface of the graphene particles in the suspension, which can aid in dispersion. That charge should be opposite that of the charge of the first electrochemically active particle layer (i.e., the layer comprising silicon particles, metal oxide particles, and, optionally, electronically conductive particles that are attached to the core). When silicon, or another negatively charged electrochemically active nanoparticle, is used, the surfactant in the second carbon particle suspension preferably comprises a cationic surfactant. The second electronically conductive particle suspension can then be added to the suspension containing the carbon particle core and first electrochemically active particle layer. Being charged oppositely to the net charge of the composite particles comprising the electrochemically active core and the first electrochemically active particle layer, and preferably well-dispersed, as a result of the surfactant molecules which are attached to the surface of the electronically conductive particles in the second electronically conductive particle suspension, the electronically conductive particles are attracted to the composite particle and deposit on top of it forming a third layer, which is an electronically conductive particle layer. This electronically conductive particle layer, preferably in the form of a 2D graphene monolayer, bilayer, and/or multilayer sheet, creates a buffer zone for the silicon particles, metalloid oxide particles, and/or conductive particles, which are sandwiched between the core and this first electronically conductive particle layer.

Preferably the first electronically conductive particle layer comprises graphene sheets, which may completely or partially cover the layer of electrochemically active nanoparticles or submicron particles on the surface of the core material. Preferably, the graphene layer covers at least about 20%, or at least about 25%, or at least about 30%, or at least about 35%, or at least about 40%, or at least about 45%, or at least about 50%, or at least about 55%, or at least about 60%, or at least about 65%, or at least about 70%, or at least about 75%, or at least about 80%, or at least about 85%, or at least about 90%, or at least about 95% of the surface of the two-layer composite comprising an electrochemically active core and an electrochemically active layer. It should be understood that these measurements should be made consistently in a charged or discharged state for comparisons, as the electrochemically active particles forming a core or a layer tend to swell during charge and discharge cycling.

If it is desired to add additional layers to the anode composition, a further electrochemically active layer can be added to the conductive particle layer. Such additional layers are not required; however, the addition of more layers can increase the loading of electrochemically active particles, such as silicon, tin or germanium. A second electrochemically active particle layer can have the same components as the first electrochemically active particle layer or may be different. The second electrochemically active particle layer can be formed by preparing a suspension identical to the first electrochemically active particle suspension which was used to form the first electrochemically active particle layer on the electrochemically active core, or it can be different. If a second electrochemically active particle suspension is prepared it can be introduced into the suspension in which the graphite core, first electrochemically active particle layer, and first electronically conductive particle layer have already been assembled. This suspension should have an opposite charge to the net charge on the composite particle comprising the graphite core, first electrochemically active particle layer, and first electronically conductive particle layer. This can again be achieved with the use of a surfactant. The composite particle may have a positive charge as a result of the addition of a positively charged graphene outer-layer, in which case the charge on the particles that will comprise the second electrochemically active layer must have a negative charge (with the assistance of an anionic surfactant). The charge of the second electrochemically active particle suspension are attracted to the surface of the composite particle, in which the outer layer comprises a full or partial coverage of graphene, graphene oxide, reduced graphene oxide or similar 2D material (the first electronically conductive particle layer) and forms a second electrochemically active particle layer on top of the first electronically conductive particle layer. Preferably, the components of the second electrochemically active particle layer are well-dispersed. The components of the second electrochemically active particle layer can comprise silicon particles, metalloid oxide particles in optional combination with a fraction of electronically conductive particles to facilitate electronic conductivity between the layers.

If a second electrochemically active particle layer is added, it is preferable to add a second electronically conductive particle layer. The second electronically conductive particle layer can have the same components as the first electronically conductive particle layer or may be different. A suspension can be prepared and added into the suspension in which the graphite core, first electrochemically active particle layer, first electronically conductive particle layer, and second electrochemically active particle layer have been assembled. This suspension should have an opposite charge to the net charge of the composite particle comprising the graphite core, first electrochemically active particle layer, first electronically conductive particle layer, and second electrochemically active particle layer. The composite particle may have a net negative charge as a result of the addition of a negatively charged outer-layer predominantly comprising silicon particles, in which case the charge on the particles that will comprise the second electronically conductive layer must have a positive charge. This can again be achieved with the use of a cationic surfactant. The charge of the second electronically conductive particle suspension is attracted to the surface of the oppositely charged composite particle and forms a second electronically conductive particle layer on top of the second electrochemically active particle layer. Preferably, the components of the second electronically conductive particle layer are well-dispersed. The components of the second electronically conductive particle layer can be carbon particles as described herein; preferably, the second electronically conductive particle layer comprises graphene or reduced graphene oxide. This second electronically conductive particle layer creates a second buffer zone for the electrochemically active particles which are sandwiched between two electronically conductive particle layers.

This assembly sequence can be repeated to create the desired number of electrochemically active particle layers. Preferably, by repeating this assembly sequence one can control and increase the amount of silicon and/or other desired ingredients in the anode composition without risking agglomeration, since the amount of well-dispersed particles that can be deposited in a given layer (with sufficient room to accommodate expansion after lithium insertion) is limited by the area of the surface on which they are deposited.

In an embodiment, the composite particles used to make the anode composition may be filtered, rinsed, dried and re-dispersed after any of the layering steps. For example, the anode composition comprising the graphite particle core with the first electrochemically active particle layer, may be filtered, rinsed and dried and then re-dispersed prior to depositing the first electronically conductive carbon layer. Similarly, the anode composition comprising the graphite particle core, the first electrochemically active particle layer, and the first electronically conductive carbon layer can be filtered, rinsed, dried, and re-dispersed prior to addition of the second electrochemically active particle layer. Drying and re-dispersion of the anode composition particles can be carried out at any or all stages of the assembly process.

In a preferred embodiment, the electrochemically active particle layers comprise silicon and optionally include a well-dispersed fraction of conductive nanoparticles, such as graphite nanoparticles, carbon black and/or carbon nanotubes to provide enhanced electrical conductivity between the graphene layers.

After filtering, which may include multiple rinsing steps, the final composite particles are dried and the resulting powder can be mixed with a binder or combination of binders to form a slurry or suspension which may be deposited on a copper-foil current collector to create an anode. As in standard anode formulations, conductive particles, such as carbon black, may be added to the binder solution, to increase the electrical conductivity of the electrode.

After attraction and attachment of the particles through non-covalent interactions to form a composite, it may be desirable to induce covalent bonding between one or more of the combined particles (e.g., electrochemically active particles and graphite, or electrochemically active particles and graphene) in the composite, through chemical treatment, heat treatment or a combination thereof. Such covalent bonding can be performed while the combined particles are in suspension, while they are no longer suspended but wet, and/or after they have been dried to form a powder or create a slurry. As described in the previous paragraph, the layered particle composite in which at least some of the different particles are covalently bonded can be mixed with a binder or combination of binders to form a slurry or suspension which may be deposited on a copper-foil current collector to create an anode. As in standard anode formulations, conductive particles, such as carbon black, may be added to the binder solution, to increase the electrical conductivity of the binding polymer.

Batteries

Batteries can be prepared comprising an anode composition as described herein. Typically, such a battery will comprise a cathode, an anode comprising an anode composition as described herein, a separator between the anode and cathode, and an electrolyte. Preferably, the battery comprises a current collector.

Preferred cathodes include, but are not limited to sodium-ion cathodes, lithium-ion cathodes. Preferred lithium-ion cathodes include, but are not limited to $LiCoO_2$, $LiNiO_2$, $LiMnO_2$, $LiMn_2O_4$, $Li_4Ti_5O_{12}$, $LiNi_{1-y}Co_yO_2$, $LiNi_{1-y-z}Mn_yO_2$, $LiNi_{1-y-z}Mn_yCo_zO_2$, $LiNi_{1-y-z}Mn_yAl_zO_2$, $LiFePO_4$, $Li_3Fe_2(PO_4)_3$, $Li_3V_2(PO_4)_3$, lithium nickel aluminum oxide such as $LiNi_{0.5}Co_{0.15}Al_{0.15}O_2$(NCA), and high nickel content lithium nickel manganese cobalt oxide such as $LiNi_xCo_yMn_zO_2$, $LiNi_{0.42}Mn_{0.42}Co_{0.16}O_2$, $LiNi_{0.5}Mn_{0.3}Co_{0.2}O_2$, $LiNi_{0.6}Mn_{0.2}Co_{0.2}O_2$, and $LiNi_{0.5}Mn_{0.1}Co_{0.1}O_2$.

Preferably, batteries incorporating the anode compositions can have a volumetric energy density increase of at least about 100 Wh/L, more preferably at least about 300 Wh/L, most preferably at least about 400 Wh/L over batteries containing conventional graphite anodes. Preferably, batteries incorporating the anode compositions can have a gravimetric energy density increase of at least about 50 Wh/kg, more preferably at least about 100 Wh/kg, most preferably at least about 200 Wh/kg over batteries containing conventional graphite anodes.

Batteries described herein can be used to power a variety of devices and are not limited to any particular devices or energy storage systems. Preferred devices include, but are not limited to laptop computers, tablet computers, smartphones, hybrid and/or electric cars, grid storage units, residential energy storage units, and/or other electronic devices, for example. A battery can be directly connected as a power source and/or included as part of a battery assembly, for example.

While particular elements, embodiments and applications of the present invention have been shown and described, it will be understood, that the invention is not limited thereto since modifications can be made by those skilled in the art without departing from the scope of the present disclosure, in light of the foregoing teachings.

EXAMPLES

Preferred embodiments of the invention are further defined in the following non-limiting Examples. It should be understood that these Examples, while indicating certain embodiments of the invention, are given by way of illustration only. From the above discussion and these Examples, one skilled in the art can ascertain the essential characteristics of the invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Example 1

Figure 4A:
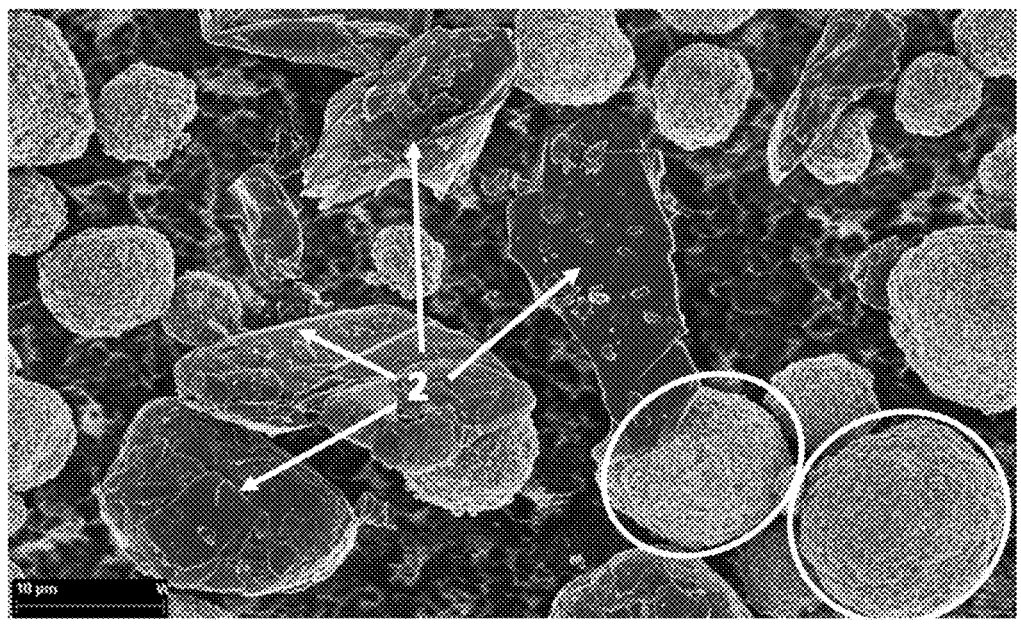
FIG. 4A is a scanning electron microscope (SEM) image from Example 1 of an exemplary commercially available graphite-silicon composite anode, Nanotek GCA-1200.

GCA-1200, a graphite-silicon composite anode commercially available from Nanotek, was obtained and studied under a scanning electron microscope. FIG. 4A shows the Nanotek GCA-1200 graphite-silicon composite anode. As can be seen in FIG. 4A, the silicon nanoparticles are severely agglomerated (shown in white annotated circles) forming ball-shaped agglomerations nearly as large as the irregular-shaped graphite microparticles 2. Moreover, there is a minimal fraction of silicon particles connected to, or in intimate contact with, the graphite particles.

Figure 4B:
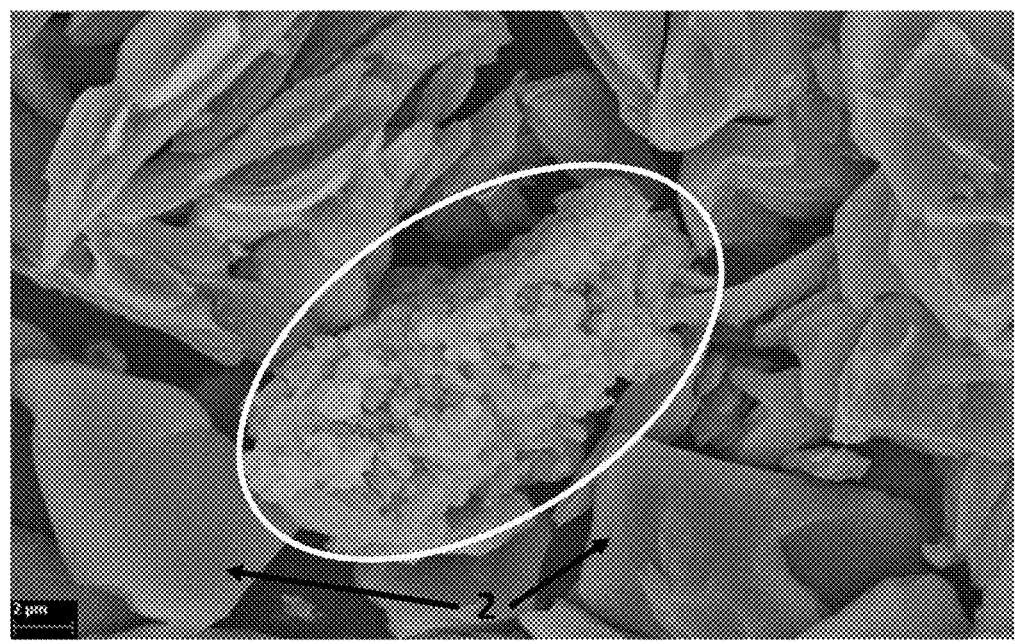
FIG. 4B is an SEM image from Example 1 of an exemplary commercially available graphite-silicon oxide composite anode, Zichen SC-450.

Also, a commercially available silicon oxide-graphite composite anode, Zichen SC-450, was obtained from Jiangxi ZiChen Technology Co., and studied under a scanning electron microscope. FIG. 4B shows the ZiChen silicon oxide-graphite composite anode. As can be seen in FIG. 4B, the silicon oxide nanoparticles are severely agglomerated (shown in the white annotated circle) forming rough agglomerations even larger than the irregular-shaped graphite microparticles 2. Again, there is a minimal fraction of silicon particles connected to, or in intimate contact with, the graphite particles.

Figure 5A:
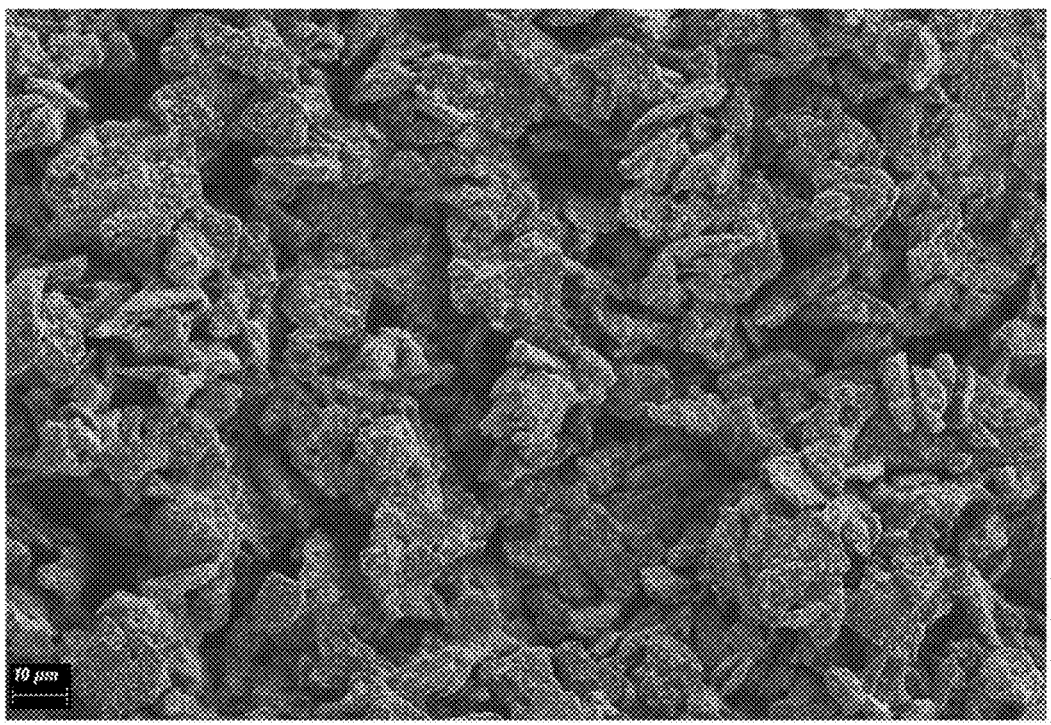
FIGS. 5A-5C are SEM images at different magnifications from Example 1 of well-dispersed, non-agglomerated, silicon nanoparticles attached to the surface of graphite microparticles, by means of the first stage of the layering process disclosed herein.
Figure 5B:
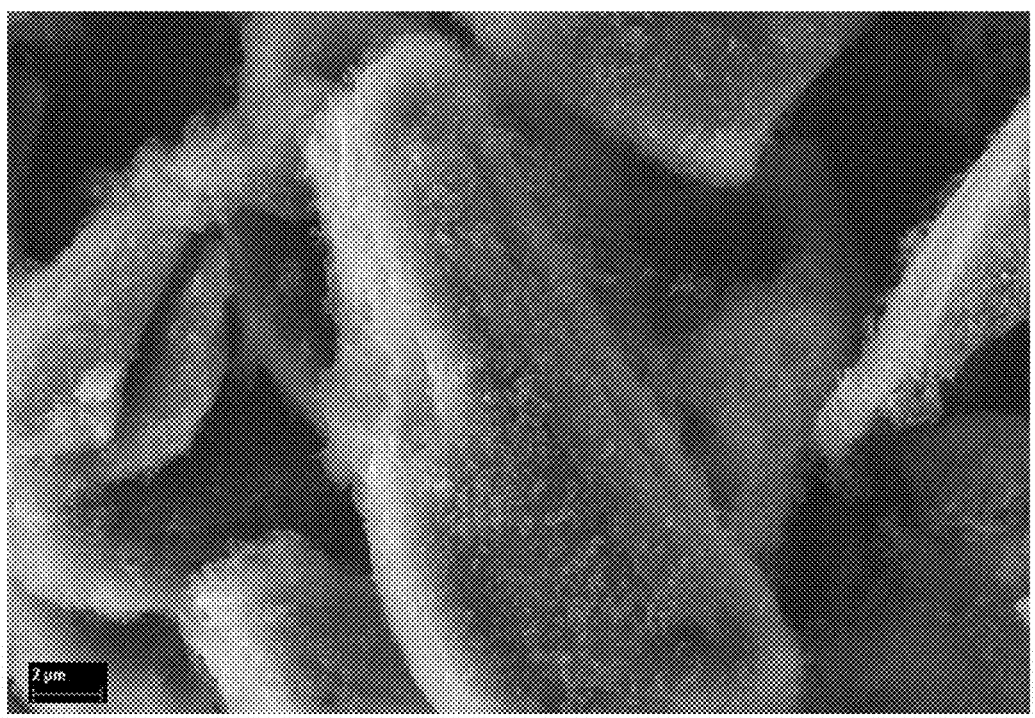
Figure 5C:
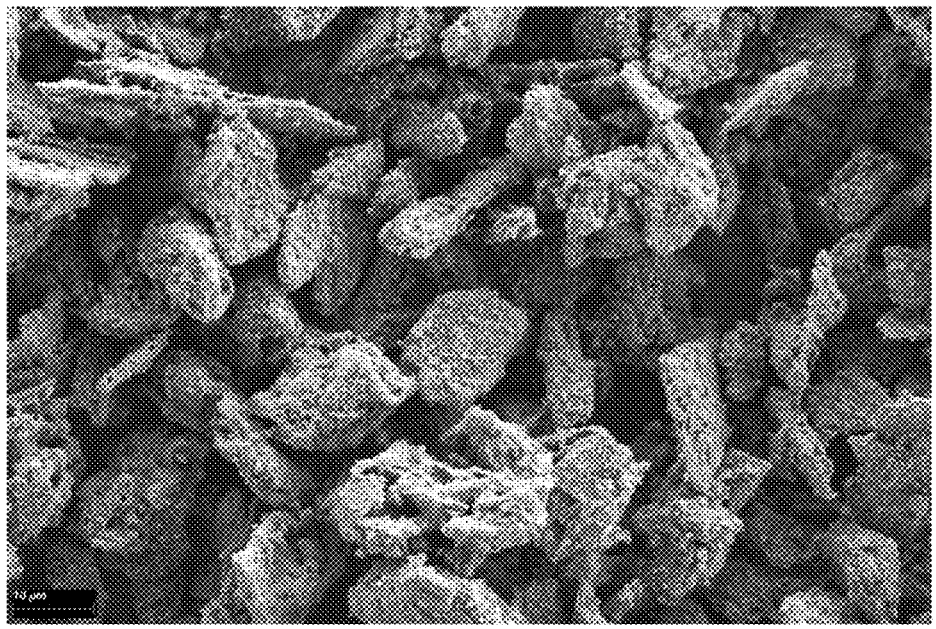

In contrast, silicon nanoparticles were layered on the surface of graphite particles according to the first step of the layering assembly methods disclosed herein. Two compositions were prepared with about 85 wt. % graphite (ZiChen YF-3) and about 15 wt. % silicon (avg. diameter 50 nm). A graphite aqueous suspension was prepared with a cationic surfactant, benzyldodecyldimethylammonium bromide (BddaBr). Two different silicon suspensions were prepared containing different anionic surfactants, one with sodium dodecylbenzene sulfonate (NaDDBS) and the other with sodium dodecyl sulfate (SDS). The pH throughout this process was about 6. Some of the mixture was then rinsed with pressure assisted filtration in 6 times the volume of DI water used in the synthesis. The filtered powder was then dried in a vacuum oven at 110° C. for 12 hours. The results were studied by examining the dried powder under a scanning electron microscope and are shown in FIGS. 5A-5C. The silicon nanoparticles appear as light-colored dust covering all sides of the graphite microparticles in FIGS. 5A-5C. FIGS. 5A and 5B were prepared with NaDDBS as surfactant for silicon suspension. FIG. 5A shows well-dispersed, non-agglomerated, silicon nanoparticles attached to the surface of graphite microparticles, by means of the first stage of the layering process disclosed herein. FIG. 5B is a higher magnification image which shows in greater detail the well-dispersed, non-agglomerated, silicon nanoparticles attached to the surface of graphite microparticles. FIG. 5C was prepared with SDS as the anionic surfactant to demonstrate the methodology is not limited to a single anionic surfactant species. As can be seen in FIG. 5C, the silicon particles are attached in a well-dispersed and non-agglomerated manner consistent with those seen in FIG. 5A.

As another comparative example, to demonstrate the importance of creating sufficient forces of attraction between the different particle types, for example graphite particles and the silicon nanoparticles, we tried to attach the silicon on the surface of the graphite (which had a slightly negative zeta potential) without adding a cationic surfactant to the graphite, but while still adding an anionic surfactant in the silicon suspension. The composition was prepared with about 85 wt. % graphite (ZiChen YF-3) and about 15 wt. % silicon (US Research Nanomaterials, Inc., avg. diameter 50 nm). The silicon aqueous suspension containing an anionic surfactant, sodium dodecylbenzene sulfonate (NaDDBS) was mixed with a graphite aqueous suspension containing no surfactant. The mixture was then rinsed with pressure assisted filtration in 6 times the volume of DI water used in the synthesis. The filtered powder was then dried in a vacuum oven at 110° C. for 12 hours.

Figure 5D:
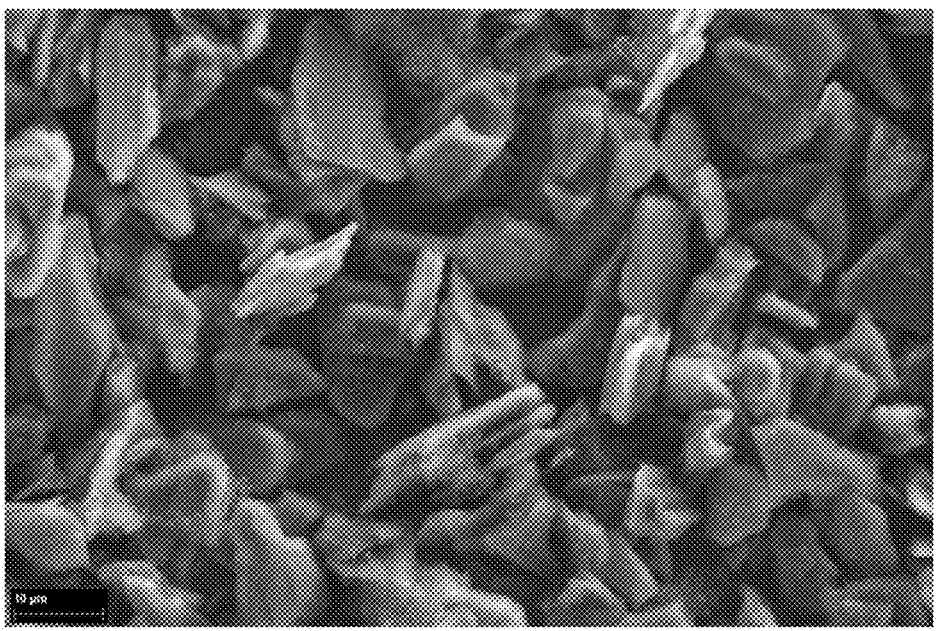
FIG. 5D is SEM image from Example 1 of Si/Graphite composite with only an anionic surfactant in silicon suspension, no cationic surfactant in graphite suspension.

The results were studied by examining the dried powder under a scanning electron microscope and are shown in FIG. 5D. Although the silicon content in the composite is the same as the samples represented in FIG. 5A and FIG. 5C, it is evident that far less silicon can be found on graphite surface in FIG. 5D. Further, unlike the case of traditional mixing of the Si/Graphite by high power sonication in FIGS. 7A-C, huge silicon agglomeration is not observed in those samples. While not wishing to be bound by the theory, it is believed that this can be explained by the dispersion effect of the anionic surfactant NaDDBS in the silicon suspension; whereas the lack of attachment of the dispersed silicon to the surfaces of the graphite particles is believed to arise from the absence of cationic surfactant on the graphite particles. This indicates that the opposing zeta potential charges on the particles to be attached are necessary. In the absence of positive charge on the graphite, part of the relatively well-dispersed (negatively charged) silicon lands on the upper surface of a fraction of the graphite particles through chance impingement, while much of the silicon passes through the filter or ends up on the filter paper during the filtration process.

Figure 6A:
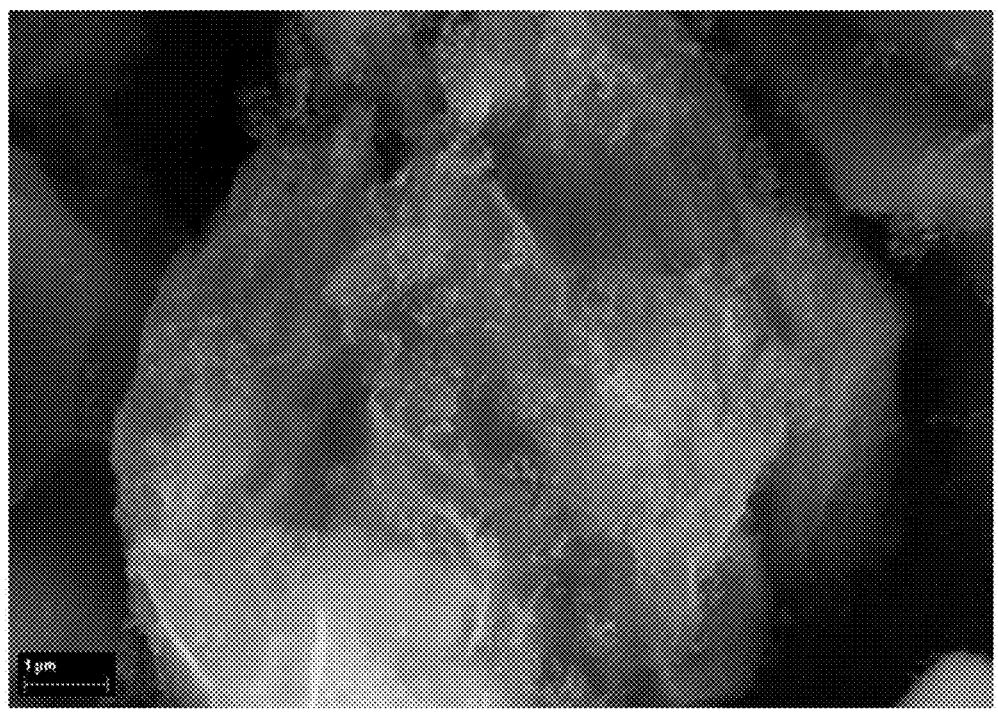
FIG. 6A is an SEM image from Example 1 of an exemplary anode composition having a graphite core, a silicon layer, and a graphene layer prepared according to the methods described herein comprising about 9 wt. % graphene, about 77 wt. % graphite, and about 14 wt. % silicon.
Figure 6B:
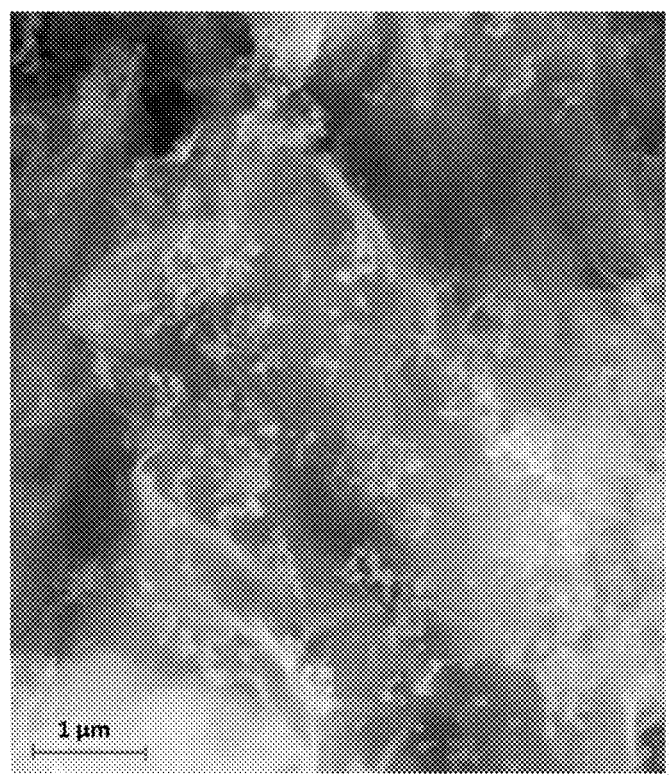
FIG. 6B is a zoomed in view of the SEM shown in FIG. 6A from Example 1.

A graphene layer was deposited on the graphite-silicon composite according to the layering assembly method described herein. The graphene was added in an amount to provide about 9 wt. % graphene, 77 wt. % graphite and 14 wt. % silicon. This dry powder was also examined under scanning electron microscope (as shown in FIGS. 6A and 6B), showing that the graphene formed a covering layer over the silicon layer. The graphene layer forms a transparent veil over the irregular shaped graphite microparticles and light-colored silicon nanoparticles. FIG. 6B is a zoomed in view of a portion of FIG. 6A.

Figure 6C:
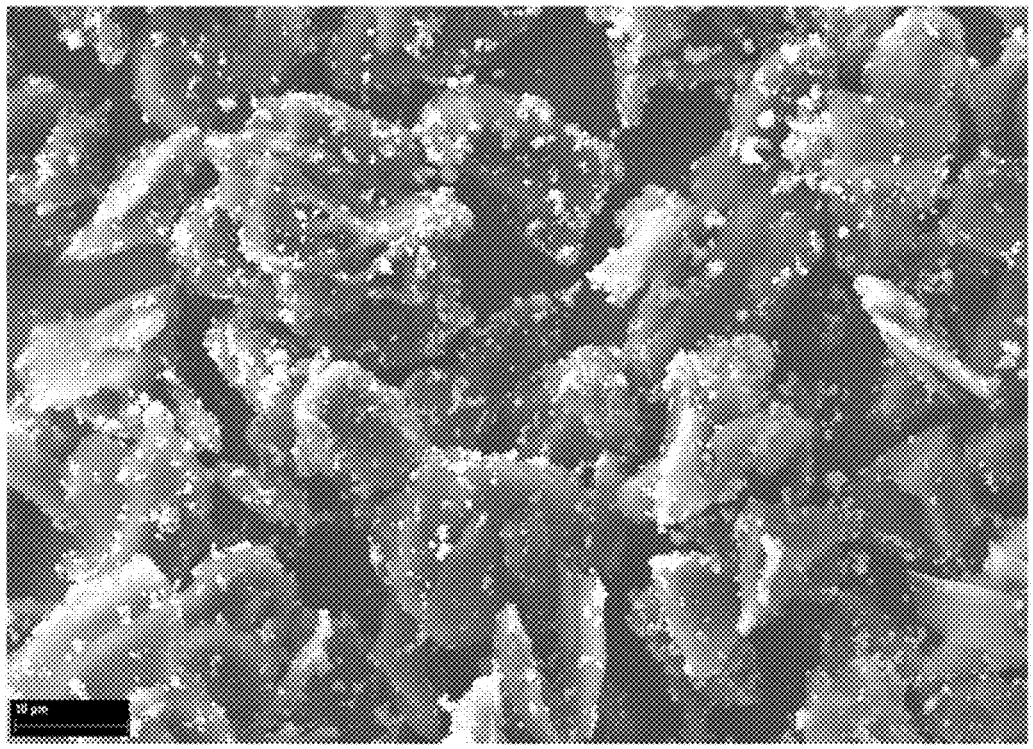
FIGS. 6C and 6D are SEM images from Example 1 of an exemplary anode composition having a graphite core with tin nanoparticles attached prepared according to the methods described herein comprising about 85 wt. % graphite and about 15 wt. % tin.
Figure 6D:
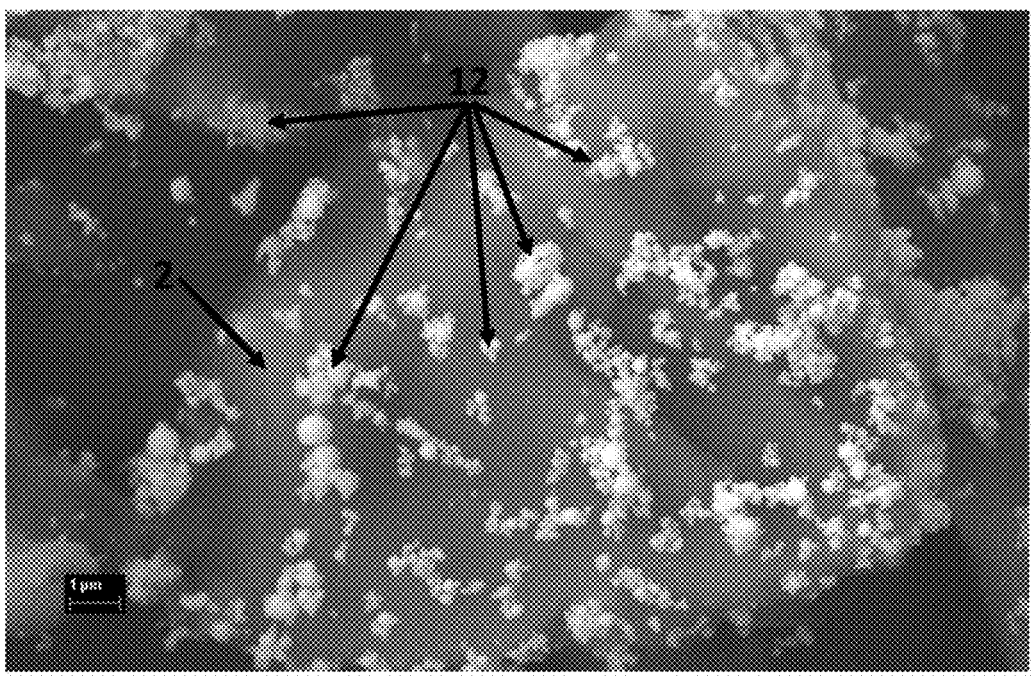
Figure 6E:
FIGS. 6E and 6F are SEM images from Example 1 of an exemplary anode composition having a graphite core with tin and silicon nanoparticles attached to the graphite prepared according to the methods described herein comprising about 80 wt. % graphite, about 10 wt. % silicon, and about 10 wt. % tin.
Figure 6F:
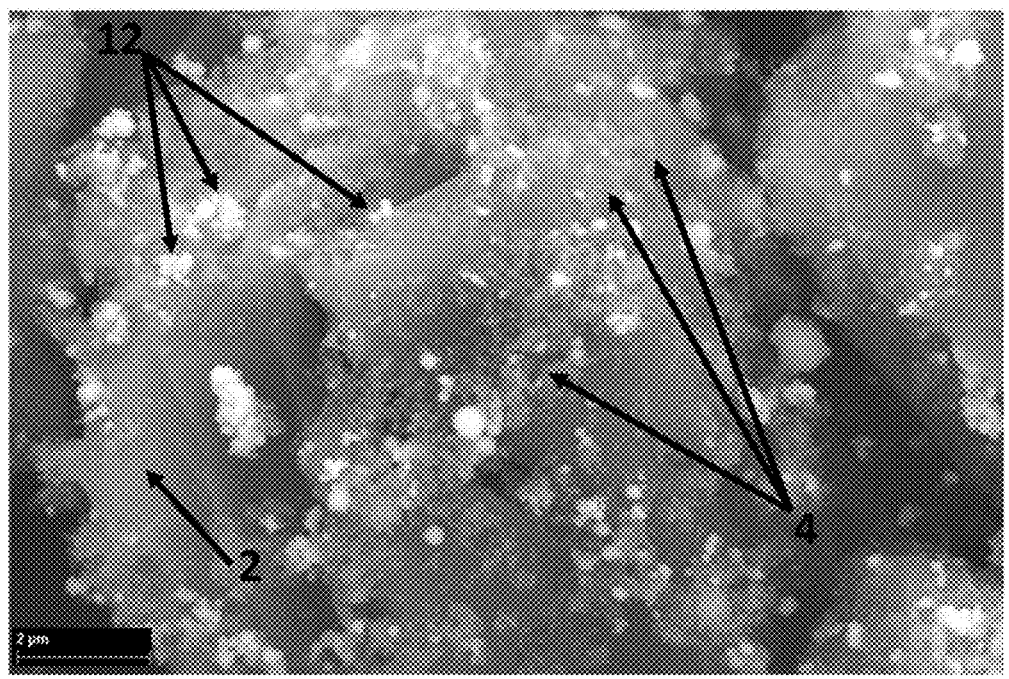

Instead of silicon particles, other electrochemically active particles can be added in addition to or instead of silicon particles. To demonstrate this, tin nanoparticles were attached on the surface of graphite microparticles according to the first step of the layering assembly methods disclosed herein. The composition was prepared with about 85 wt. % graphite (ZiChen YF-3) and about 15 wt. % tin (SkySpring Nanomaterials, Inc., average particle size <100 nm). The graphite aqueous suspension contained a cationic surfactant, benzyldodecyldimethylammonium bromide (BddaBr), and this suspension was mixed with the silicon aqueous suspension containing an anionic surfactant, sodium dodecylbenzene sulfonate (NaDDBS). The mixture was then rinsed with pressure assisted filtration in 6 times the volume of DI water used in the synthesis. The filtered powder was then dried in a vacuum oven at about 110° C. for about 12 hours. The results were studied by examining the dried powder under a scanning electron microscope and are shown in FIGS. 6C and 6D. FIGS. 6C and 6D show well-dispersed, non-agglomerated, tin nanoparticles 12 attached to the surface of graphite microparticles 2, by means of the first stage of the layering process disclosed herein. The tin nanoparticle coverage on the graphite surface is less than that of silicon (as shown in FIG. 5) though at the same weight percentage in the composite. The main reason is due to the larger particle size and higher density of the tin particles; the tin particles have a density of about 7.26 g/cm$^3$, about 3 times that of silicon.

Since both silicon and tin can be well-attached on a graphite surface as illustrated in FIGS. 5-6D, the co-attachment of both silicon and tin particles on graphite surface was assessed. A composition was prepared with about 80 wt. % graphite (ZiChen YF-3), about 10 wt. % tin (SkySpring Nanomaterials, Inc., average particle size <100 nm), about 10 wt. % silicon (US Research Nanomaterials, Inc., average particle size ~50 nm). The graphite aqueous suspension contained a cationic surfactant, benzyldodecyldimethylammonium bromide (BddaBr), and this suspension was mixed with the silicon aqueous suspension containing an anionic surfactant, sodium dodecylbenzene sulfonate (NaDDBS) and tin aqueous suspension containing an anionic surfactant, sodium dodecylbenzene sulfonate (NaDDBS). The mixture was then rinsed with pressure assisted filtration in 6 times the volume of DI water used in the synthesis. The filtered powder was then dried in a vacuum oven at about 110° C. for about 12 hours. The results were studied by examining the dried powder under a scanning electron microscope and are shown in FIGS. 6E and 6F. Tin particles 12 are brighter and larger sized in FIGS. 6E and 6F than the silicon particles 4, which appear relatively darker and smaller in size. As can be seen in FIGS. 6E and 6F, both types of particles are attached on graphite surface 2 without significant agglomeration.

Figure 7A:
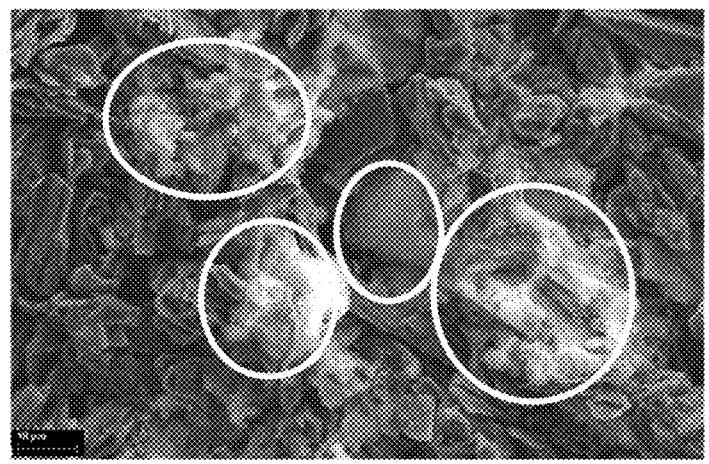
FIGS. 7A-7C are SEM images from Example 1 of graphite-silicon composite anode materials prepared by traditional mixing comprising about 85 wt. % graphite and about 15 wt. % silicon.
Figure 7B:
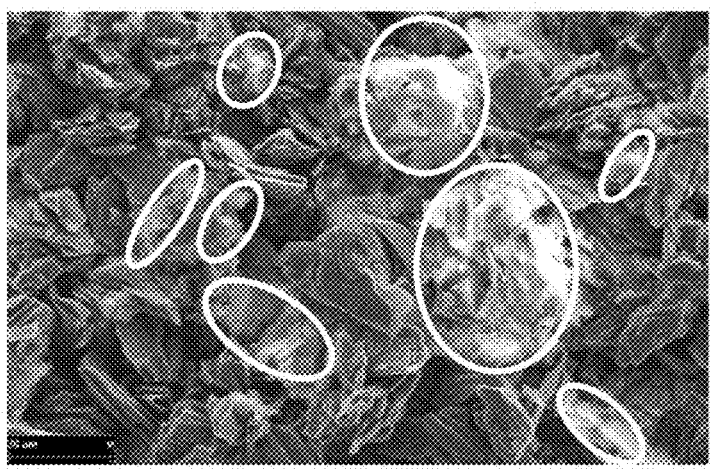
Figure 7C:
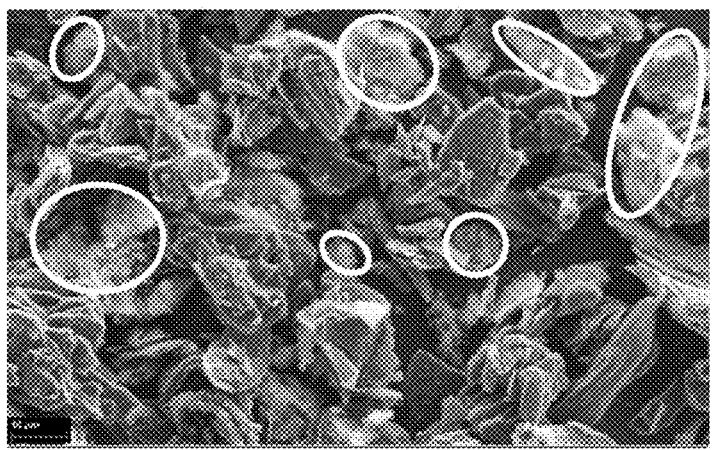

A graphite-silicon composite anode material was synthesized through high power sonication and studied under a scanning electron microscope. The graphite-silicon composite anode material was prepared with about 85 wt. % graphite (ZiChen YF-3) and about 15 wt. % silicon (avg. diameter 50 nm). The mixing method involved high power ultrasonication of the silicon suspension for 2 hours followed by stir-bar mixing with the graphite suspension for 2 hours (this method is referred to as "traditional mixing"). The resulting suspension was filtered and dried to collect the powder for SEM examination. SEM images of the graphite-silicon composite anode material are shown in FIGS. 7A-7C. As can be seen in FIGS. 7A-7C, the silicon nanoparticles are severely agglomerated forming micro-sized agglomeration, which are called out in the figures by circles, and nearly no silicon was attached on graphite surface.

The anode compositions shown in FIGS. 5A, 5B, 5C, 6A and 6B, prepared according to the exemplary layering method described herein, are significantly better in structure than those of the exemplary commercial anode compositions (shown in FIGS. 4A and 4B) and those prepared by traditional mixing (shown in FIGS. 7A-7C). The exemplary layered anode compositions shown in FIGS. 5A-C, 6A-B have well-dispersed, non-agglomerated silicon and/or tin attached to the graphite particles. In contrast, the anode compositions prepared by traditional mixing shown in FIGS. 7A-7C suffer significant agglomeration of silicon particles, examples of which are emphasized in the annotated circle on the SEM images. While not wishing to be bound by the theory, it is believed that this distinction can be explained by the role of the two-surfactants in the layering methodology described herein. In particular, it is believed that the anionic surfactant provides a dispersion effect in the silicon suspension and cationic surfactant with the graphite particles enables the electrostatic attraction between the silicon particles and the graphite particles. In the traditional mixing there is a lack of attachment of the dispersed silicon to the surfaces of the graphite particles which is believed to arise from the absence of cationic surfactant on the graphite particles, which enables the attachment via electrostatic attraction. In the absence of positive charge on the graphite, even if the negatively charged silicon is relatively well-dispersed by a surfactant, the electrostatic attachment is not effectuated resulting in agglomeration and overall poor dispersion of silicon.

This data comparing commercially available anode materials (FIGS. 4A and 4B), traditionally mixed silicon and graphite materials (FIGS. 7A-7C), and various embodiments of layered electrode compositions prepared according to the layering methods described herein (FIGS. 5A-5C, 6F), demonstrates the improved structure of the anode compositions prepared by the layering methods described herein. For example, the layered anodes have well-dispersed silicon particles with significantly reduced agglomeration of silicon particles which are attached to the graphite particles (as shown in FIGS. 5A-5C), and covered by a layer of graphene (shown in FIGS. 6A and 6B). Further, this example demonstrates that the attachment methodology is not limited to graphite, silicon, and graphene as tin particles were also attached in a well-dispersed, non-agglomerated manner (FIGS. 6C-F). Thus, the layered anode compositions have superior structure, which results in improved electrical properties as demonstrated in Example 2.

Example 2

An exemplary graphite-silicon anode composition was prepared according to the layering assembly method described herein and tested against a graphite-silicon (85:15) composite anode prepared by traditional mixing as described in Example 1. The exemplary layered anode, on the other hand, was prepared according to the layering method described in Example 1, paragraph [232]. The exemplary layered anode had an electrochemically active graphite core with silicon as the electrochemically active particles added by the layering. The silicon was loaded at about 15 wt. % of the active composition and was well-dispersed and attached on graphite particle forming the core. The exemplary layered anode was mixed with sodium carboxyl methyl cellulose (CMC), styrene butadiene rubber (SBR) and conductive carbon particles (C65) in the weight ratio of about 85:10: 2.5:2.5 to form a slurry. The slurry was then cast on a copper current collector and vacuum dried at 110° C. overnight. The resulting anode comprising the exemplary layered anode composition was prepared by punching 1.77 cm$^2$ circles for use in half cell test. The resulting exemplary layered anode was compared with an anode prepared by traditional mixing having the same amount of graphite, silicon, carbon black, binder. Both anodes were assembled into half-cells in the same manner and tested under same conditions.

A half-cell was tested for specific capacity to compare the anode compositions prepared according to these different methods. The counter electrode was a lithium chip available from MTI Corp. having a diameter of 15.6 mm and a thickness of 0.45 mm. A separator (Celgard 2325) was used to separate working and counter electrodes. A controlled amount (100 L) or electrolyte was used. The electrolyte was 1.0 M LiPF$_6$ in EC:EMC (3:7 wt./wt.) with additives, including FEC and VC as additives. The cell was rest for 24 hours before cycling. The assembled half-cell was loaded on a galvanometric battery tester and subjected to charging/discharging under the following protocol: The cell testing protocol consisted of one constant current (CC) formation cycle at charge/discharge rate of ~C/20, followed by constant-current/constant-voltage (CC-CV) discharge at ~C/2 rate with C/10 as constant voltage cutoff current and C/2 constant current charge cycling. The rest time between each charge and discharge was 5 min. The voltage window was between 0.01 V and 1 V. The discharge capacity and active material loading were used to calculate the specific capacity. The galvanometer used was a Neware battery tester.

The results are shown in FIG. 8, which demonstrates the superiority of the anode compositions prepared according to the layering assembly method described herein. As can be seen in FIG. 8, the anode comprising the exemplary layered anode composition provided nearly 200 mAh/g higher capacity than the control anode prepared by traditional mixing. Further, the anode comprising the exemplary layered anode composition exhibited no observable capacity fade after the first charge/discharge cycle, whereas the control anode continued to exhibit capacity fade.

A full-cell battery in pouch format was also tested against a full-cell control having a commercially available graphite anode. The cathode in both full-cell batteries was an NCM-111 (93 wt. %) available from BASF and included 4 wt. % of conductive additives (1.5 wt. % TIMICAL SUPER C65 and 2.5 wt. % SFG-6L), 3 wt. % Kynar HSV900 PVDF binder, and N-methylpyrrolidone as the solvent. The control anode was a ZiChen YF-3 graphite anode (90 wt. %) and included 2.5 wt. % of a conductive additive (TIMICAL SUPER C65), 7.5 wt. % poly(acrylic acid) binder (MW ~100,000, 25 wt. % in water), and water as the solvent. The control anode was tested against an anode comprising an exemplary layered anode composition comprised of 90 wt. % of the anode composition, 2.5 wt. % conductive additive (TIMICAL SUPER C65), 7.5 wt. % poly(acrylic acid) binder (MW ~100,000, 25 wt. % in water), and water as the solvent. The electrolyte in both full-cell batteries was PuriEL (1.0 M LiPF$_6$ in EC/EMC 3/7 wt./wt. with additives FEC and VC) available from SoulBrain MI in Northville, Mich.

Both full-cell batteries included the following inactive components: a Celgard 2320 Separator (0.0010 g/cm$^2$; 20 m thick; 0.48 g/cm$^3$); an aluminum laminated pouch (0.0185 g/cm$^2$; 115 μm thick; 1.61 g/cm$^3$); an aluminum collector foil for the cathode (10 μm thick; 2.94 g/cm$^3$); a copper collector foil for the anode (6 m thick; 8.91 g/cm$^3$); PuriEL electrolyte (~1.19 g/cm$^3$).

The assembled full-cell was loaded on a galvanometric battery tester available from Neware and subjected to charging/discharging under the following protocol: CC charging at C/2 rate followed by CV charging at C/20 current cutoff, CC discharging at 1 C rate. The test voltage window was set as 3.0-~4.3 V. The rest time between each charge and discharge was 5 min.

Full-cell volumetric and gravimetric energy density calculations were performed. The discharge energy was used to calculate the gravimetric and volumetric energy density. The results are shown in FIGS. 9A and 9B. FIG. 9A shows the comparative volumetric energy density results in Wh/L. FIG. 9B shows the comparative gravimetric energy density in Wh/kg. As can be seen in FIGS. 9A and 9B, the battery with the exemplary layered anode composition provided much higher energy density (both volumetric and gravimetric) than the graphite control anode. Further, the exemplary layered anode exhibited no more observable capacity fade than the control anode.

The full-cell was prepared as single-side coated electrode, but in commercial application it will likely be double-sided. Because of this, half the thickness and half the mass of the current collectors were used in the energy density calculation. Also, a single pair of electrodes was used in the full-cell testing, whereas a commercial cell would typically incorporate multiple pairs to increase the cell capacity. In the calculations for FIGS. 9A and 9B, the cell capacity was assumed to be 3000 mAh which requires 50 pairs of such electrodes. So 1/50 of the volume and mass of the aluminum laminated pouch was used in the energy density calculation.

The actual NCM-111 specific capacity in the full cell containing the exemplary layered anode composition was ~125 mAh/g, which is a reasonable value as compared to its theoretical capacity of 155 mAh/g. The full cell energy density can be further enhanced by incorporating other cathode materials with higher specific capacities (up to 240 mAh/g), such as lithium nickel aluminum oxide $LiNi_{0.5}Co_{0.15}Al_{0.15}O_2$(NCA), high nickel content lithium nickel manganese cobalt oxide $LiNi_xCo_yMn_zO_2$ (NMC-442: $LiNi_{0.42}Mn_{0.42}Co_{0.16}O_2$, NMC-532: $LiNi_{0.5}Mn_{0.3}Co_{0.2}O_2$, NMC-622: $LiNi_{0.6}Mn_{0.2}Co_{0.2}O_2$, NMC-811: $LiNi_{0.5}Mn_{0.1}Co_{0.1}O_2$. In addition, the full cell operation voltage can be increased by selecting proper electrolytes and additives which will be stable at a higher cutoff voltage window. The volumetric and gravimetric energy density of the full cell containing the exemplary layered anode composition (with only a single silicon layer) paired with a high-performance cathode with a specific capacity of 200 mAh/g could be higher than 850 Wh/L and 400 Wh/kg, respectively.

Example 3

An exemplary anode composition was prepared with a single silicon layer was prepared according to steps 1 and 2 of FIG. 3A with YF-3 graphite (available from Jiangxi Zichen), 50 nm silicon (available from US Research Nanomaterials, Inc.) in the weight ratio of 85:15, and as described in Example 1, paragraph [232]. The anode composition was in the form of a powder and collected by pressure assisted filtration of the suspension and washed with the same volume of DI water used in the synthesis. Then the powder was heat treated in a tube furnace at 500° C. for 2 hours in Argon atmosphere. The heat-treated powder was used as active material in the electrode casting process. This active material is referred to as the exemplary layered anode composition through this example.

An electrode slurry was prepared by mixing the exemplary layered anode composition, poly(acrylic acid) binder ($M_v$ ~450,000, Sigma-Aldrich), and conductive carbon particles (C65, Timcal corp.) in the weight ratio of about 90:7.5:2.5. The slurry was then cast on a copper current collector and vacuum dried at 110° C. overnight. The resulting electrode was punched to 1.77 $cm^2$ circles and tested in a CR-2032 coin cell pairing with lithium foil separated with a separator (Celgard 2325). A controlled amount (100 aL) electrolyte was used. The electrolyte was 1.0 M $LiPF_6$ in EC:EMC (3:7 wt./wt.) including FEC and VC as additives. The cell was rested for 24 hours before cycling.

Figure 10A:
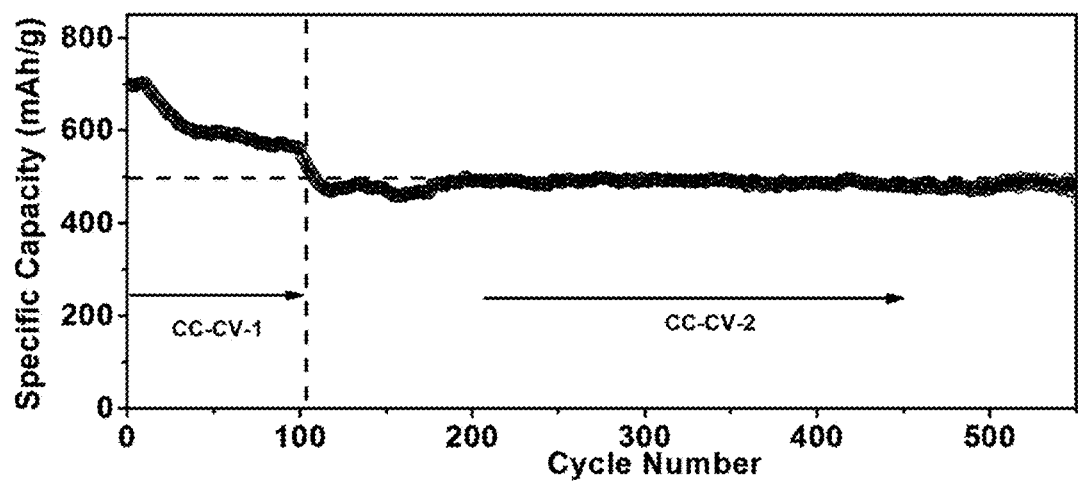
FIG. 10A is a graph from Example 3 showing the specific capacity (mAh/g) over 550 cycles in a half-cell of an anode containing an exemplary layered anode composition prepared by the layering methods described herein.
Figure 10B:
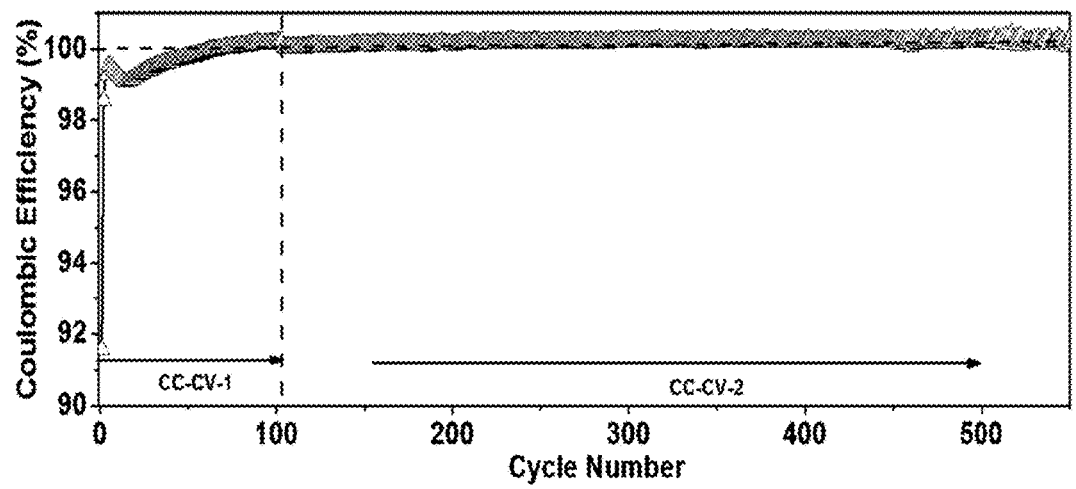
FIG. 10B is a graph from Example 3 showing the Coulombic efficiency (%) over 550 cycles in a half-cell of an anode containing an exemplary layered anode composition prepared by the layering methods described herein.
Figure 10C:
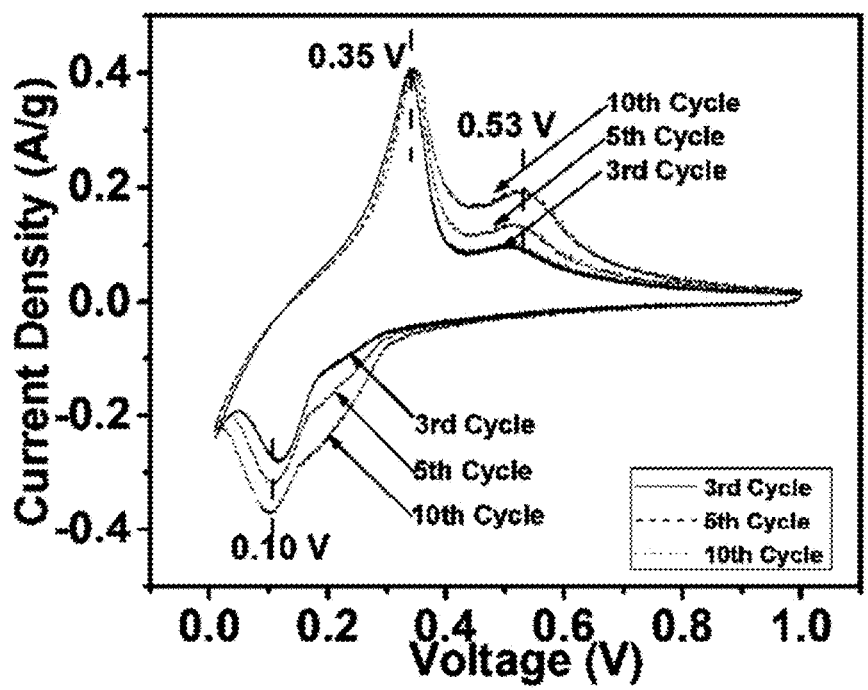
FIG. 10C is a graph from Example 3 showing cyclic voltammetry curves at a scan rate of 0.2 mV/s of an anode containing an exemplary layered anode composition prepared by the layering methods described herein.
Figure 10D:
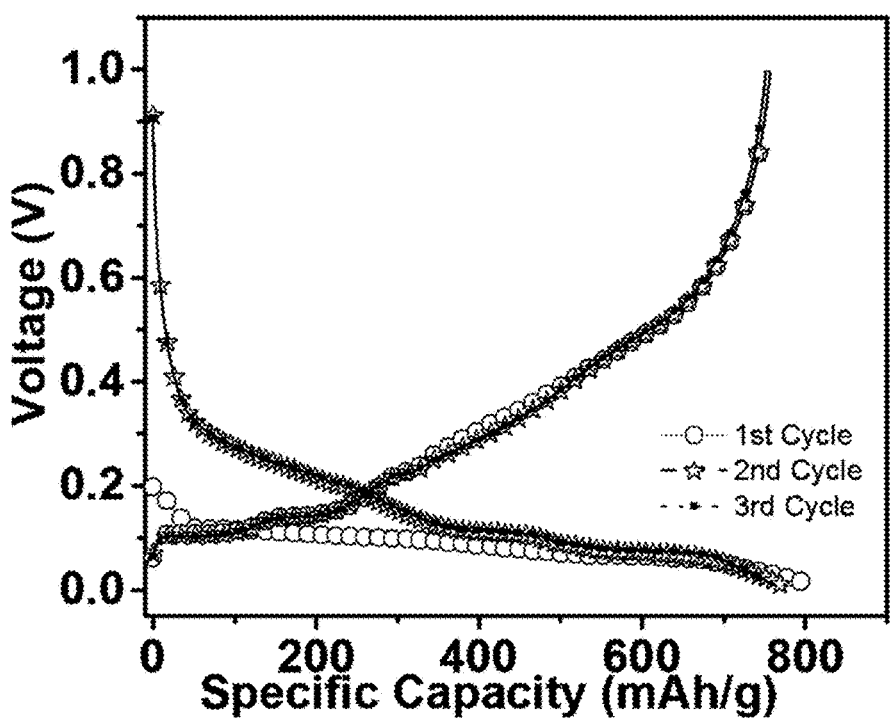
FIG. 10D is a graph from Example 3 showing forming cycle charge-discharge curves of an anode containing an exemplary layered anode composition prepared by the layering methods described herein.

The cell testing protocol was a three, constant current (CC) formation cycle at a charge/discharge rate of ~C/20, followed by constant-current/constant-voltage (CC-CV) cycling at C/2 rate with C/20 as constant voltage cutoff current (CC-CV-1), and then 1 C constant current with C/10 as constant voltage cutoff current (CC-CV-2). The voltage window was between 0.01 V and 1 V. All the cycling tests were conducted at room temperature. The electrochemical performance is shown in FIG. 10A (Specific capacity vs. cycle number), 10B (Coulombic Efficiency vs. cycle number), 10 C (Cyclic voltammetry (CV) curves at the scan rate of 0.2 mV/s) and 10D (Forming cycle charge-discharge curves). In FIG. 10C, the broad cathodic peak centered at ~0.10 V corresponds to the lithium intercalation process into graphite and the alloying process with silicon. The anodic peaks at 0.35 V and 0.53 V represent the lithium de-intercalation from graphite and de-alloying with silicon. The increasing intensity of the cathodic and anodic peaks indicate the activation process of the electrode, which may be attributed to better electrolyte infiltration and new contact between active material and conductive additives. FIG. 10 D is the charge-discharge curve of three forming cycles for an exemplary layered anode composition anode. The well-overlapped charge-discharge curves from the second to the third cycle indicate good electrochemical reversibility.

Example 4

Figure 11:
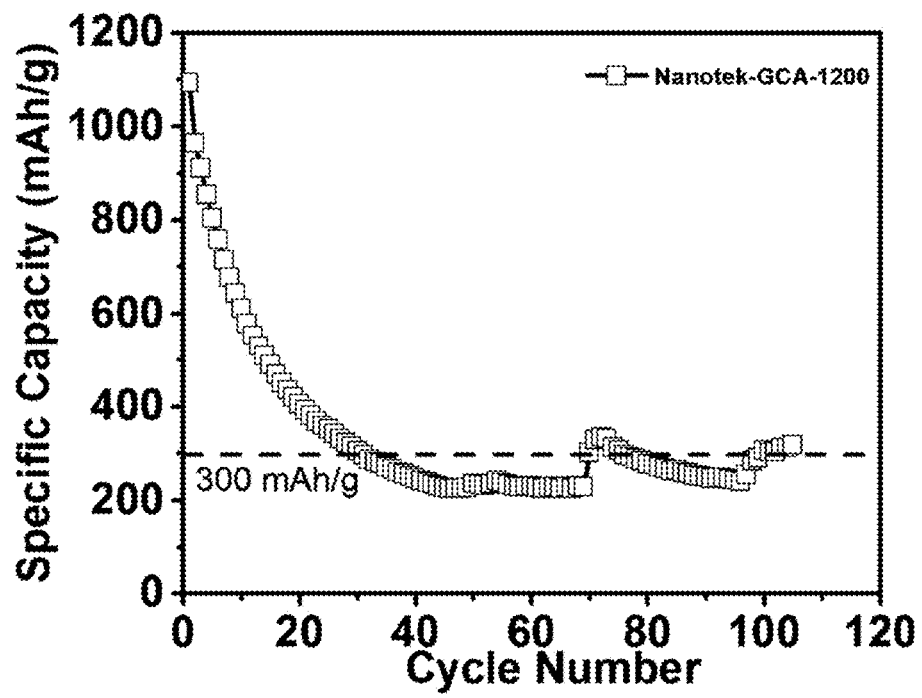
FIG. 11 is a graph from Example 4 showing the change in specific capacity (mAh/g) of a commercially available graphite-silicon composite anode (Nanotek GCA-1200) over more than 100 cycles.

The electrochemical performance of the commercially available graphite-silicon composite, Nanotek, GCA-1200, described in paragraph [230] and FIG. 4A, was tested as a comparative example. The preparation of the slurry, using Nanotek, GCA-1200 as the active material, the preparation of the anode, and the electrochemical testing of the anode were all carried out according to the same protocols as those described in Example 3. The electrochemical performance of the Nanotek GCA-1200 anode is shown in FIG. 11, which shows the specific capacity over more than 100 cycles. Although starting at close to the 1200 mAh/g specific capacity specified in the product description, the specific capacity declines rapidly with cycle number, and by about 30 cycles it has a similar capacity to that expected of a graphite anode.

Example 5

Figure 12:
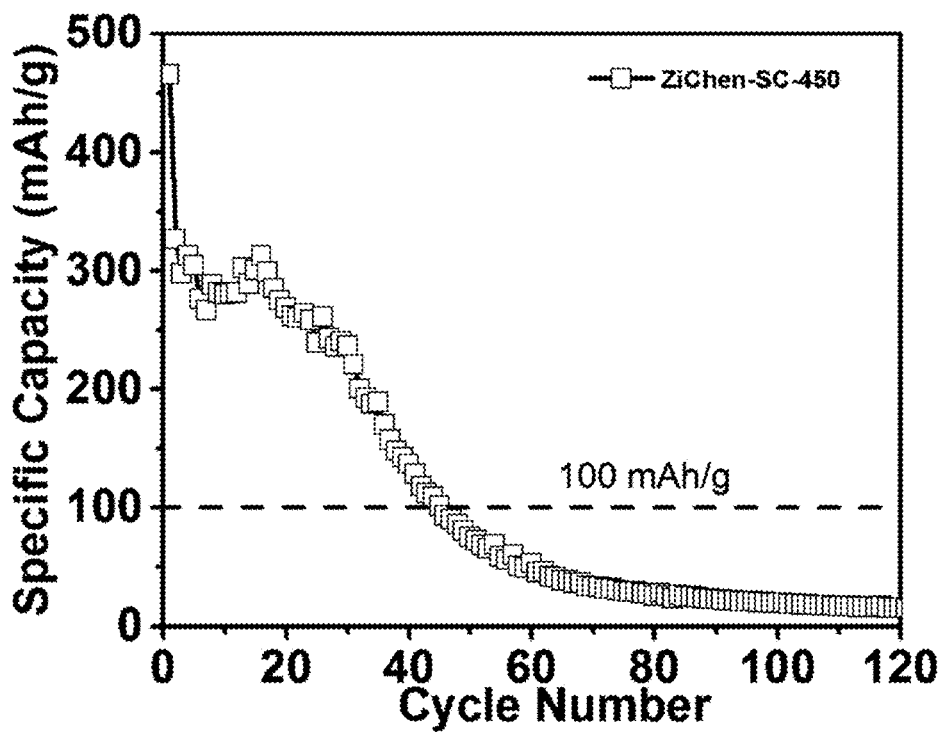
FIG. 12 is a graph from Example 5 showing the change in specific capacity (mAh/g) of a commercially available silicon oxide-graphite composite anode (Zichen SC-450) over 120 cycles.

The electrochemical performance of the commercially available silicon oxide-graphite anode composite, Zichen SC-450, described in paragraph [231] and FIG. 4B, was tested as a comparative example. The preparation of the slurry, using Zichen SC-450 as the active material, the preparation of the anode, and the electrochemical testing of the anode were all carried out according to the same protocols as those described in Example 3. The electrochemical performance of the Zichen SC-450 is shown in FIG. 12, which shows the specific capacity over 120 cycles. Although starting at close to the 450 mAh/g specific capacity specified in the product description, the specific capacity declines rapidly with cycle number, and by about 50 cycles it has a specific capacity of only about 100 mAh/g.

Example 6

Figure 13:
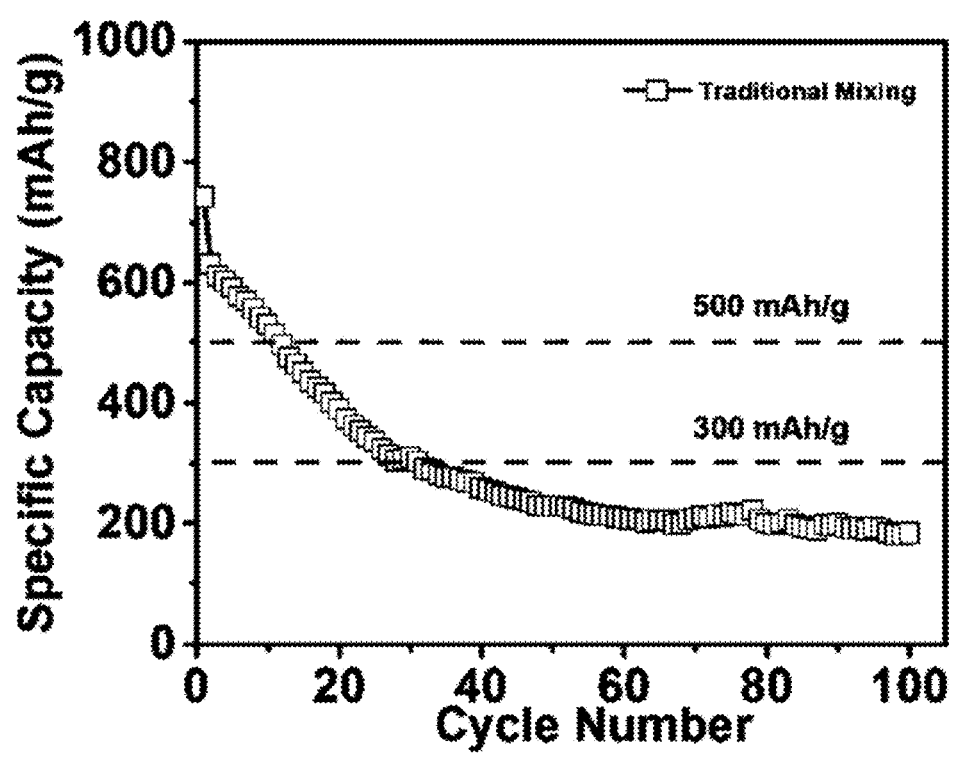
FIG. 13 is a graph from Example 6 showing the change in specific capacity (mAh/g) of a silicon-graphite anode prepared by traditional mixing at a ratio of silicon to graphite of about 15:85 over 100 cycles.

A graphite-silicon anode material was prepared by simple mixing of suspensions of graphite and silicon in a graphite to silicon ratio of about 85:15. The mixing method involved high power ultrasonication of the silicon suspension for about 30 minutes followed by stir-bar mixing of the graphite and silicon suspension for about 2 hours. This was followed by the same electrode preparation and the electrochemical testing according to the same protocols as those described in Example 3. This anode material was then tested as a comparative example. The electrochemical performance of the silicon-graphite mixture electrode is shown in FIG. 13, which shows the specific capacity over 100 cycles. Although starting at close to the specific capacity of the exemplary layered anode in Example 3, FIG. 13 demonstrates that the specific capacity declines rapidly with cycle number, and by about 30 cycles it has a specific capacity of only about 300 mAh/g, and continues to decline significantly thereafter.

Example 7

Figure 14A:
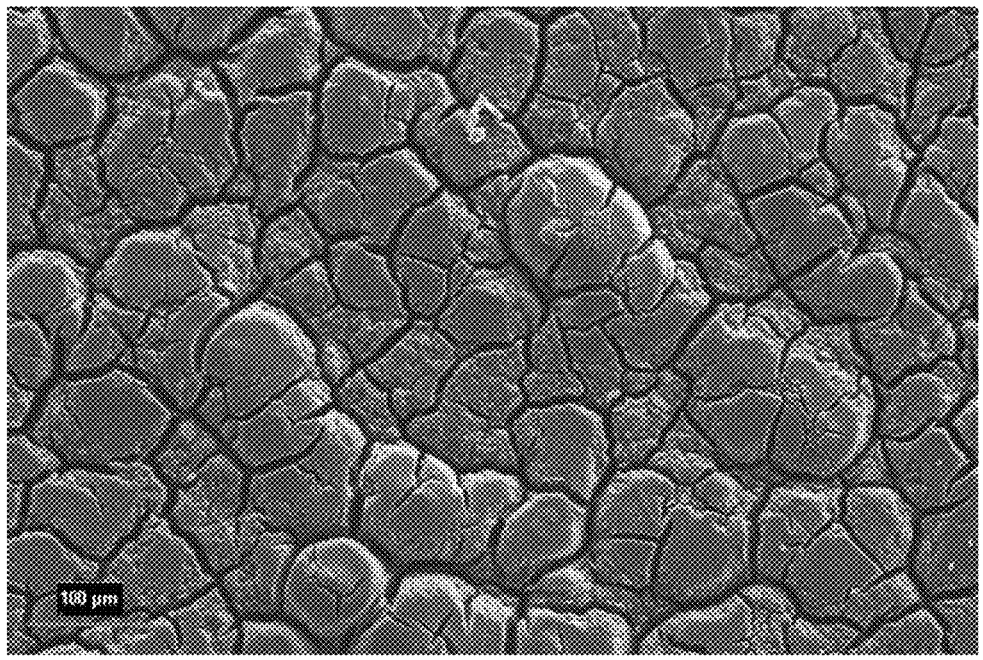
FIG. 14A shows an SEM image from Example 7 of a disassembled silicon-graphite anode material prepared by traditional mixing at a ratio of silicon to graphite of about 15:85 after 40 cycles of half-cell testing.
Figure 14B:
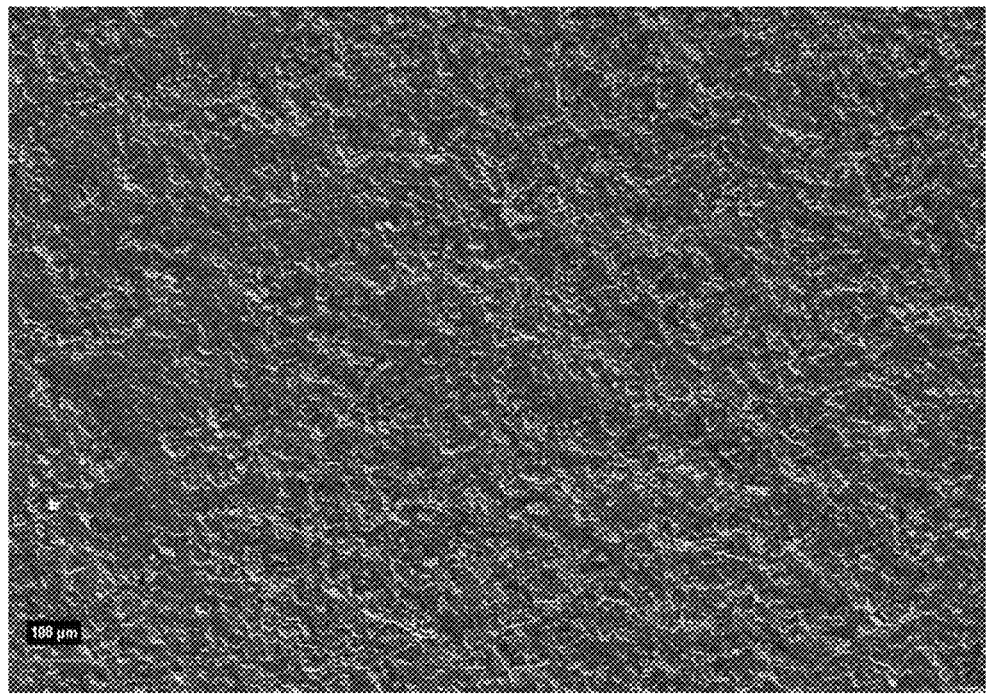
FIG. 14B shows an SEM image from Example 7 of a disassembled silicon-graphite anode material prepared by layering methods according to steps 1 and 2 of FIG. 3A at a ratio of silicon to graphite of about 15:85 after 100 cycles of half-cell testing.

The changes in electrode morphology of both the exemplary layered electrode and electrode prepared by traditional mixing of silicon and graphite were studied by scanning electron microscope analysis of cycled cells after disassembling them. Half-cells were assembled according to the descriptions in Example 3 and Example 6, respectively, for the exemplary layered anode and the anode prepared by traditional mixing of silicon and graphite. FIG. 14A shows the SEM images of the Si/Graphite anode prepared by traditional mixing after 40 cycles of half-cell testing under CC-CV test mode with ~C/3 rate. FIG. 14A shows the anode material suffered severe micro-sized cracks throughout the cycled anode. This cracking is primarily due to the unevenly distributed strain/stress during cycling. These cracks are one of the reasons for the fast drop in specific capacity which was observed above. FIG. 14B shows an SEM image of the exemplary layered anode after 100 cycles of half-cell testing under CC-CV test mode with ~C/3 rate. FIG. 14B shows that the exemplary layered anode did not suffer any obvious cracks. This indicates good electric contact between silicon and graphite particles even after 100 cycles.

Thus, the comparison of FIGS. 14A and 14B demonstrates that the exemplary layered anode prepared according to the layering methods described herein provides superior structure and structural stability to an anode material prepared with the same ingredients at the same weight ratio after repeated cycling. This demonstrates the layered anode compositions prepared according to the layering methods described herein overcome the problems that result from the swelling and shrinking of the silicon during cycling. The swelling and shrinking of silicon during cycling resulted in cracks in the anode composition prepared by traditional mixing resulting in the break of electrical contact points between the silicon and graphite particles which contributes to capacity fade over cycling. The structural differences observed in the disassembled anode materials in FIGS. 14A and 14B are thus consistent with the earlier data showing reduced specific capacity fade in the anode materials prepared by traditional mixing versus the exemplary layered anodes prepared according to the layering methods described herein.

Example 8

An exemplary layered anode composition was prepared with a first silicon layer on a graphite core, followed by 1 graphene layer, followed by a second silicon layer (i.e. graphite-Si-graphene-Si) according to the method shown in steps 1, 2 and 3 of FIG. 3A, with YF-3 graphite (Jiangxi Zichen), 50 nm silicon (US Research Nanomaterials, Inc.), graphene (XG Science, GnP-M-15) in the weight ratio of about 66.7:28.6:4.7. The silicon amounts added in steps 1 and 3 were the same (half of the total silicon loading in the composite). The cationic surfactant used in the aqueous suspension of graphite and the aqueous suspension of graphene was benzyldodecyldimethylammonium bromide (BddaBr). The anionic surfactant used in the aqueous suspension of silicon was sodium dodecylbenzene sulfonate (NaDDBS). The synthesized powder was collected by pressure assisted filtration of the suspension and washed with the same volume of DI water used in the synthesis. Then the powder was heat treated in a tube furnace at about 500° C. for about 2 hours in Argon atmosphere. The heat-treated powder was used as active material in the electrode casting process.

An electrode slurry was prepared by mixing the exemplary layered anode composition, poly(acrylic acid) binder ($M_y$ ~450,000, Sigma-Aldrich), and conductive carbon particles (C65, Timcal corp.) in the weight ratio of about 90:7.5:2.5. The slurry was then cast on a copper current collector and vacuum dried at 110° C. overnight. The resulting anode was punched to 1.77 cm$^2$ circles and tested in a CR-2032 coin cell pairing with lithium foil separated with a separator (Celgard 2325). A controlled amount of 100 µL electrolyte was used. The electrolyte was 1.0 M LiPF$_6$ in EC:EMC (3:7 w/w) including FEC and VC as additives. The cell was at rest for 24 hours before cycling.

The cell testing protocol consisted of a constant current (CC) formation cycle at a charge/discharge rate of ~C/20, followed by constant-current/constant-voltage (CC-CV) cycling at ~C/4 rate with C/10 as constant voltage cutoff current. The voltage window was between 0.01 V and 1 V. All the cycling tests were conducted at room temperature. The electrochemical performance of the (graphite-Si-graphene-Si) layered anode is shown in curve (a) of FIG. 15A, which shows the change in specific capacity over repeated cycling.

For purposes of comparison, an exemplary layered anode composition was prepared with a single silicon layer on a graphite core in a ratio of graphite to silicon of about 85:15 according to the method shown in steps 1 and 2 of FIG. 3A. YF-3 graphite (Jiangxi Zichen) and 50 nm silicon (US Research Nanomaterials, Inc.) were used. The cationic surfactant used in the aqueous suspension of graphite was BddaBr. The anionic surfactant used in the aqueous suspension of silicon was NaDDBS. As described in paragraph [232], the synthesized powder was collected by pressure assisted filtration of the suspension and washed with the same volume of DI water used in the synthesis. Then the powder was heat treated in a tube furnace at about 500° C. for about 2 hours in Argon atmosphere. The heat-treated powder was used as active material in the electrode casting process. The slurry was prepared according to the method described in paragraph [239]; and the half-cell assembly and testing were carried out as described in paragraph [240]. The electrochemical performance of this graphite-silicon layered anode is shown in curve (b) of FIG. 15A which shows the change in specific capacity over repeated cycling.

For purposes of providing a baseline comparison, a graphite anode was prepared using YF-3 graphite (Jiangxi Zichen). The electrode slurry was prepared by mixing the YF-3 graphite, poly(acrylic acid) binder ($M_y$ ~450,000, Sigma-Aldrich), and conductive carbon particles (C65, Timcal corp.) in the weight ratio of about 90:7.5:2.5. The half-cell assembly and testing were carried out as described in paragraphs [239] and [240]. The electrochemical performance of this graphite anode shown in curve (c) of FIG. 15A, which shows the change in specific capacity over repeated cycling.

Figure 15B:
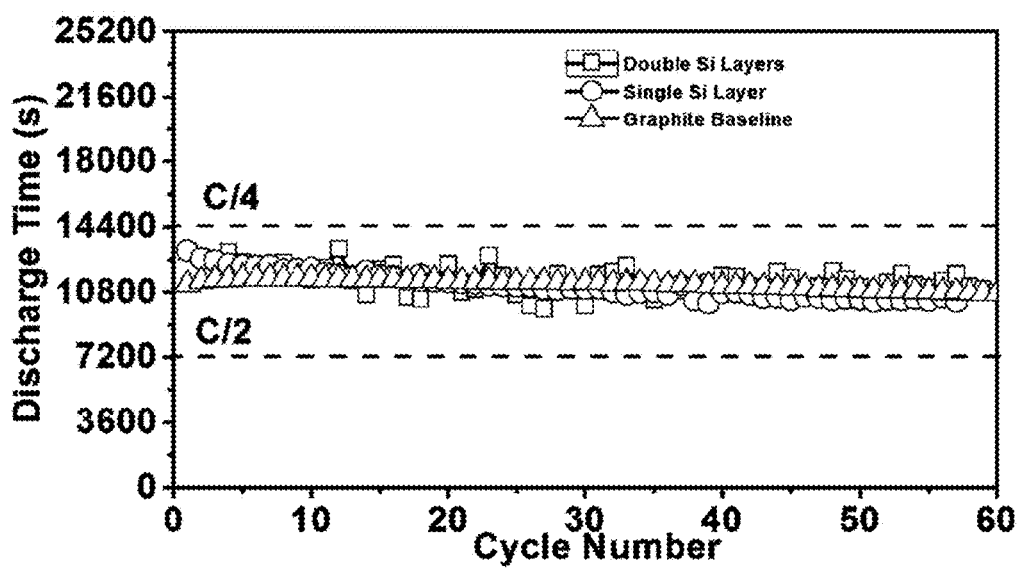
FIG. 15B is a graph from Example 8 showing the actual discharge rate of the three anode compositions tested.

The actual discharge rate was also evaluated for each of the anode compositions (i.e., the graphite control, layered anode composition with a single silicon layer, and the layered anode composition with two layers of silicon). The results in FIG. 15B show the actual discharge time during cycling for all three anodes to evaluate any actual rate changes during cycling at the chosen cycle rate. The actual discharge rates demonstrate that all three anodes cycled at a similar rate throughout the test.

Example 9

Figure 16B:
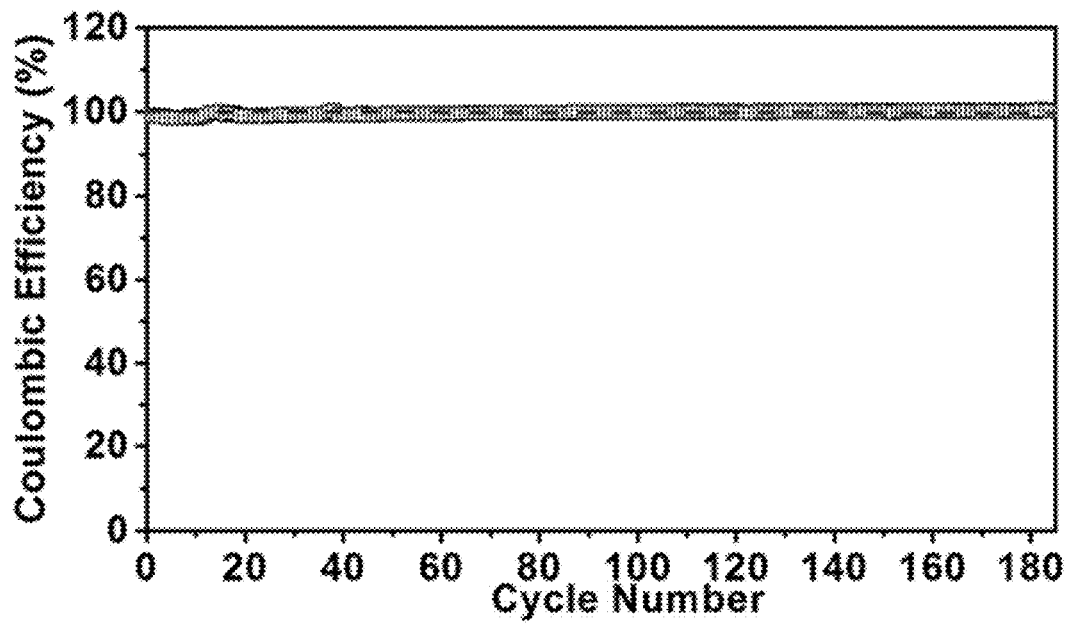
FIG. 16B is a graph from Example 9 showing the Coulombic efficiency (%) over more than 190 cycles of an exemplary layered anode composition prepared according to the methods described herein having a graphite core, two layers of silicon and one layer of graphene.

The graphite-Si-graphene-Si multilayer exemplary anode described in Example 8 was further cycled under the conditions detailed in Example 8. The longer-term cycling data for this anode is shown in FIG. 16A, which provides data for about 190 cycles. As can be seen in this figure, after the initial cycle fade, the anode's specific capacity leveled at about 700 mAh/g. The Coulombic efficiency of the anode was also evaluated as a function of the cycle number. This data is shown in FIG. 16B. As can be seen in FIG. 16B, the exemplary layered anode consistently had about 100% Coulombic efficiency.

Example 10

Testing was performed to assess the effect of pH and/or surfactant concentration on the zeta potential of various preferred ingredients. Preferred ingredients tested included for exemplary purposes graphite microparticles, silicon particles, graphene, and two-dimensional graphite particles. To perform the testing, suspensions of the different particles were prepared in various surfactants at increasing surfactant concentrations and the zeta potential was measured by a Malvern Zetasizer Nano ZS instrument. Similarly, different particles were prepared in various surfactants to form suspensions and the pH was adjusted to assess the effect of pH on the zeta potential. The results are provided in FIGS. 17-23.

Figure 17:
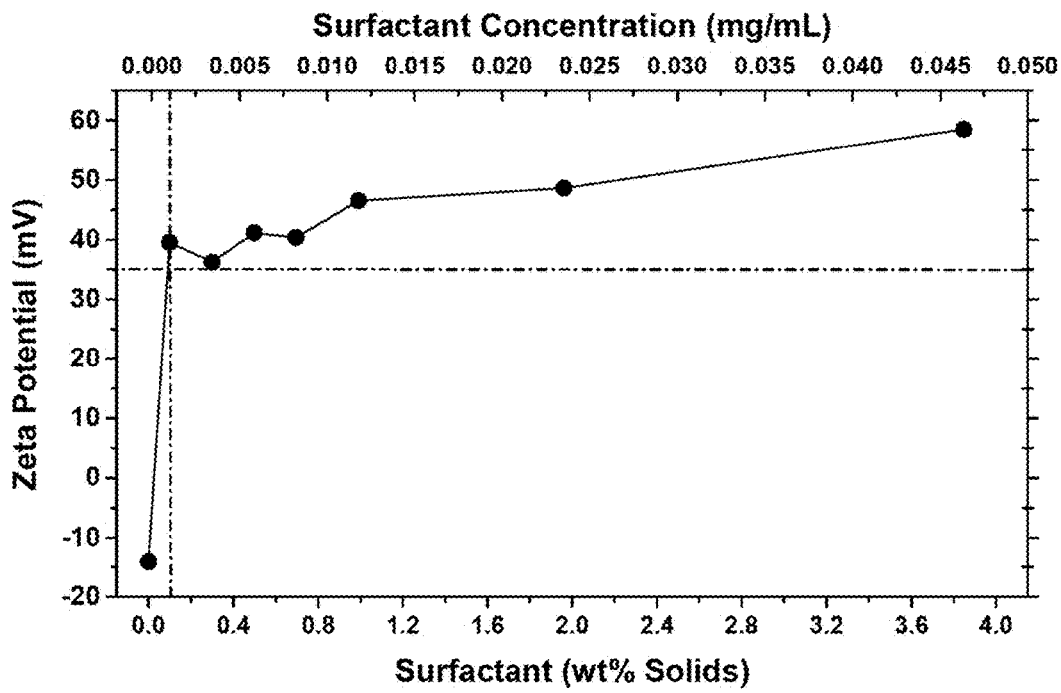
FIG. 17 is a graph from Example 10 showing the effect of cationic surfactant concentration (mg/mL and wt. %) on the zeta potential (mV) of graphite particles dispersed in the cationic surfactant cetylpyridinium bromide hydrate (CBH).

The testing reflected in FIG. 17 was performed with graphite particles (sold as YF3) dispersed in the cationic surfactant cetylpyridinium bromide hydrate (CBH). As can be seen FIG. 17, an increase in surfactant concentration provided an increasing trend for the graphite's zeta potential. Thus, the positive charge on the graphite could be made stronger in the presence of a cationic surfactant.

Figure 18:
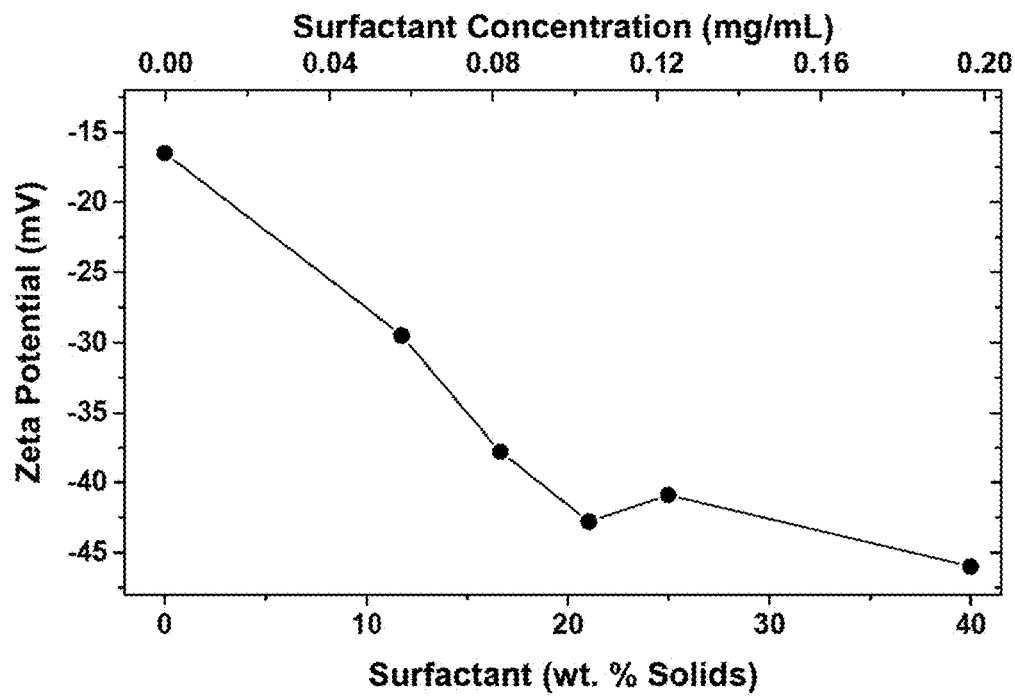
FIG. 18 is a graph from Example 10 showing the effect of anionic surfactant concentration (mg/mL and wt. %) on the zeta potential (mV) of silicon particles dispersed in the anionic surfactant sodium dodecylbenzene sulfonate (NaDDBS).

Silicon was tested in the presence of an anionic surfactant, sodium dodecylbenzene sulfonate (NaDDBS). The results are shown in FIG. 18. As can be seen in FIG. 18, increasing the concentration of anionic surfactant tended to further decrease the zeta potential of the silicon. Thus, the negative charge of the silicon could be made stronger in the presence of the anionic surfactant.

The zeta potential was assessed after the attachment of silicon to the surface of two different graphite microparticle cores according to the methods described herein, to determine optimal conditions for further layering of graphene on the graphite-silicon composite powders. The graphite microparticles were Zichen YF-3 and Zichen G9, both commercially available. The pH and zeta potential of these graphite-silicon composite compositions in an aqueous suspension were both measured. Table 1 provides the data, showing that the graphite-silicon composite particles had a net negative charge.

TABLE 1

| Particle composition | pH | Zeta (mV) |
|---|---|---|
| YF-3 graphite/Si composite | 5.42 | −7.86 |
| G9 graphite/Si composite | 5.2 | −33.7 |
| G9 graphite/Si composite | 6.6 | −16.7 |

Consequently, a cationic surfactant was added to the graphene suspension to provide a net positive charge to the graphene.

A sample of two-dimensional graphene (sold as XG Science xGnP_M_15) was dispersed in the cationic surfactant CBH at varying concentrations and the zeta potential was measured. The data is shown in FIG. 19.

Figure 19:
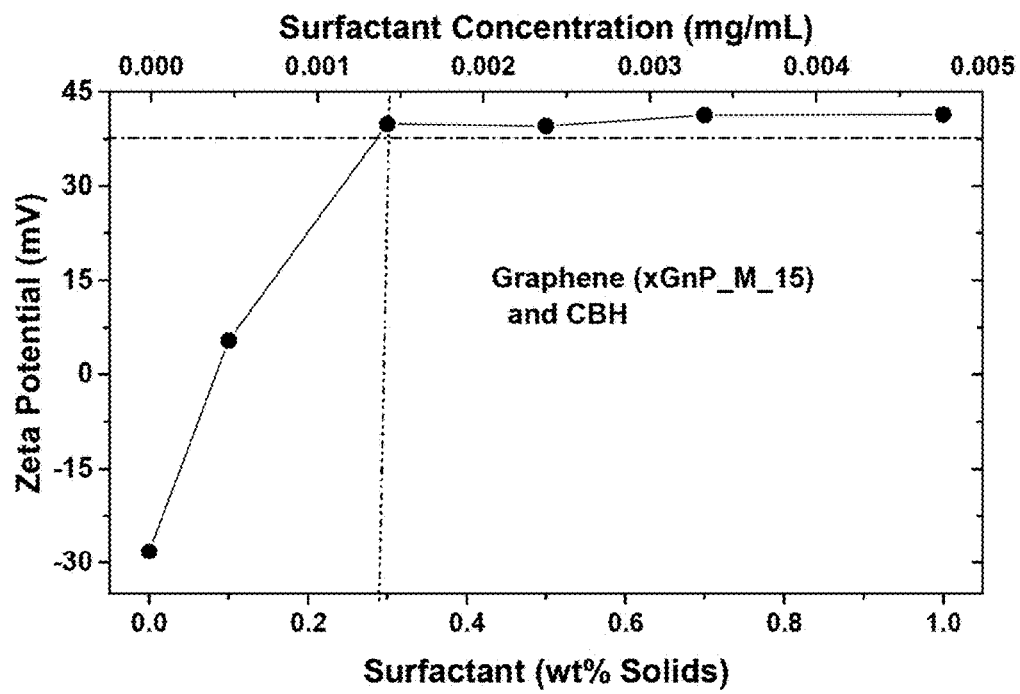
FIG. 19 is a graph from Example 10 showing the effect of cationic surfactant concentration (mg/mL and wt. %) on the zeta potential of graphene dispersed in the cationic surfactant cetylpyridinium bromide hydrate (CBH).

As can be seen in FIG. 19, after reaching a surfactant concentration of about 0.0015 mg/ml, the zeta potential of the two-dimensional graphene is fairly constant with some minor increase at about 0.0015 mg/ml.

Two-dimensional nano-graphite particles (sold as SFG_6L) were also tested in the cationic surfactant CBH. The zeta potential was again measured at different surfactant concentrations and weight percentage. The results are provided below in FIG. 20.

Figure 20:
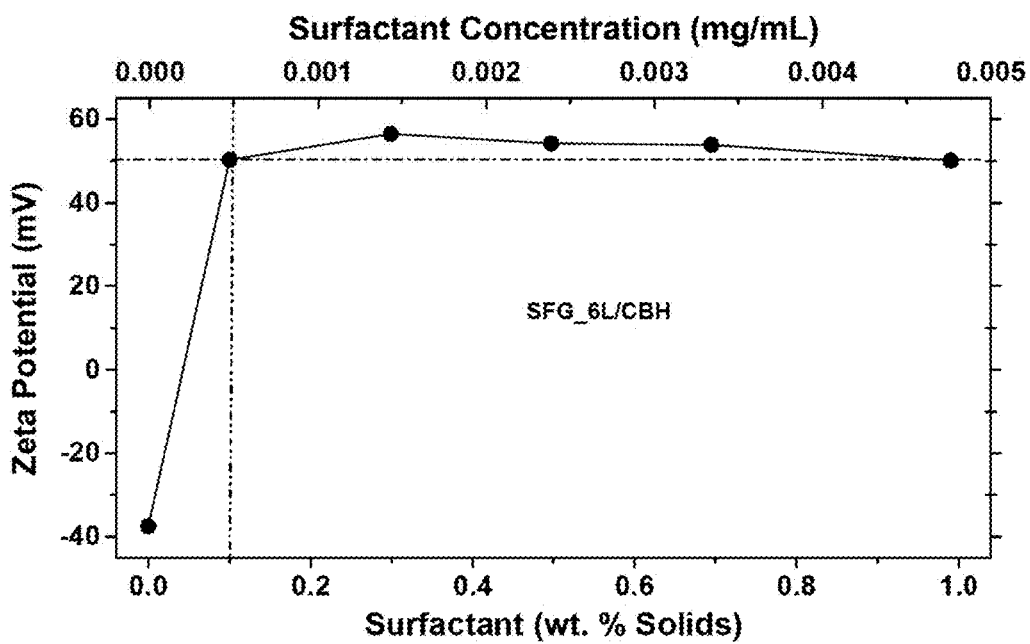
FIG. 20 is a graph from Example 10 showing the effect of cationic surfactant concentration (mg/mL and wt. %) on the zeta potential (mV) of two-dimensional graphite dispersed in the cationic surfactant cetylpyridinium bromide hydrate (CBH).

As can be seen in FIG. 20, at an initial surfactant concentration of about 0.0005 mg/ml, the zeta potential of the two-dimensional graphite is about 50 mV and no significant variation of Zeta potential was observed as the surfactant concentration gradually increased to ~0.005 mg/ml.

Two-dimensional graphene was attached via electrostatic attraction to the surface of the anode composition having the graphite microparticle core with the silicon layer (graphite-silicon composite particle) to form graphite-silicon-graphene composite particles. The pH was kept constant at 5.46.

Testing was performed to evaluate the effect of pH and the presence or absence of cationic surfactant on the zeta potential of graphite particles (YF-3) in suspension. The graphite particles were suspended without surfactant and with about 3.5 wt. % of the surfactant benzyldimethyldodecylammonium bromide (BddaBr) for comparison purposes. The pH of the suspension was adjusted gradually by adding HCl or NH$_4$OH. FIG. 21 shows the results. The data in FIG. 21 demonstrates that to achieve a high positive zeta potential, a cationic surfactant should be included and the pH should be less than about 6.

The effect of pH and the presence or absence of anionic surfactant on the zeta potential of silicon particles was also tested. The silicon particles were suspended in a solution of deionized water without surfactant and with about 20 wt. % of the anionic surfactant sodium dodecylbenzene sulfonate (NaDDBS). The pH was adjusted gradually by adding HCl or NH$_4$OH. The results are shown in FIG. 22. As seen in FIG. 22, the magnitude of the negative charge of the silicon particle suspension in deionized water decreases rapidly in the pH range of about 3 to about 4.5, and the suspension containing an anionic surfactant (NaDDBS) tends to have a still higher negative charge in this pH region.

The effect of the suspension medium on the zeta potential was also evaluated. It was found that changing the suspension medium can influence the zeta potential as a function of pH. For example, silicon particles were suspended in a solution of about 100 wt. % ethanol. The pH of the solution was gradually adjusted with either HCl or NH$_4$OH and the zeta potential of the silicon particles was measured. The results are shown in FIG. 23; the silicon particles and particle concentration are the same as that shown in FIG. 22. When FIGS. 22 and 23 are compared, it is apparent that an even larger change in behavior is seen when 100% ethanol is used as the suspension fluid, as shown in FIG. 23. Thus, it was determined that the suspension medium can have an effect on the zeta potential of the particles in suspension.

Example 11

Figure 24A:
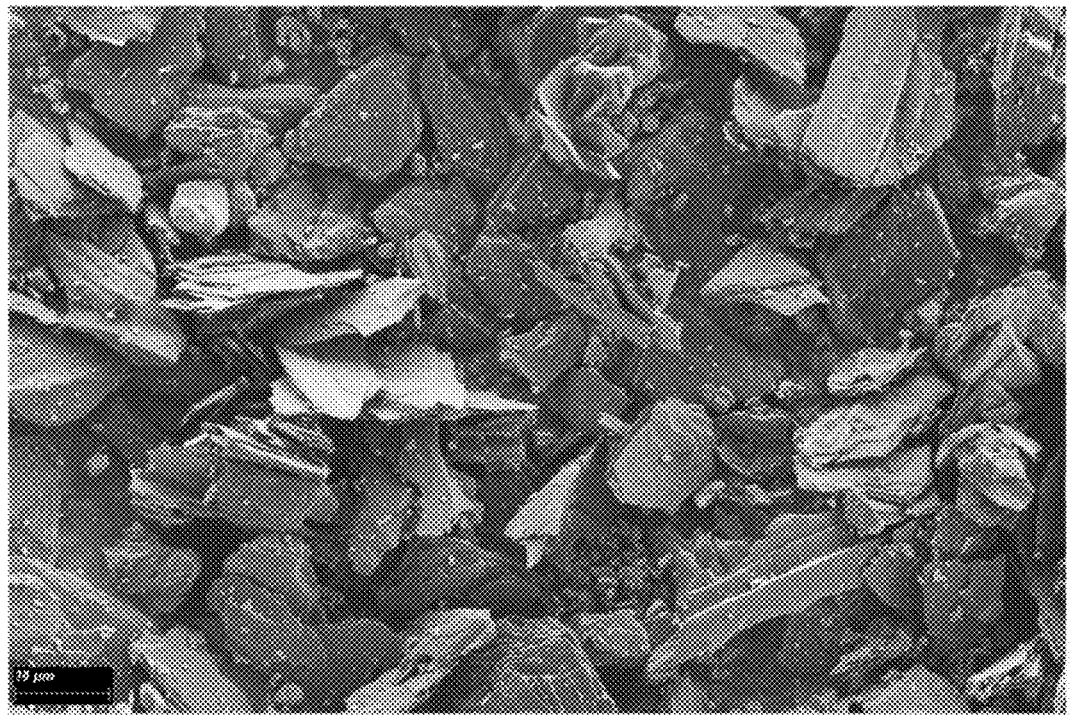
FIG. 24A is an SEM showing traditionally mixed silicon microparticles and graphite particles.
Figure 24B:
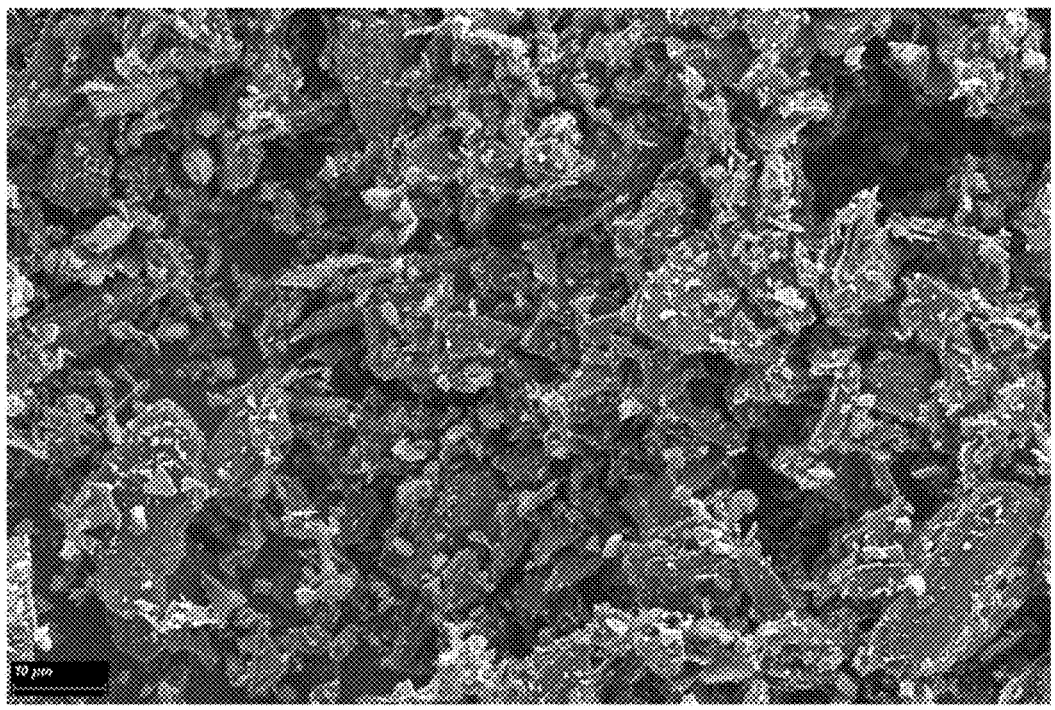
FIGS. 24B and 24C show SEM images of silicon microparticles 4 attached to graphite particles by a layering process exemplary of those described herein.
Figure 24C:
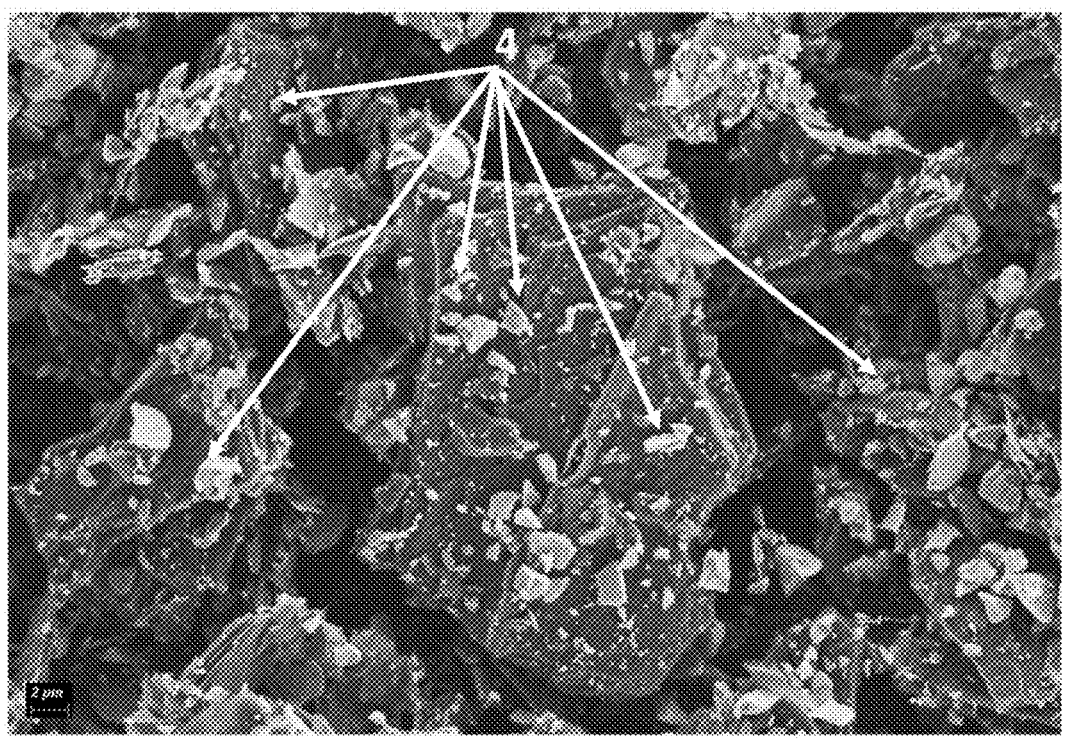

Testing was also performed to assess the ability to attach micro-sized particles on graphite. Earlier testing established the ability to attach nanosized particles. See, e.g., Example 1 (attaching both tin and silicon particles having an average particle diameter between about 50 nm. and about 100 nm). As a control sample, FIG. 24A shows the SEM images of 15 wt. % micro-sized silicon (FerroPem, D50<1.5 m) mixed with graphite (Pyrotek graphite, GCC-7A) through high power sonication, as described in Example 6. FIG. 24A reveals that a small fraction of the silicon microparticles landed on the upper surfaces of the graphite as a result of simple impingement, but there is no evidence of significant silicon attachment. By applying the layering process described in Example 1, attachment of the micro-sized silicon on the graphite surfaces was achieved. These results are depicted in FIGS. 24B and 24C, which show uniform silicon distribution of the attached silicon microparticles on the graphite surfaces. The lower surface coverage of the microparticle silicon on the graphite (compared with the nanoparticle silicon) arises from the low population density of the larger size silicon. This demonstrates that the both nanosized particles as well as microsized particles can be attached to a core particle according to the layering methods described herein.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

The inventions being thus described, it will be obvious that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

What is claimed is:

1. A method of preparing an anode composition comprising:
    combining (a) a suspension of graphite particles having a mean diameter in at least one direction of between about 400 nm and about 60 μm inn in a first liquid medium comprising a first surfactant, wherein the first surfactant comprises an anionic surfactant, a cationic surfactant, a zwitterionic surfactant, or a mixture thereof, and (b) a suspension of electrochemically active particles in a second liquid medium comprising a second surfactant, wherein the second surfactant comprises an anionic surfactant, a cationic surfactant, a zwitterionic surfactant, or a mixture thereof; and wherein the first surfactant and second surfactant are different; wherein the graphite particles and the electrochemically active particles have respective zeta potentials of opposite polarity;
    mixing (a) and (b) to form a liquid suspension comprising the anode composition;
    combining the liquid suspension with (c) a suspension of graphene particles in a liquid medium comprising a third surfactant, wherein the third surfactant comprises an anionic surfactant, a cationic surfactant, a zwitterionic surfactant, or a mixture thereof; and mixing; and
    heat treating the anode composition at a temperature between about 200° C. and about 500° C.

2. The method of claim 1, wherein the first surfactant comprises a cationic surfactant and the second surfactant comprises an anionic surfactant.

3. The method of claim 1, wherein the first surfactant comprises an anionic surfactant and the second surfactant comprises a cationic surfactant.

4. The method of claim 1, wherein the third surfactant is the same as the first surfactant.

5. The method of claim 1, wherein the method further comprises the step of drying, filtering, and/or rinsing the anode composition.

6. The method of claim 1, wherein the heat treating is performed for at least about 10 mins.

7. A method of preparing an anode composition comprising:
    combining (a) a suspension of silicon particles having a mean diameter in at least one direction of between about 400 nm and about 60 μm inn in a first liquid medium comprising a first surfactant, wherein the first surfactant comprises an anionic surfactant, a cationic surfactant, a zwitterionic surfactant, or a mixture thereof, and (b) a suspension of graphene particles in a second liquid medium comprising a second surfactant, wherein the second surfactant comprises an anionic surfactant, a cationic surfactant, or a zwitterionic surfactant, or a mixture thereof; and wherein the first surfactant and second surfactant are different; wherein the silicon particles and the graphene particles have respective zeta potentials of opposite polarity;
    mixing (a) and (b) to form a liquid suspension comprising the anode composition;
    combining the liquid suspension with (c) a suspension of electrochemically active particles and/or electronically conductive particles in a liquid medium comprising a third surfactant, wherein the third surfactant comprises an anionic surfactant, a cationic surfactant, a zwitterionic surfactant, or a mixture thereof; and mixing; and
    heat treating the anode composition at a temperature between about 200° C. and about 500° C.

8. The method of claim 7, wherein the first surfactant comprises an anionic surfactant and the second surfactant comprises a cationic surfactant.

9. The method of claim 7, wherein the first surfactant comprises a cationic surfactant and the second surfactant comprises an anionic surfactant.

10. The method of claim 7, wherein the third surfactant is the same as the first surfactant.

11. The method of claim 7, wherein the method further comprises the step of drying, filtering, and/or rinsing the anode composition.

12. The method of claim 1, wherein the heat treating is performed for at least about 10 mins.

13. The method of claim 1, wherein the electrochemically active particles comprise electrochemically active metals, metalloids, metal oxides, transition metal sulfides, transition metal nitrides, transition metal phosphides, transition metal fluorides, or a mixture thereof.

14. The method of claim 13, wherein the electrochemically active particles comprise silicon particles, tin particles, or a mixture thereof.

15. The method of claim 1, wherein the graphene particles are single layer, bilayer or multilayer sheets or platelets of graphene, graphene oxide, reduced graphene oxide, or functionalized graphene.

16. The method of claim 1, wherein the graphite particles are of an irregular shape, a two-dimensional structure, a sphere shape, a rod shape, a cylinder shape, an oval shape, or an egg shape.

17. The method of claim 1, further comprises adding a binder to the anode composition after the heat treating step.

18. The method of claim 17, wherein the binder comprises polyvinylidene fluoride, polyacrylic acid, fully or partially neutralized polyacrylic acid, cross-linked polyacrylic acid, lithiated polyacrylic acid, carboxy methyl cellulose, polyalginate, polyvinyl alcohol, polyfluorenes, perfluorosulfonic acid polymers, polyethylenimines, poly(acrylonitrile-co-acrylamide), polystyrenebutadiene rubber and poly-1,3-butadiene, and combinations thereof.

19. The method of claim 7, wherein the electrochemically active particles comprise electrochemically active metals, metalloids, metal oxides, transition metal sulfides, transition metal nitrides, transition metal phosphides, transition metal fluorides, or a mixture thereof.

20. The method of claim 19, wherein the electrochemically active particles comprise graphite particles, silicon particles, tin particles, and mixtures thereof.

21. The method of claim 7, wherein the one or more electronically conductive particles comprise carbon nanoparticles, graphite nanoparticles, tin nanoparticles, copper nanoparticles, silver nanoparticles, or a mixture thereof.

22. The method of claim 7, wherein the silicon particles are of an irregular shape, a two-dimensional structure, a sphere shape, a rod shape, a cylinder shape, an oval shape, or an egg shape.

23. The method of claim 7, further comprises adding a binder to the anode composition after the heat treating step.

24. The method of claim 23, wherein the binder comprises polyvinylidene fluoride, polyacrylic acid, fully or partially neutralized polyacrylic acid, cross-linked polyacrylic acid, lithiated polyacrylic acid, carboxy methyl cellulose, polyalginate, polyvinyl alcohol, polyfluorenes, perfluorosulfonic acid polymers, polyetylenimines, poly(acrylonitrile-co-acrylamide), polystrenebutadiene rubber and poly-1,3-butadiene, and combinations thereof.

* * * * *